US008843824B1

(12) United States Patent
Daly, IV

(10) Patent No.: US 8,843,824 B1
(45) Date of Patent: Sep. 23, 2014

(54) PROVIDING TEMPORAL INFORMATION TO USERS

(71) Applicant: 2nfro Technology Ventures LLC, Cheyenne, WY (US)

(72) Inventor: James T. Daly, IV, Fort Myers, FL (US)

(73) Assignee: 2nfro Technology Ventures LLC, Cheyenne, WY (US)

( * ) Notice: Subject to any disclaimer, the term of this patent is extended or adjusted under 35 U.S.C. 154(b) by 0 days.

(21) Appl. No.: 13/843,510

(22) Filed: Mar. 15, 2013

(51) Int. Cl.
*G06F 3/048* (2013.01)
*G06F 3/0481* (2013.01)

(52) U.S. Cl.
CPC .................................. *G06F 3/04817* (2013.01)
USPC ........................................................ 715/712

(58) Field of Classification Search
None
See application file for complete search history.

(56) References Cited

U.S. PATENT DOCUMENTS

| | | | |
|---|---|---|---|
| 4,285,148 A | 8/1981 | Kolar | |
| 5,271,172 A | 12/1993 | Ureta | |
| D523,900 S | 6/2006 | Castro | |
| 7,257,778 B2 | 8/2007 | Kekki et al. | |
| 7,590,553 B2 | 9/2009 | Coates | |
| 7,907,476 B2 | 3/2011 | Lee | |
| 7,924,657 B2 | 4/2011 | Liebowitz | |
| 8,400,548 B2 | 3/2013 | Bilbrey et al. | |
| 2002/0163858 A1 | 11/2002 | Greenwood | |
| 2004/0225966 A1 | 11/2004 | Besharat et al. | |
| 2005/0091596 A1* | 4/2005 | Anthony et al. | 715/712 |
| 2005/0105397 A1 | 5/2005 | Tuason | |
| 2006/0224993 A1* | 10/2006 | Wong et al. | 715/800 |
| 2007/0060205 A1* | 3/2007 | Kim | 455/566 |
| 2010/0214875 A1 | 8/2010 | Wilson et al. | |

OTHER PUBLICATIONS

Lee, Jungah, "Samsung Preparing Wristwatch as It Races Apple for Sales", accessed from http://www.bloomberg.com/news/print/2013-03-19/samsung-preparing-wristwatch-as-it-races-apple-for-sales.html, Mar. 19, 2013, 2 pages.
"CircleTime," T3 App Chart, Sep. 28, 2012, accessed from http://best-apps.t3.com/apps/iphone/tools/paid/circletime/, Apr. 22, 2013, 7 pages.
"CircleTime," Apps on Tapp, posted by Angie, Sep. 17, 2012, accessed from http://www.appsontapp.com/circletime/, Apr. 22, 2013, 7 pages.
Wolfe, Bryan M., "Tired of the Same Old Calendar Apps? Put a New Spin on Your Events With CircleTime," appadvice, Jul. 16, 2012, accessed from http://appadvice.com/appnn/2012/07/tired-of-the-same-old-calendar-apps-put-a-new-spin-on-your-events-with-circletime, Apr. 22, 2013, 5 pages.

(Continued)

*Primary Examiner* — Matt Kim
*Assistant Examiner* — William Trapanese
(74) *Attorney, Agent, or Firm* — K&L Gates LLP

(57) ABSTRACT

Systems and methods for generating and providing an user interface for providing temporal information to users. The user interface may comprise a center portion and a three-dimensional shape comprising an upper portion that lies about the center portion and a lower portion that lies below the center portion. The center portion may correspond to a first time period. The upper portion may correspond to a second time period in the future relative to the first time period. The lower portion may correspond to a third time period in the past relative to the first time period.

30 Claims, 53 Drawing Sheets
(46 of 53 Drawing Sheet(s) Filed in Color)

(56) References Cited

OTHER PUBLICATIONS

McNicholas, Kym, "Could MyTime be a Groupon that works?" pandodaily, Mar. 15, 2013, downloaded from http://pandodaily.com/2013/03/15/could-mytime-be-a-groupon-that-works/ on Mar. 18, 2013.

Rao, Leena, "Redbeacon Founder Launches MyTime, A Booking and Ecommerce Platform for Local Services and Open Appointments," techcrunch, Feb. 7, 2013, downloaded from http://techcrunch.com/2013/02/07/redbeacon-founder-launches-mytime-a-booking-and-ecommerce-platform-for-local-services-and-open-appointments/ on Mar. 18, 2013.

* cited by examiner

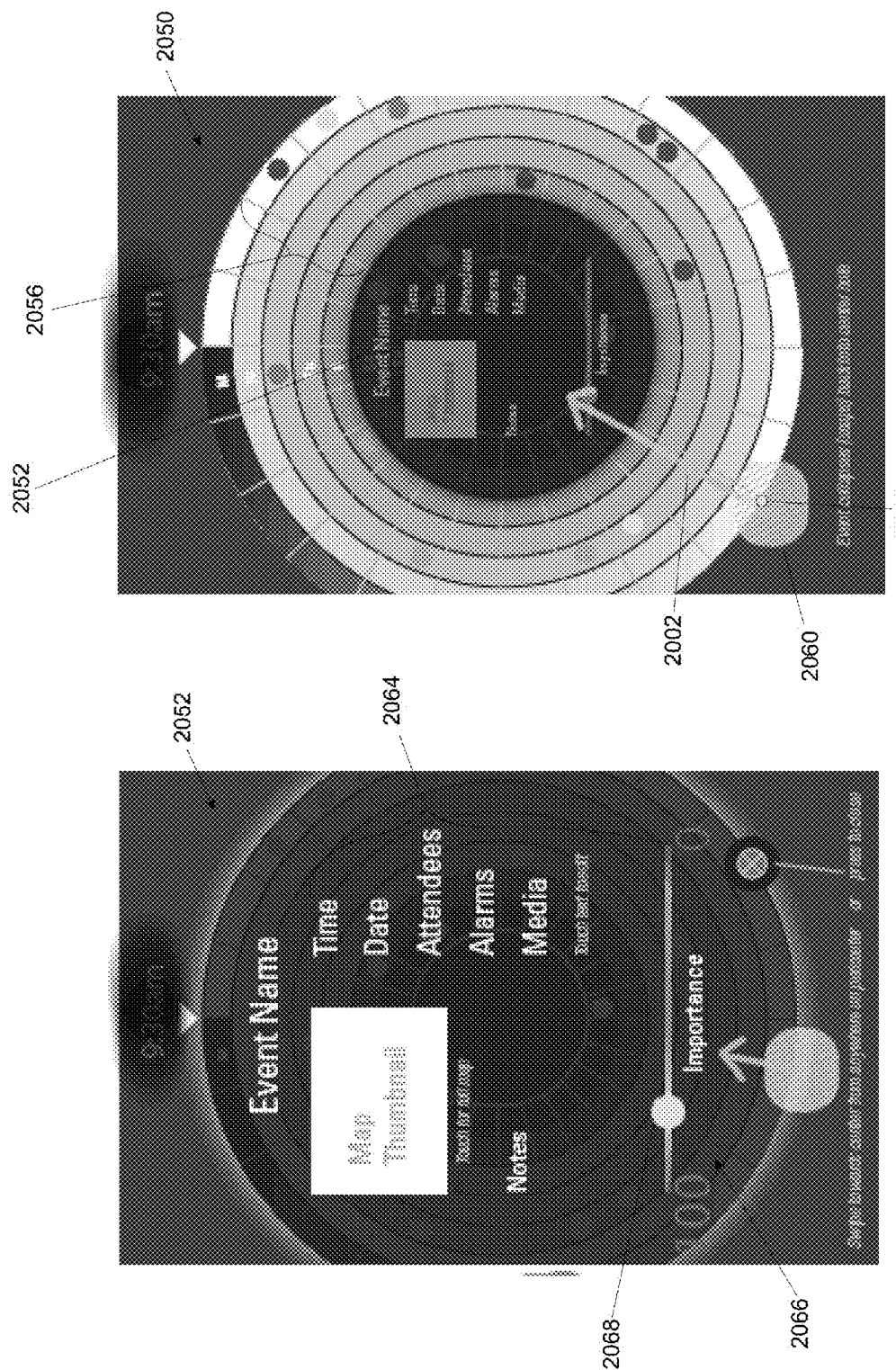

PROVIDING TEMPORAL INFORMATION TO USERS

BACKGROUND

This application generally relates to providing temporal information to users via a user interface.

Modern life requires people to process and large quantities of information in many different formats. E-mails, text messages, Rich Site Summary (RSS) feeds, phone calls, voicemails, day planners, and various other mediums provide users with more information than ever. Existing interfaces for presenting this information are typically linear and also typically segregated by information type. For example, e-mail's are typically viewed in an e-mail application; text messages are typically viewed using a separate text feature; phone calls and voicemails are received utilizing yet another function. In most cases, these applications and functions also present information in a linear fashion. For example, e-mails, text messages and other similar messages organized according to a single dimension (e.g., time of receipt, sender, etc.). Day planners and other calendaring applications typically utilize a traditional calendar.

These segregated, linear presentations mechanisms, however, make it very difficult for users to effectively process information. For example, users may have to sift through tens or even hundreds of irrelevant e-mails to find e-mails to which the user should respond. Also, for example, users may be forced to scroll through junk text messages from advertisers in order to finding the text messages that the user considers interesting. Linear presentations are only capable of providing users with a single time indication (e.g., the time that a message or other piece of information arrived). Users are required to read e-mails or other messages to independently determine if the e-mail refers to a future date. Accordingly, there is a need for new information presentation methods.

DRAWINGS

STATEMENT UNDER 37 C.F.R. §1.84(a)(2): The patent or application file contains at least one drawing executed in color. Copies of this patent or patent application publication with color drawings will be provided by the Office upon request and payment of the necessary fee.

Various example embodiments are described herein by way of example in conjunction with the following figures, wherein:

FIGS. 55-56 illustrate diagrams showing an additional interface for receiving data regarding the relevance or importance of various information items.

DESCRIPTION

Figure 1:
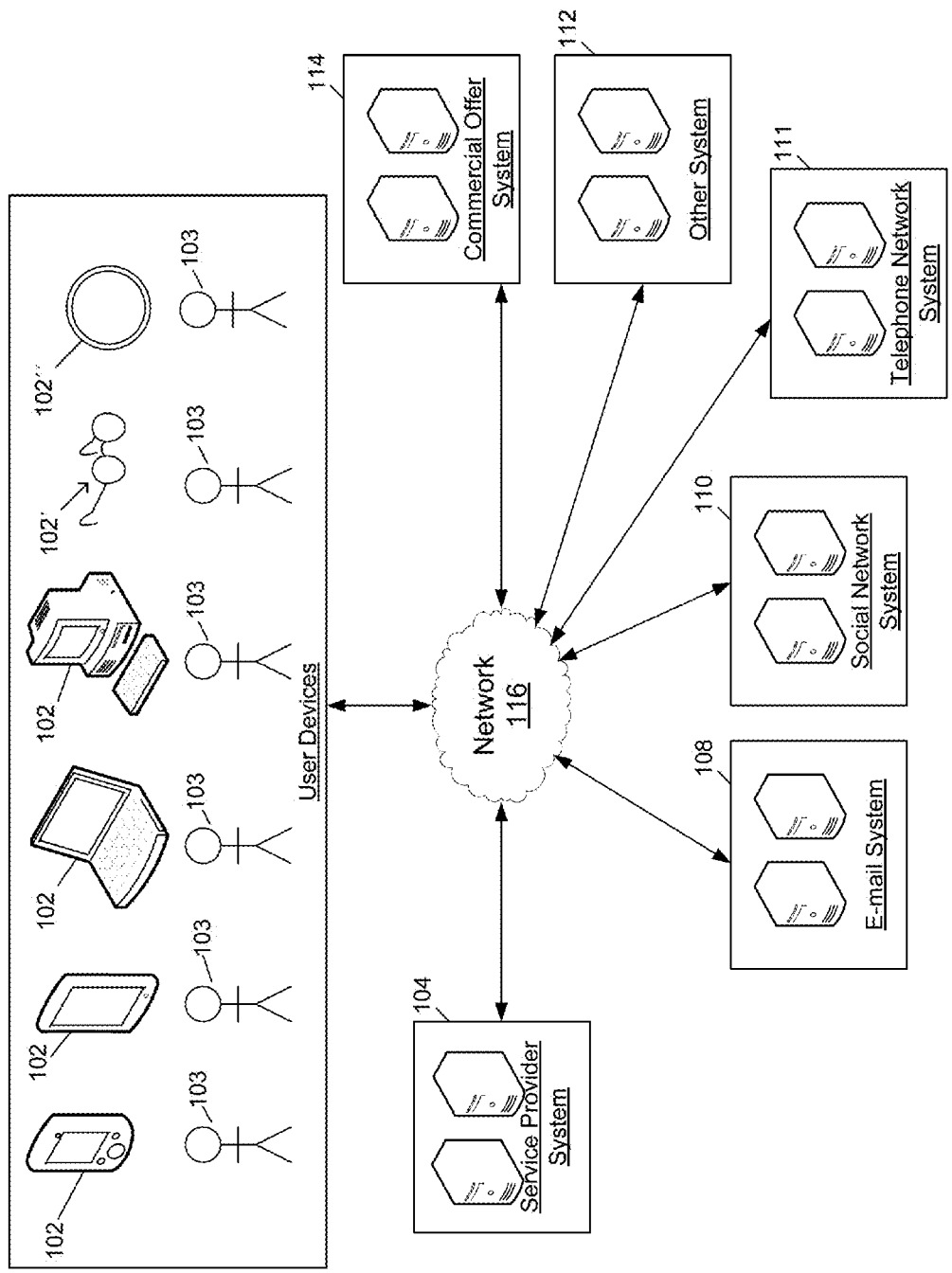
FIG. 1 is a block diagram illustrating one embodiment of an environment for implementing various user interfaces for providing temporal information.

Various embodiments are directed to methods and systems for generating and serving an interface comprising temporal information. Each item of temporal information (e.g., information item) is associated with at least one time, which may be a time in the future, the present, or the past. Temporal information for presentation in the interface may be received from various different sources, including, for example, e-mail feeds, text feeds, instant message feeds, Rich Site Summary (RSS) feeds, phone or voicemail feeds, social media feeds, commercial offer feeds, stores of medical, academic, employment or other records, etc. In some embodiments, additional information may be received from users of the interface. For example, users may provide pictures, memos, photographs, etc. Time may be associated with information items in any suitable way. In some embodiments, time is associated with information items based on a time that the information items were received, a time referred to by the information items, a time of replies or other associated information items, etc. For example, an information item from an e-mail feed (e.g., an e-mail) may be associated with a time when the e-mail was sent or received. An information item from a social media feed (e.g., a post) may be associated with a time that post was made, the time of a most recent reply to the post, etc. If the e-mail, post or other information item describes a future or past event (e.g., a doctor's appointment next week), then that information item may be associated with the time of the event or appointment. Some information items may be associated with more than one time. One example of such a multi-temporal information item is the e-mail described above that references a future appointment. This example e-mail may be associated with both the time of its receipt and with the time of the appointment.

The interface is configured to present the information items graphically in a manner that provides the user with an indication of a time or times associated with each information item, as well as other properties of the information items. Presenting the information items and associated times and properties graphically enables the user to visualize relationships between the various information items at a glance. In this way, the user may identify and view information items that are most relevant to her or him at any given time. The user may also avoid processing information items that are not relevant to the user, or not relevant at a given time. Multi-temporal information items (e.g., those associated with more than one time) may be represented on the interface so as to indicate more than one time.

In some embodiments, the interface is arranged with reference to a center axis. The center axis may be visible to users, or may simply serve as a common reference. A two-dimensional shape, such as a circle, is positioned in plane orthogonal to the center axis. The two-dimensional shape (e.g., a face thereof) corresponds to a time period which may be, for example, one day, twelve (12) hours, etc. Different angular positions on the two-dimensional shape correspond to different times, for example similar to a clock. Information items are represented on the two-dimensional shape as icons positioned on the face of the two-dimensional shape. The angular position of each icon about the center axis indicates a time associated with the underlying information item. The distance of each icon from the center axis indicates an additional property associated with the underlying information item such as, for example, the relevance of the information item, a category of the information item, etc.

In various embodiments, the time period corresponding to the two-dimensional shape is defined relative to the reference time. For example, the time period may comprise a certain number of hours or days before or after the reference time. The reference time may be indicated on the two-dimensional shape in any suitable manner. For example, the reference time may be indicated by a hand, pointer, or other reference time marker that rotates on the two-dimensional shape about the center axis, similar to the hand of a clock. In some embodiments, the two-dimensional shape itself may rotate with the reference time marker being stationary and/or represented by a stationary position. The interface may comprise functionality allowing the user to modify the reference time. For example, the user may be provided with functionality for "grabbing" and "dragging" the interface to cause the reference time to traverse forwards and backwards in time. When the time period is defined relative to the reference time, modifying the reference time also entails modifying the time period. Icons representing information items at times that fall outside of the time period after modification may be removed from the interface. Similarly, new icons corresponding to information items at times that fall within the newly modified time period may be plotted. This may allow the user to modify the interface to show information items relative to different reference times.

In some embodiments, the interface is configured to display information items both in the past and in the future relative to the reference time. For example, as the times associated with different information items track from future, to present, to past, icons corresponding to the information items transition from portions of the interface corresponding to the future to portions of the interface corresponding to the past. The future and past time periods may be represented on the interface in any suitable manner. For example, in some embodiments, the time period represented on the face of the two dimensional shape includes both past and future times. Also, in some embodiments, the interface comprises multiple two-dimensional shapes, with a first two-dimensional shape corresponding to a future time period, and a second two-dimensional shape corresponding to a past time period. Additionally, in some embodiments, the two-dimensional shape comprises multiple faces, with a first face corresponding to the future time period and a second fact corresponding to the past time period. The user may view the different faces by changing the user's point of view. For example, the user may virtually "rotate" the interface to change the user's view relative to the faces.

In some embodiments, an interface comprises a center portion on the plane orthogonal to the center axis with icons plotting on a surface of a three-dimensional shape positioned about the center axis. The center portion corresponds to a first time period, for example, in the manner described above. The three-dimensional shape may be positioned relative to the center portion such that the three-dimensional shape has a lower portion that lies below the plane and an upper portion that lies above the plane. The upper portion represents a second time period that is in the future relative to the time period and the lower portion represents a third time period that is in the past relative to the time period. Icons representing information items are plotted on the interface in a manner similar to that described above. For example, icons representing information items at times in the first time period are plotted on the center portion. Icons representing information items at times in the second time period are plotted on the upper portion of the three-dimensional shape. Icons representing information items at times in the third time period are plotted on the lower portion of the three-dimensional shape. The three-dimensional shape may be any suitable shape. In some embodiments, the three-dimensional shape is a torus with the center portion positioned in the center or "donut hole" of the torus.

Time may be represented on the respective portions of the three-dimensional shape in any suitable manner. For example, time may be indicated by the distance along the surface of the three-dimensional shape from the center axis, or a center-most edge of the three-dimensional shape and/or by angular position. In some embodiments, time is indicated by both the distance along the surface from the center axis or center-most edge and by angular position. For example, the direction of time may spiral outward from the center axis or the center-most edge of the three-dimensional shape.

In various embodiments, the interface may be configured to track updates to information items over time. For example, some information items, such as e-mails, social media posts, etc. may be updated over time as additional users reply, "like" or otherwise indicate interest, share or re-post, etc. The interface may comprise a two-dimensional shape that is positioned orthogonal to a center axis. The two-dimensional shape corresponds to a time period. Angular positions about the center axis correspond to different positions within the time period. When an information item is received (e.g., via one of the described feeds), it may be plotted on the two-dimensional shape as an icon. The position of the icon corresponds to a time associated with the information item (e.g., a time when the information item was sent, posted, etc.). When an information item is updated, the icon corresponding to the interface may be modified. For example, the color of the icon may change; a size of the icon may change; a shape of the icon may change, etc. In this way, the user may view the interface to receive an indication of information items occurring during the time period and also gauge the response of other users to the information items (e.g., via the number and/or type of updates).

Reference will now be made in detail to several example embodiments, examples of which are illustrated in the accompanying figures. Wherever practicable, similar or like reference numbers may be used in the figures and may indicate similar or like functionality. The figures depict example embodiments of the disclosed systems (or methods) for purposes of illustration only. One skilled in the art will readily recognize from the following description that alternative example embodiments of the structures and methods illustrated herein may be employed without departing from the principles described herein.

FIG. 1 is a block diagram illustrating one embodiment of an environment 100 for implementing various user interfaces for providing temporal information. The environment 100 comprises user devices 102 for presenting the interfaces to users 103. The environment 100 also comprises various other systems that may contribute to the creation and population of the interfaces including, for example, one or more e-mail systems 108, one or more social network systems 110, one or more telephone network systems 111, one or more commercial offer systems 114 and/or one or more other systems 112. The various systems 108, 110, 111, 112, 114 provide data feeds including various types of information items such as, for example, e-mail feeds, text feeds, phone call and/or voice-mail-related data feeds, etc. The systems 108, 110, 111, 112, 114 are provided as examples. It will be appreciated that any system capable of providing data regarding information items may be included in the environment 100.

Each user device 102 may be associated with a user 103. For example, a user 103 may own, lease, or otherwise have rights to use his or her associated user device 102. User devices 102 may comprise any type of network-enabled computer device that may be utilized by a user to receive and/or view interfaces as described herein. Examples of user devices include smart phones, tablet computers, laptop computers, desktop computers, etc. In some embodiments, user devices 102 may be optimized to match the shape of the interfaces described herein. For example, a user device 102' may comprise a round or rounded screen. A user device 102" may comprise glasses or any other suitable mechanism for projecting the interface to virtually appear completely or partially "around" the users. One example of such a user device is the GLASS product developed by GOOGLE, INC. Another example of such a user device 102" is a holographic projector or similar three-dimensional output or display device. As used herein, "user device 102" is used to indicate all of the user devices 102, 102' and 102" unless otherwise indicated. In some embodiments, user devices 102 receive the various information items as data feeds and/or in other forms to generate user interfaces for providing temporal information.

In various embodiments, the environment 100 comprises one or more service provider systems 104. A service provider system 104 receives the various information items and generates user interfaces for providing the temporal information. The user interfaces are then served from the service provider system 104 to the respective user devices 102. Although the service provider system 104 is shown in FIG. 1 as a single block, it will be appreciated that the service provider system 104 may be and/or comprise a distributed processing system comprising multiple pieces of computer hardware distributed geographically and/or according to network topography. For example, the service provider system 104 may be configured to provide the interfaces as a generally-accessible cloud service, software-as-a-service (SaaS) or according to any similar and suitable method. In some embodiments, users 103 (utilizing user devices 102) log-in to the service provider system 104 to receive the interfaces. Various users 103 and/or user devices 102 may have accounts with the service provider system 104, allowing the users 103 to view interfaces comprising information items specific to the user. The various components 102, 104, 108, 110, 111, 112, 114, etc. of the environment 100 may communicate with one another via a network 116. The network 116 may be any suitable type of wired, wireless, or mixed network and may comprise, for example, the Internet, a local area network (LAN), a wide area network (WAN), etc.

Figure 2:
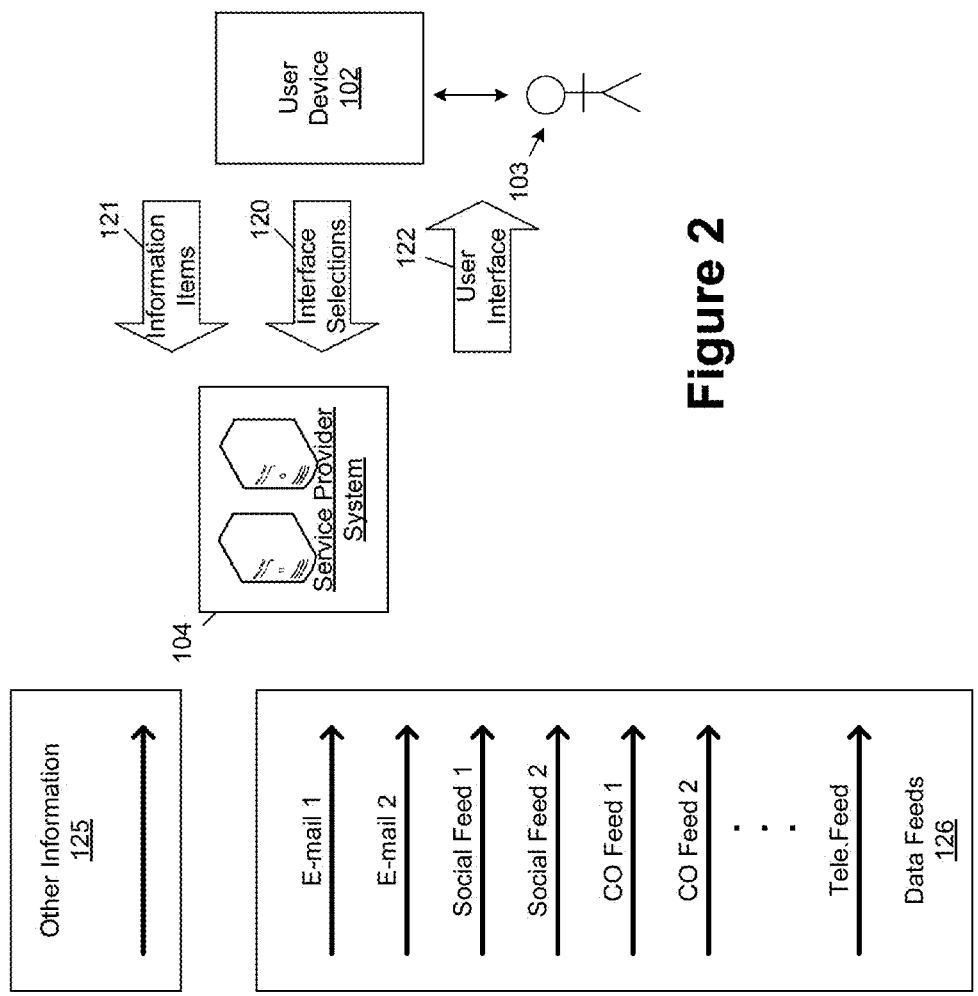
FIG. 2 is a block diagram illustrating one example embodiment for generating user interfaces for providing temporal information to users at least partially at a service provider system and serving the interfaces to a user device.

FIG. 2 is a block diagram illustrating one example embodiment for generating user interfaces for providing temporal information to users at least partially at a service provider system 104 and serving the interfaces to a user device 102 (and associated user 103). FIG. 2 illustrates various data feeds 126 that may be received by the service provider system 104. The data feeds 126 in FIG. 2 are an example combination of data feeds indicating information items that may be received from the various systems 108, 110, 112, 114, 116. Data feeds 126, for example, may be received via an application programming interface (API) executed by the service provider system 104 the user device 102 and/or both.

The example data feeds 126 comprise e-mail data feeds from one or more e-mail systems 108 (E-mail 1, E-mail 2), social network data feeds from one or more social network systems 110 (Social Feed 1, Social Feed 2), commercial offer feeds from one or more commercial offer systems 114, telephone-related feeds from one or more telephone network systems 111 (Tele. Feed), etc. The e-mail feeds, for example, may indicate e-mails to and/or from the user 103. Different e-mail feeds may be received from different e-mail addresses and/or accounts associated with the user 103. Information items received through e-mail feeds may include e-mail messages to and/or from the user. Some e-mail services, such as the GMAIL service available from GOOGLE, INC. have related calendar features. E-mail feeds from such services may also include information items relating to future and/or past events stored with the calendar feature. Social network data feeds may be received from one or more social network systems 110. Social network feeds, for example, may be associated with different social network accounts held by the user 103. Examples of such accounts include accounts with the FACEBOOK, TWITTER, etc. Information items received though social network feeds may include, for example, posts made by the user 103, posts made by friends or other users followed by the user 103, replies, shares, or re-postings of the same, etc.

Commercial offer feeds (CO Feed 1, CO Feed 2) may be received from one or more commercial offer systems 114 and may comprise various commercial offers available to the user 103 (and/or the general public) either presently or in the future. Telephone feeds (Tele. Feed) may be received from one or more telephone network systems 111 and may indicate information items relating to the user's telephone account. Such information items may include, for example, voicemails, missed calls, etc. It will be appreciated that the list of example data feeds 126 represent just one example feed configuration. In some embodiments, different combinations of feeds including more or less than the feeds shown in FIG. 2 may be utilized. For example, in some embodiments, the service provider system 104 may be in communication with an additional calendar (e.g., one example of a system represented by the other system 111). The calendar system may implement a separate calendar service for the user 103, such as the GOOGLE CALENDAR feature available from GOOGLE. An additional calendar feed (not shown) may provide information items related to events on the user's calendar.

In some embodiments, the service provider system 104 receives additional information 121, 125, from various non-feed sources. Other information 125 represents information items received from any other suitable source or sources (e.g., other systems 112). Such information may include, for example, medical records, academic records, public records, etc. Additional information items 121 may be received from the user 103 such as, for example, photographs, memos or notes, etc.

Figures 3, 5:
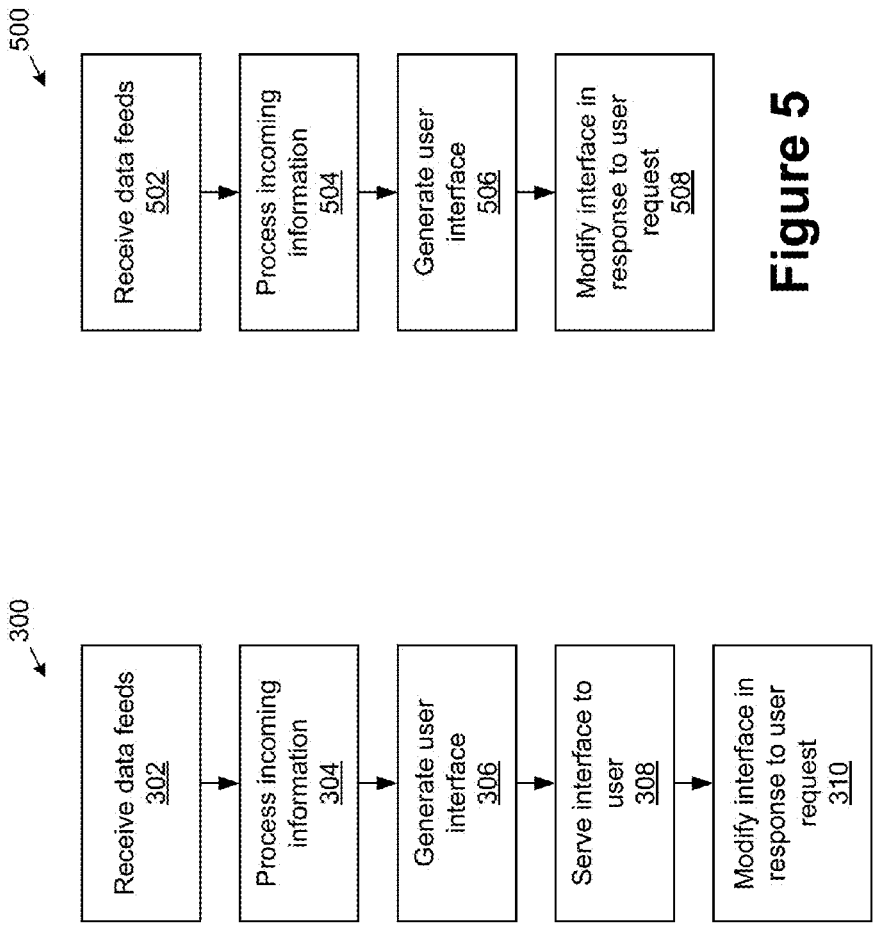
FIG. 3 is a flow chart showing one embodiment of a process flow 300 that may be executed by the service provider system 104 to generate interfaces for providing users with temporal information.
FIG. 5 is a flow chart illustrating one embodiment of a process flow for generating interfaces for providing users with temporal information at least partially with a user device.

In the example embodiment of FIG. 2, the data feeds 126 are received by the service provider system 104, which may process the incoming information items and generate the various interfaces described herein. For example, FIG. 3 is a flow chart showing one embodiment of a process flow 300 that may be executed by the service provider system 104 to generate interfaces for providing users with temporal information. At 302, the service provider system 104 receives information (e.g., from data feeds 126, other information 125, user-provided information items 121, etc.). At 304, the service provider system 104 processes the incoming information. Processing the information may involve, for example, formatting received information items, deriving one or more times associated with the information items received via the data feeds 126, deriving a relevance of information items received via the data feeds 126, etc. At 306, the service provider system 104 may generate a user interface for providing temporal information. At 308, the user interface, indicated by 122 may be served to the user 103 (via the user device 102). As described further herein, the interface 122 may provide the user with modification options including, zooming in or out, viewing details of a particular information item, changing the user's point of view, etc. For example, the user may provide interface selections 120 to the service provider system 104. The interface selections 120 may comprise requests for the service provider system 104 to make modifications to the interface. At 310, the service provider system 104 modifies the interface 122 in response to the selections 122.

Figure 4:
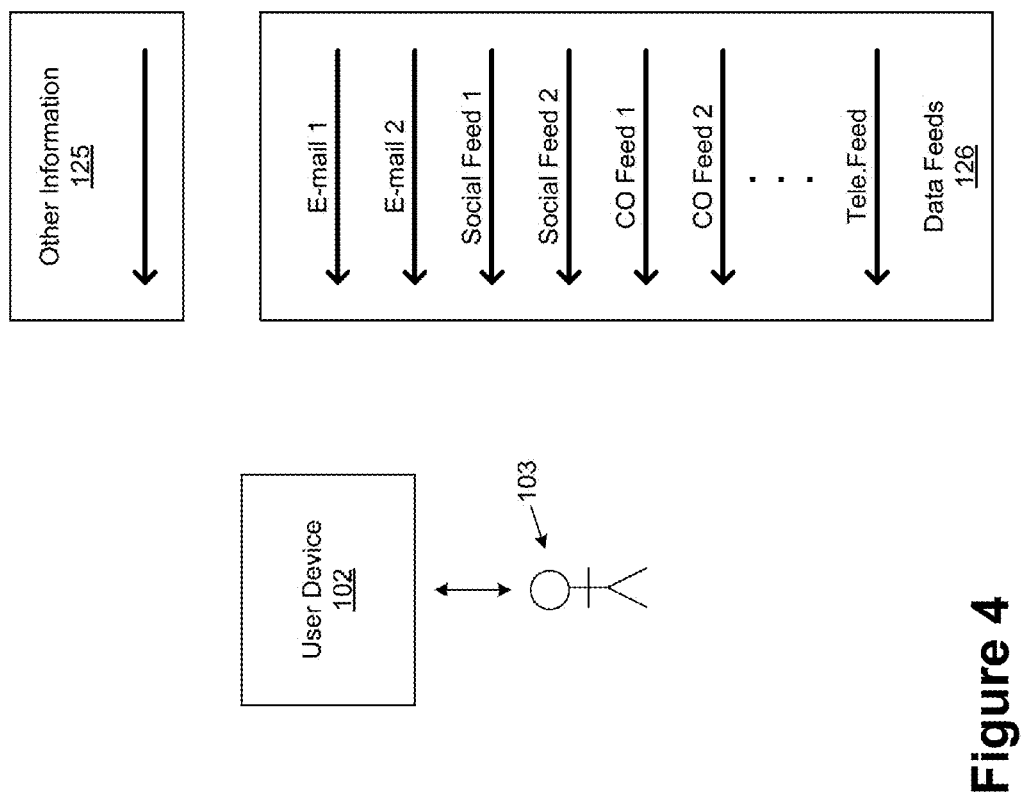
FIG. 4 is a block diagram illustrating another example embodiment for generating user interfaces for providing temporal information to users at least partially at a user device.

FIG. 4 is a block diagram illustrating another example embodiment for generating user interfaces for providing temporal information to users at least partially at a user device 102. As shown in FIG. 4, the user device 102 receives some or all of the data feeds 126 and other information 125 directly. User-provided information may also be received directly from the user 103. Based on the received information, the user device 102 generates the user interface. FIG. 5 is a flow chart illustrating one embodiment of a process flow 500 for generating interfaces for providing users with temporal information at least partially with a user device 102. At 502, the user device 102 receives information. At 504, the user device 102 processes the received information, for example, as described herein with respect to 302. At 506, the user device 102 generates the user interface, which is presented to the user 103 via a screen or other display medium of the user device 102. At 508, the user device 102 modifies the interface, for example, based on interface selections made by the user 103 and provided to the user device 102 via a keyboard, touch screen, or other input mechanism of the user device 102.

Figure 6:
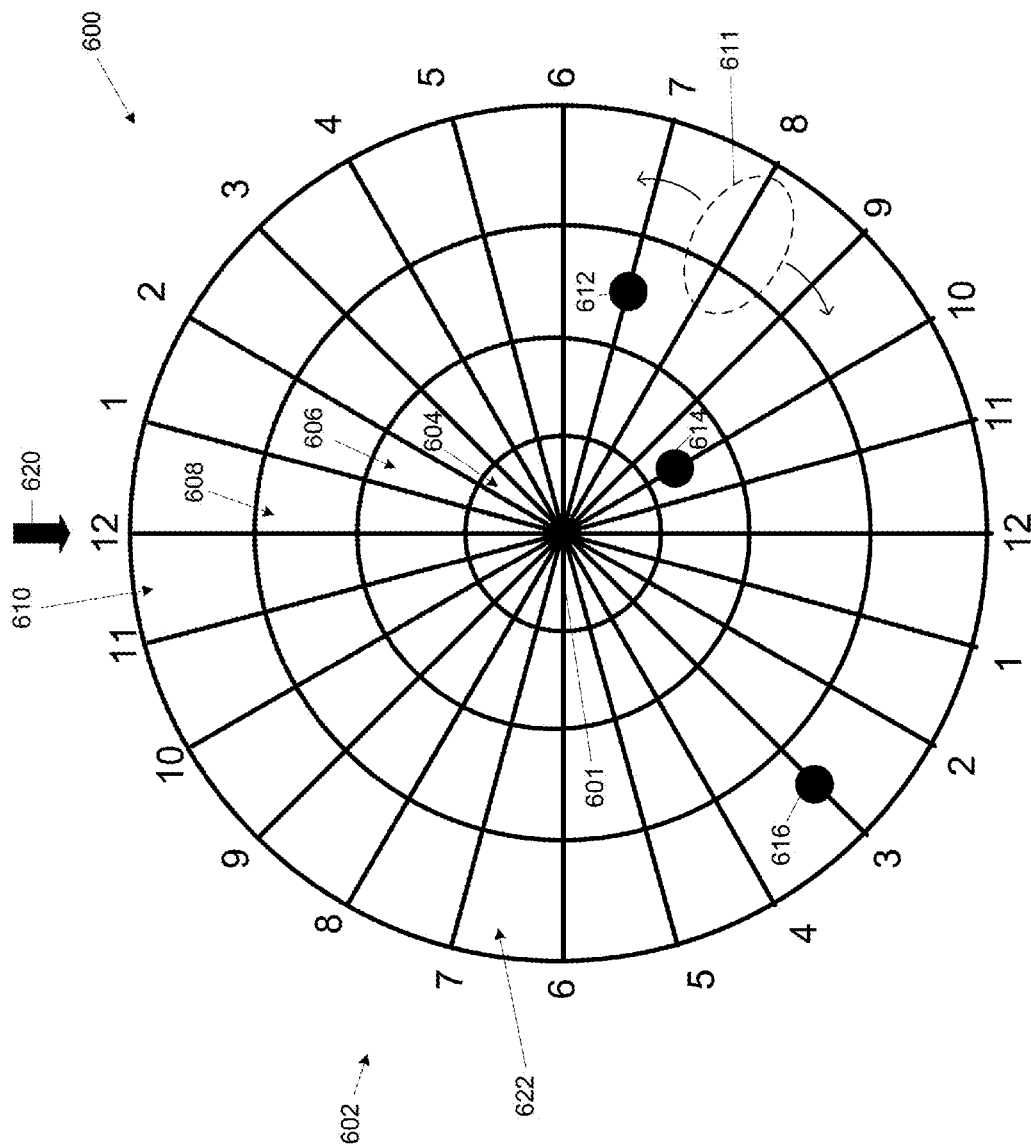
FIG. 6 is a diagram of one embodiment of an interface for providing temporal information to a user.

FIG. 6 is a diagram of one embodiment of an interface 600 for providing temporal information to a user. The interface 600 comprises a two-dimensional shape 602 positioned orthogonal to a center axis 601. With the user point of view shown in FIG. 6, the center axis 601 extends out of the page from the center of the two-dimensional shape 602. The two-dimensional shape corresponds to a time period, with different angular positions on the shape 602 corresponding to different times within the time period. For example, in FIG. 2 the time period is twenty-four hours with each hour corresponding to about 15 degrees. Various icons 612, 614, 616 plotted on the two-dimensional shape 602 represent information items. The position of the respective icons 612, 614, 616 corresponds to times associated with the underlying information item and/or a property of the underlying information item. The angular position of the icons 612, 614, 616 corresponds to a time associated with the underlying information items. For example, icon 612 is positioned at 7 o'clock a.m.; icon 614 is positioned at 10 o'clock a.m. and icon 616 is positioned at 3 o'clock p.m.

The distance of the icons 612, 614, 616 from the center axis 601 indicates properties of the respective underlying information items. In the example of FIG. 6, different distances from the center axis 601 are represented by zones 604, 606, 608. As illustrated, icon 612 is positioned in zone 608, icon 614 is positioned in zone 606, and icon 616 is positioned in zone 610. Each zone 604, 606, 608, 610 corresponds to a different information item property value. In some embodiments, the zones 604, 606, 608, 610 correspond to different types of information items. For example, e-mails may appear in zone 604, social media feeds may appear in zone 606, photographs may appear in zone 608 and commercial offers may appear in zone 610. Also, in some embodiments, the zones 604, 606, 608, 610 may correspond to different levels of relevance. For example, zones 604, 606, 608, 610 may represent decreasing (or increasing) levels of relevance. Information items with high levels of relevance may be represented in zones closer to the center axis 601 than information items with lower levels of relevance. Example methods for determining relevance are described herein below with respect to FIGS. 35 and 55-56.

In various embodiments, the time period represented by the two-dimensional shape 602 is defined relative to a reference time, which may be indicated by a reference time marker 620. The reference time marker 620 is indicated as an arrow in FIG. 6, though it will be appreciated that any suitable marker may be used. For example, in some embodiments, the reference time marker may comprise a hand, similar to the hand of a clock. In the embodiment shown in FIG. 6, the time period is twenty-four (24) hours after the reference time. It will be appreciated, however, that any suitable period may be used.

In various embodiments, the reference time marker 620 may be set (e.g., by the user 103 and/or by the user device 102 or service provider system 104) to a current time. The user 103, however, may be provided with functionality for modifying the reference time. Changes in the reference time may be indicated on the interface 600 by rotating the reference time marker 620 relative to the shape 602. For example, the marker may be rotated around the shape 602 and/or the shape 602 may be rotated about the center axis 601 while the reference time marker 620 remains stationary. When the shape 602 is rotated, the angular positions of the icons 612, 614, 616 are also updated. Changes to the reference time may be made in any suitable manner. For example, the service provider system 104 and/or user device 102 may receive, from the user 103, a textual indication of a new reference time. Also, in some embodiments, the user 103 is provided with functionality for changing the reference time by selecting either the reference time marker 620 or the shape 602 itself and rotating, for example, with a circular motion. For example, FIG. 6 illustrates a reference area 611 that may be selected by the user 103 (e.g., by the user's finger on a touch pad, with a cursor controlled by a mouse or other pointing device, etc.). The user may drag the area in the directions indicated by the associated arrows to rotate the shape 602 and thereby change the reference time. Similarly, in some embodiments, the user 103 may change the reference time by selecting the reference time marker 620 and rotating it about the shape 602. In different implementations, the user 103 may select the interface 600 at any position. The reference area 611 is but a single example of such an area.

Because the time period is defined relative to the reference time, changes to the reference time also bring about changes to the time period represented on the shape 602. This may cause some of the information items corresponding to icons plotted on the shape 602 before the reference time change (e.g., 612, 614, 616) to fall outside of the new time period. These icons may be removed from the shape 602. Changing the time period may also cause new information items to fall within the new time period. These new information items are plotted as icons on the shape 602 in accordance with the new time period. In this way, changing the reference time period may allow the user 103 to view information items that have been and/or will be relevant. For example, if the user 103 changes the reference time to a past time to view information items received in the past. Similarly, the user 103 may advance the reference time to a future time to see appointments or other information items that may be relevant to the user 103 in the future.

Figure 7:
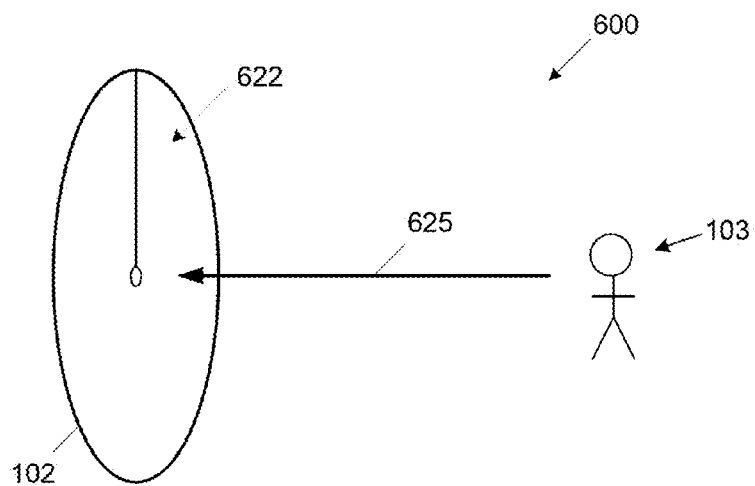
FIG. 7 is a diagram illustrating one embodiment of a user point of view resulting in display of the first face of the shape of the interface shown in FIG. 6.
Figure 8:
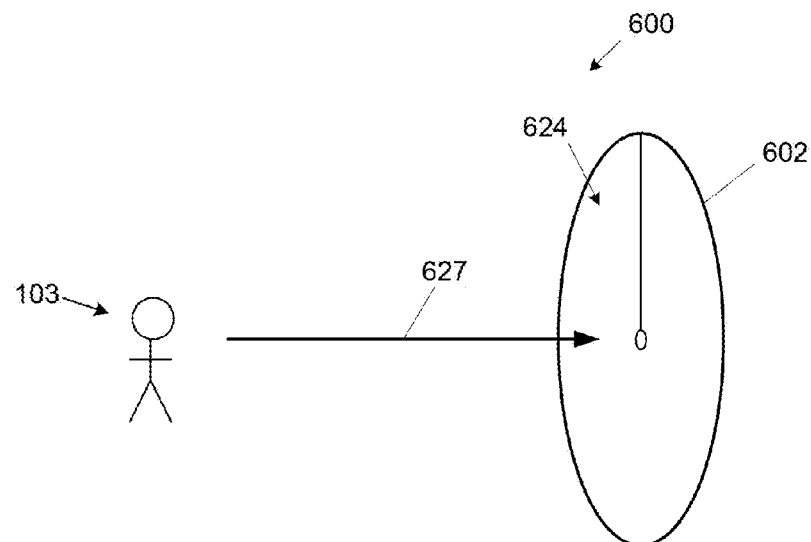
FIG. 8 is a diagram illustrating one embodiment of a user point of view resulting in display of a second face of the shape of the interface shown in FIG. 6.

In some embodiments, the interface 600 is configurable to portray information items both in the past and in the future. For example, the interface 600 may comprise multiple faces, with one face corresponding to time in the past relative to the reference time and another face corresponding to time in the future relative to the reference time. The shape 602 is illustrated in FIG. 6 according to a user point of view showing a first face 622. FIG. 7 is a diagram illustrating one embodiment of a user point of view 625 resulting in display of the face 622 (e.g., similar to the view shown in FIG. 6). FIG. 8 is a diagram illustrating one embodiment of a user point of view 627 resulting in display of a face 624 of the shape 602. In some embodiments, the respective facts 622, 624 may represent different time periods. For example, the face 622 may represent a first time period in the future relative to the reference time. The face 624 may represent a second time period in the past relative to the reference time. In some embodiments, the first and second time periods are contiguous and may meet at the reference time period.

The user 103 may transition the interface 600 between different points of view (e.g., 625, 627) in any suitable manner. For example, the user 103 may provide interface selections 120 indicating a desired point of view change. In response, the user device 102 and/or the service provider system 104 modifies the view of the interface 600 provided to the user 103 as requested. In some embodiments, the interface 600 may be provided by a three dimensional display device (e.g., a holographic projector). In such cases, the user 103 may change his or her point of view by changing his or her physical position relative to the interface 600.

Figure 9:
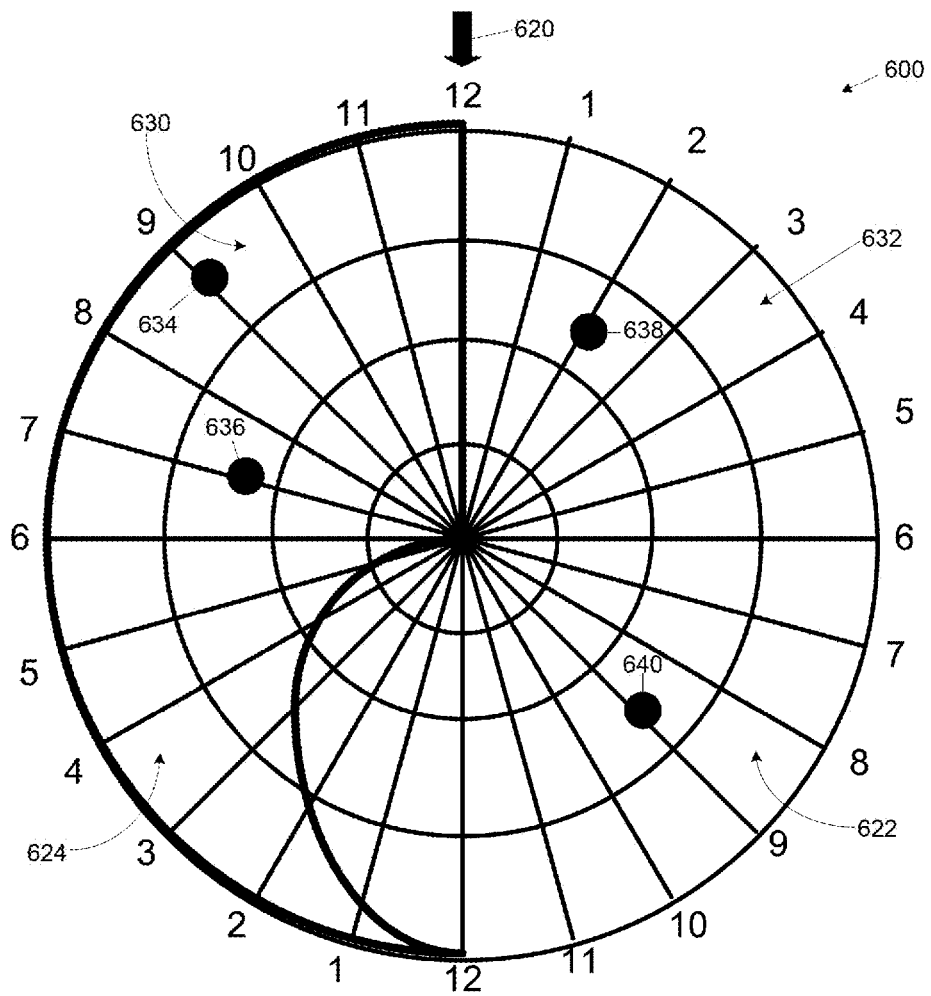
FIG. 9 is a diagram of one embodiment of the interface configured to display different faces corresponding to different time periods from a single user point of view.

In some embodiments, both past and future times are shown from the same user point of view. For example, the interface may show two versions of the shape 602, with one version oriented to display the first face 622 (e.g., corresponding to a future time period) and another version oriented to display the second face 624 (e.g., corresponding to a past time period). Also, in some embodiments, a single version of the shape 602 is shown in a configuration such that the time period corresponding to the shape 602 extends an amount of time before the reference time and an amount of time after the reference time. For example, referring to FIG. 6, the time period may be configured to correspond to twelve (12) hours before the reference time and twelve (12) hours after the reference time. In some embodiments, the shape 602 may be displayed according to a split-view, where one portion of the shape 602 corresponds to the first face 622 (e.g., corresponding to a future time period) and another portion 630 corresponds to the past face 624 (e.g., corresponding to a past time period). FIG. 9 is a diagram of one embodiment of the interface 600 configured to display different faces corresponding to different time periods from a single user point of view. In FIG. 9, the interface 600 is split into a first portion 632 corresponding to the first face 622 and a second portion 630 corresponding to the second face 624. For example, icons 634 and 636, in portion 630, indicate information items in the past relative to the reference time while icons 638, 640, in portion 632, indicate information items in the future relative to the reference time. The respective portions 630, 630 may be of any suitable shape and/or proportion relative to one another.

Figure 10:
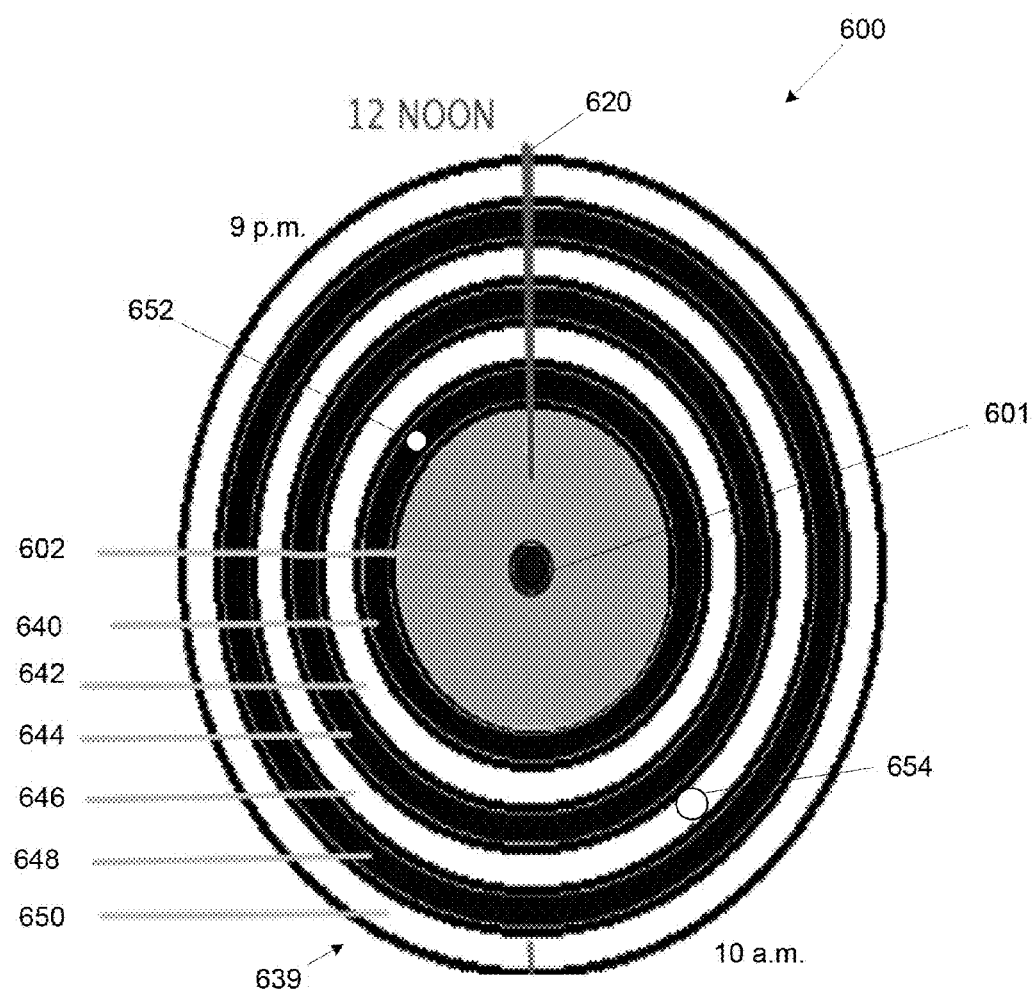
FIG. 10 is a diagram illustrating one embodiment of the interface of FIG. 6 comprising a plurality of rings around the face of the shape.

In some embodiments, the interface 600 may be modified to display additional time periods. For example, FIG. 10 is a diagram illustrating one embodiment of the interface 600 comprising a plurality of rings 639 around the future face 622 of the shape 602. Each of the rings 639 corresponds to a time period either in the future or the past relative to the time period of the face 622. Rings successively farther from the center axis 601 correspond to time periods that are successively farther into the future (or past) than the time period for the face 622. In some embodiments, each of the time periods is of the same length. For example, when the time period corresponding to the face 622 is one day, each of the rings 640, 642, 644, 646, 648, 650 may correspond to successive days such that the interface 600, as shown in FIG. 10, corresponds to one week. Icons 652, 654 representing information items may be plotted on the rings 640, 642, 644, 646, 648, 650 in a manner similar to that described herein with respect to the faces 622, 624. For example, the angular position of the icons 652, 652 corresponds to the information item time for the icon. For example, icon 652 is plotted on the ring 640 closest to the face 622, at an angular position corresponding to 9 o'clock p.m., indicating that the information item for icon 652 will occur one day from the day including the reference time at 9 o'clock p.m. Also, for example, icon 654 is plotted on the ring 646 that is four rings removed from the face 622 at an angular position corresponding to 10 o'clock a.m. This indicates that the information item for icon 654 will occur four days from the day including the reference time at 10 o'clock a.m.

As described with respect to FIG. 6, the user 103 may be provided with functionality to change the reference time, indicated in FIG. 10 by reference time marker 620. In some embodiments, the user 103 may change the reference time by selecting and rotating the shape 602 and/or the reference time marker 620, for example, as described above with respect to the reference area 611. As changes in the reference time occur, the time period corresponding to the shape 622 also changes for the reasons provided above. This may work a corresponding change in the time periods associated with the rings 640, 642, 644, 646, 648, 650. For example, moving the reference time forward in time may cause portions of the ring 640 time period to become part of the shape 622 time period. Accordingly, some icons, such as 652, may transition from the ring 640 to be plotted on the face 622, for example, in the manner described herein above. Although the respective time periods are described with respect to FIG. 10 as one day, it will be appreciated that any suitable time period may be used. Also, although the rings 640, 642, 644, 646, 648, 650 are described in the context of future time periods, it will be appreciated that similar rings representing similar past time periods may be positioned around the past face 624.

Figure 11:
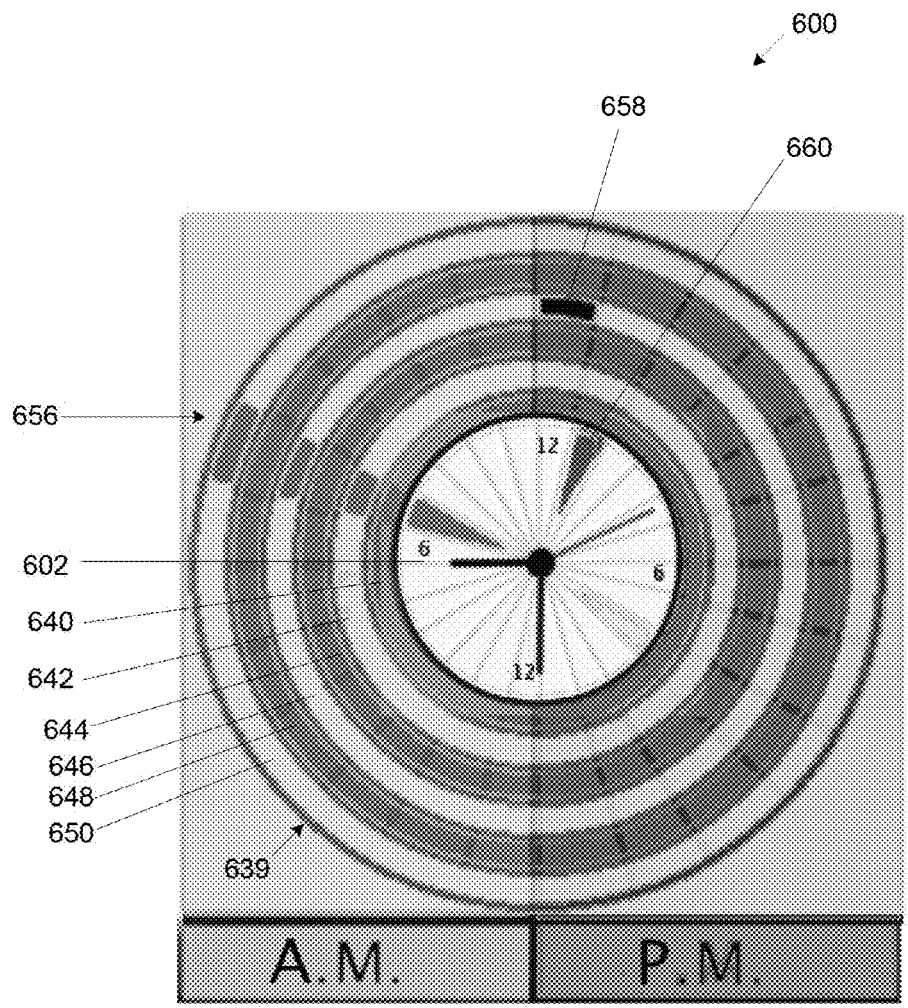
FIG. 11 is a diagram illustrating one embodiment of the interface of FIG. 6 showing rings around the face and illustrating various information items.
Figure 12:
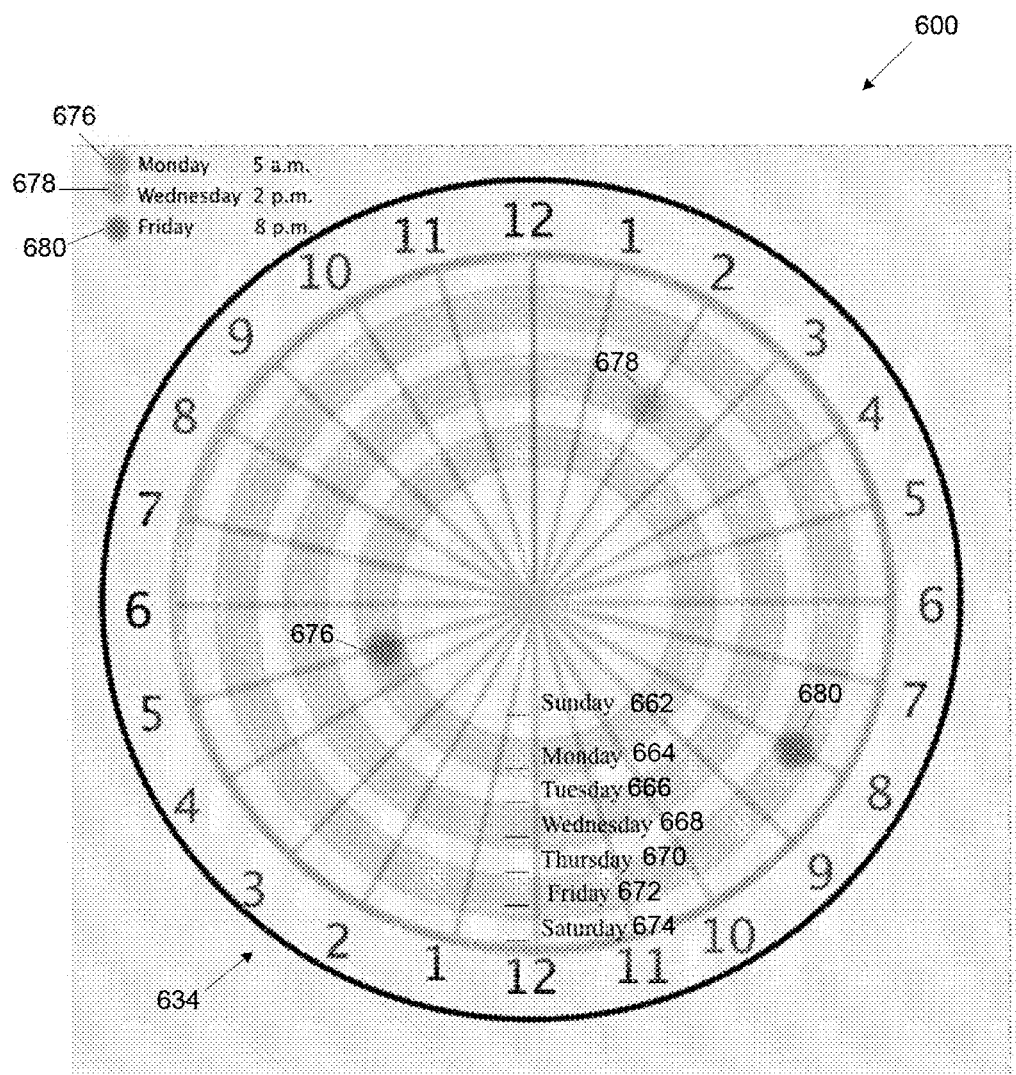
FIG. 12 is a diagram illustrating one embodiment of the interface of FIG. 6 showing rings around the face and illustrating additional information items.

FIG. 11 is a diagram illustrating one embodiment of the interface 600 showing rings around the shape 602 and illustrating various information items. For example, as illustrated in FIG. 11, an icon 650, positioned on the shape 602, corresponds to an appointment for the user 103 at 1 o'clock p.m. on the same day as the reference time. An icon 658 corresponds to an appointment for the user 103 at 12 o'clock p.m. four days after the day including the reference time. A series of icons 656 corresponds to a series of appointments for the user 103 occurring at 7 o'clock a.m. each day. FIG. 12 is a diagram illustrating one embodiment of the interface 600 showing rings around the shape 602 and illustrating additional information items. In FIG. 12, face 662 corresponds to Sunday; ring 664 corresponds to Monday; ring 666 corresponds to Tuesday; ring 668 corresponds to Wednesday; ring 670 corresponds to Thursday; ring 672 corresponds to Friday; and ring 674 corresponds to Saturday. In FIG. 12, icon 676 represents an information item (an appointment for the user 103) at 5 o'clock a.m. on Monday (ring 664). Icon 678 represents an information item at 2 o'clock p.m. on Wednesday (ring 668). Icon 680 represents an information item at 8 o'clock p.m. on Friday (ring 672).

Figure 13:
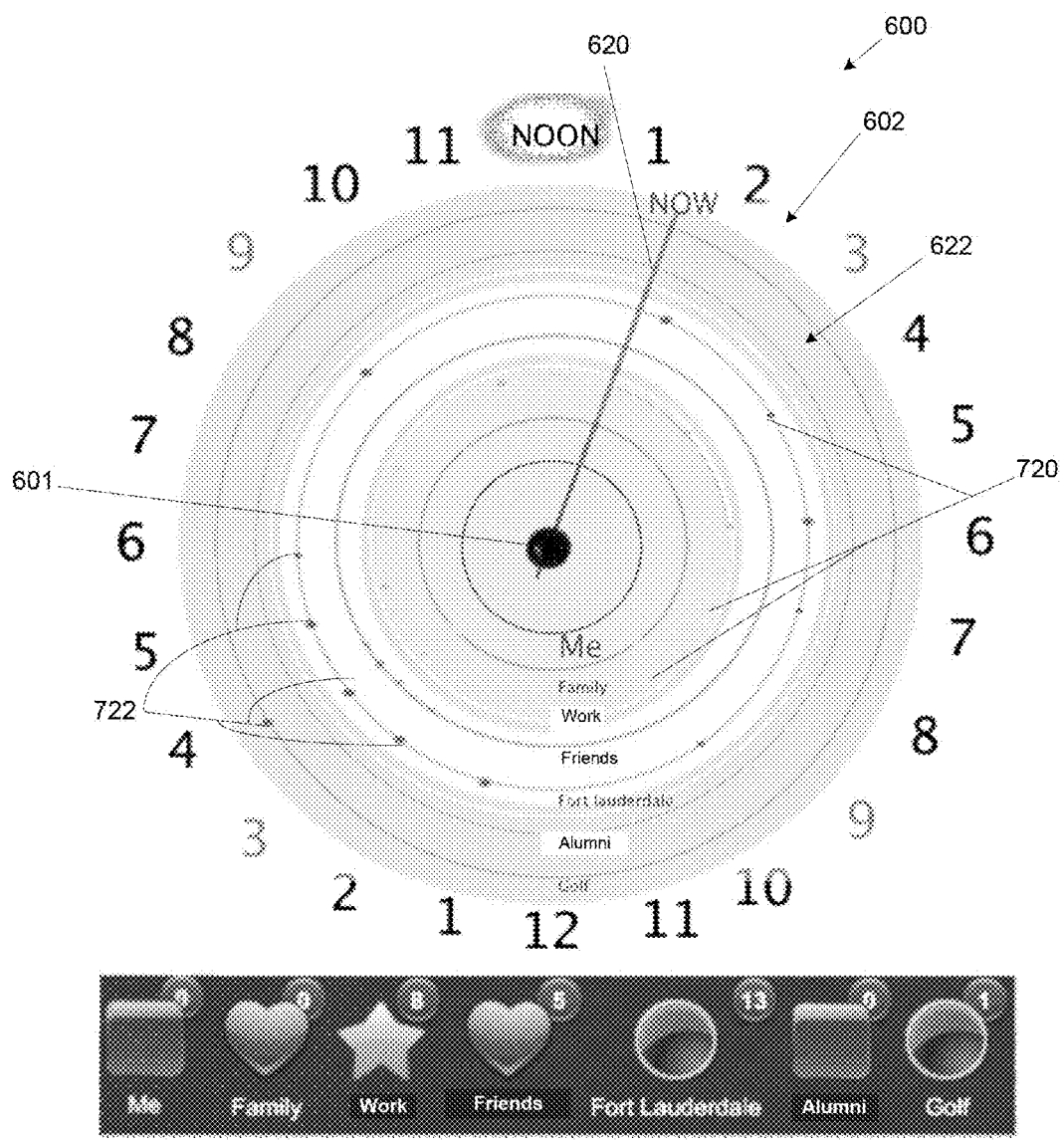
FIG. 13 is a diagram illustrating one embodiment of the interface of FIG. 6 showing an example graphical representation of information item properties on the shape.
Figure 14:
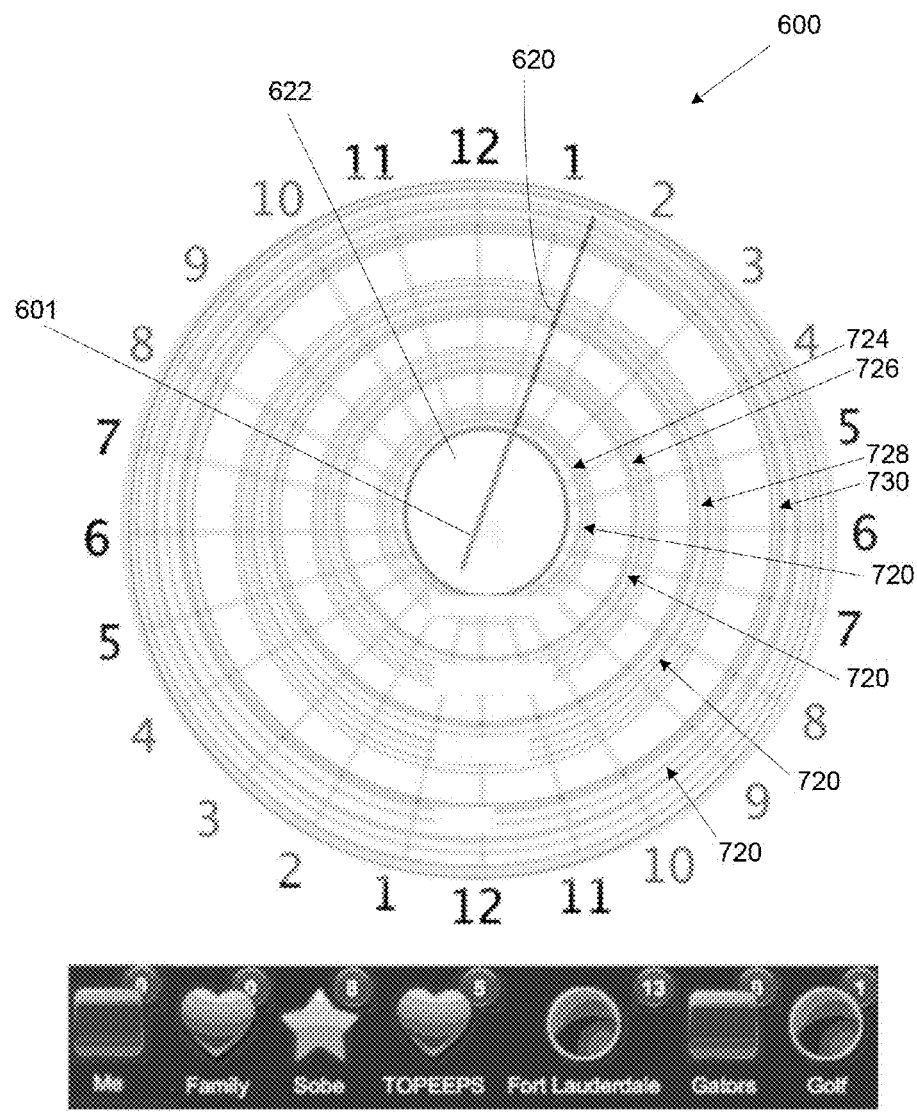
FIG. 14 is a diagram illustrating one embodiment of the interface of FIG. 11 expanded to display additional time periods as rings.

In some embodiments, the distance of the various icons from the center axis 601 within their respective rings indicates a property of the underlying information items, as illustrated in FIGS. 13 and 14. FIG. 13 is a diagram illustrating one embodiment of the interface 600 showing an example graphical representation of information item properties on the shape 602. FIG. 13 does not show rings, however it does show bands 720 on the face 622. Each band 720 is positioned at a different distance from the center axis 601. The bands 720 at which particular icons 722 are plotted indicate properties of the represented information item. In the example of FIG. 13, seven (7) bands are shown, with each band corresponding to other people or groups of people related to the user 103. A Me band corresponds to information items originating from the user 103. A Family band corresponds to information items originating from users who are members of the family of the user 103. A Work band corresponds to information items originating from other users associated with the workplace of the user 103. A Friends band corresponds to information items originating from users that are Friends of the user 103. A Fort Lauderdale band corresponds to information items originating from other users that live in Fort Lauderdale. An Alumni band corresponds to information items from other users that are alumni of a common university, college, or high school. A Golf band corresponds to information items that are from other users who share with the user 103 an interest in golf. The user 103 may determine the other users in each of the bands 720, for example, by providing indications of desired users to the user device 102 and/or service provider system 103. Also, in some embodiments, the user device 102 and/or service provider system 104 may be programmed to automatically generate groups, for example, by parsing information items received by the user 103.

FIG. 14 is a diagram illustrating one embodiment of the interface 600 as displayed in FIG. 13 expanded to display additional time periods as rings 724, 726, 728, 730. Each ring corresponds to a time period. Also, each ring comprises a set of bands 720, where the bands indicate categories similar to the example categories shown in FIG. 13. Icons may be plotted in a particular ring based on the time period associated with the ring. The angular position of icons within the ring may indicate the time of the represented information item. The distance of the icons from the center axis 601 within the selected band ring indicates the category of the represented information item. In some embodiments, the face 622 corresponds to a time period defined with respect to the reference time, indicated by reference time marker 620, with the subsequent rings 724, 726, 728 corresponding to time periods successively further into the future (or past), depending on the configuration of the interface 600. In other embodiments, an outer most ring 730 corresponds to a time period comprising the reference time with rings successively closer to the center axis 601 corresponding to time periods further into the future (or past) depending on the configuration of the interface 600.

Figure 15:
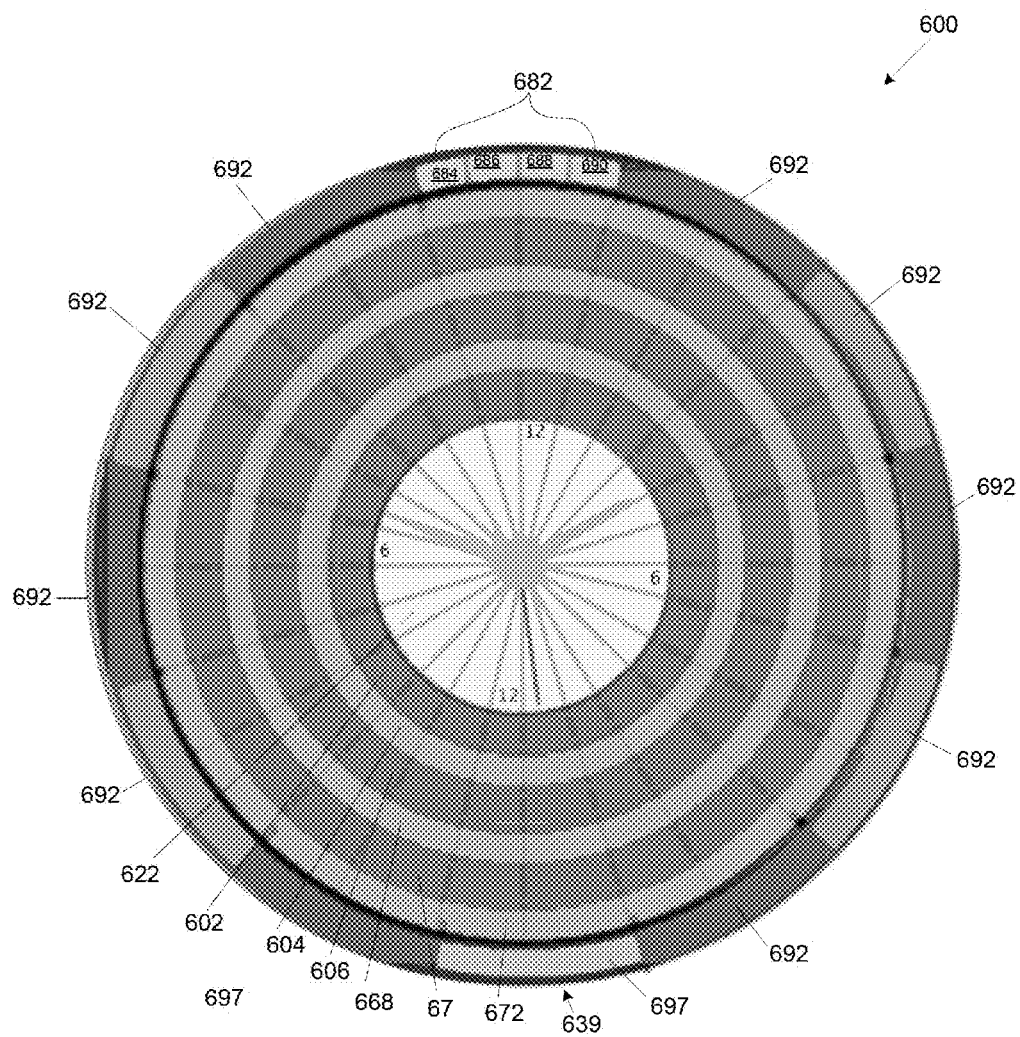
FIG. 15 is a diagram illustrating one embodiment of the interface of FIG. 6 comprising ring sections around the face and rings of FIGS. 11 and 12.

In various embodiments, additional time periods may be added to the interface 600 by adding additional ring sections around either the shape 602 and/or the rings 642, 644, 646, 648, 650. FIG. 15 is a diagram illustrating one embodiment of the interface 600 comprising ring sections around the face 622 and rings 639. Each ring section 692 may correspond to a time period greater than the time periods corresponding to the shape 602 and rings 639. For example, while each of the face 622 and rings 642, 644, 646, 648, 650 may correspond to a day, the various ring sections 692 may correspond to one month. The angular position of the various ring sections 692 may correspond to the proximity of their underlying time periods to the reference time. In some embodiments, ring sections 692 may have sub-sections, such as 684, 686, 688, 690, corresponding to sub-time periods. For example, when the ring section 692 time periods correspond to a month, each sub-section 6784, 686, 688, 690 may correspond to a week within the month. Icons representing information items may be potted in the various ring sections 692 and sub-sections 684, 686, 688, 690 in a manner similar to that described herein with respect to the shape 602 and rings 642, 644, 646, 648, 650.

Figure 16:
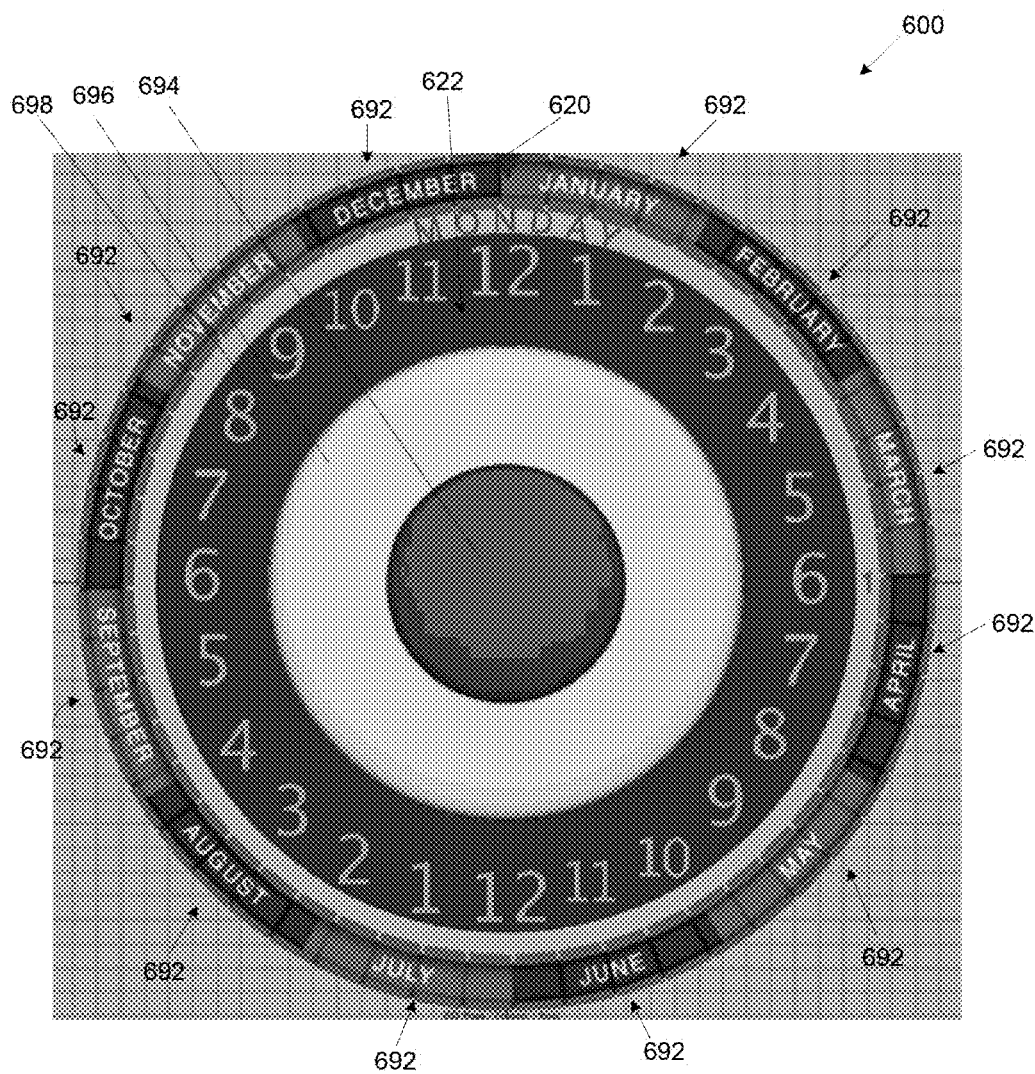
FIG. 16 is a diagram illustrating one embodiment of the interface of FIG. 6 comprising ring sections around the face.

In various embodiments, the time periods associated with rings 692 are of a different scale than those corresponding to the shape 602 and rings 642, 644, 646, 648, 650. Accordingly, when the reference time is changed, the ring portions 692 may rotate at a different speed relative to the reference time than do shape 602 or rings 642, 644, 646, 648, 650. FIG. 16 is a diagram illustrating one embodiment of the interface 600 comprising ring sections around the face 122. For example, in the embodiment of FIG. 16, rings are omitted. FIG. 16 also illustrates regions or bands 694, 696, 698 on the shape 602, for example, similar to the regions 604, 606, 608, 610 described herein. In FIG. 16, each of the ring sections 692 are labeled by month and broken in to four discrete sub-sections, with each sub-section corresponding to one week.

Figure 17:
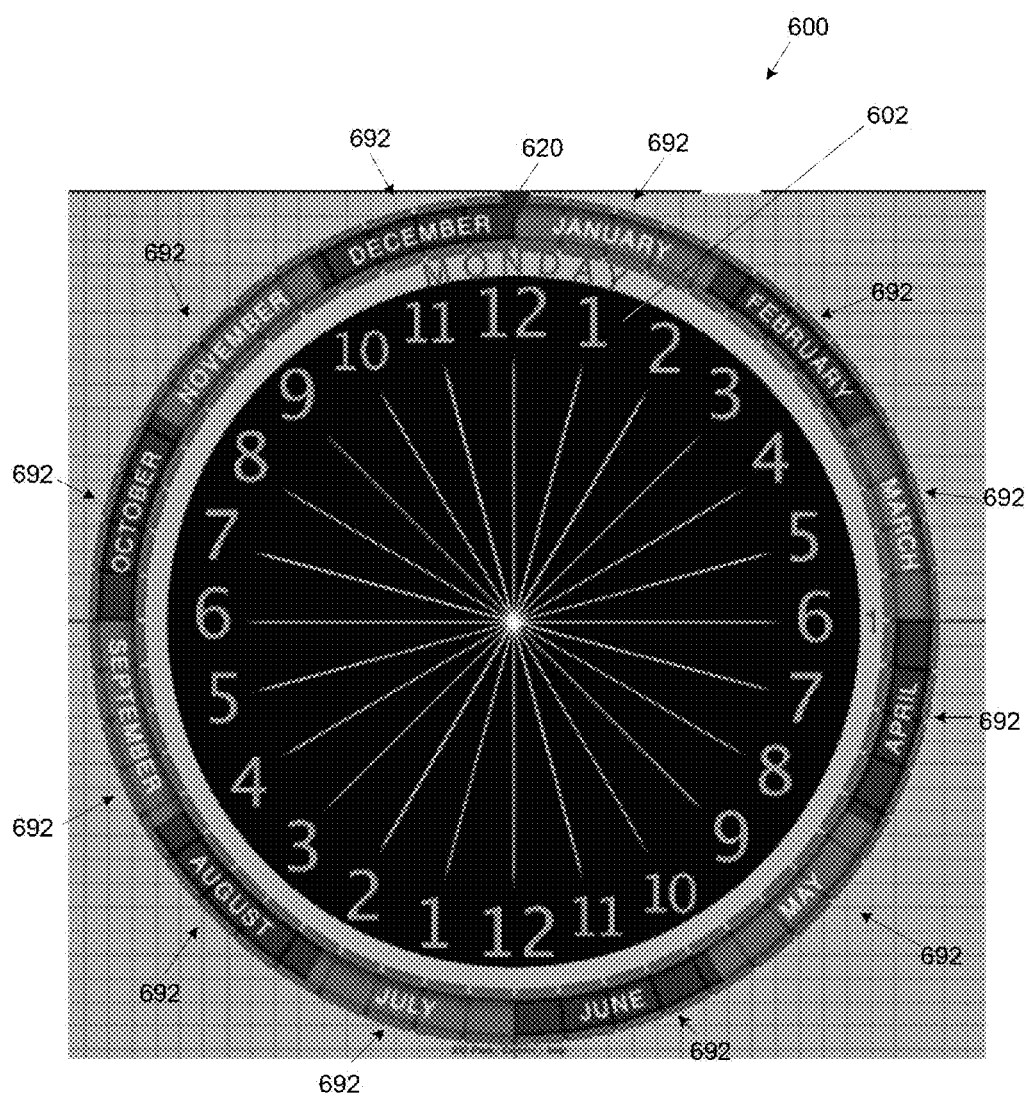
FIG. 17 is a diagram illustrating one embodiment of the interface of FIG. 6 comprising ring sections around the face and omitting rings and regions on the face.
Figure 40:
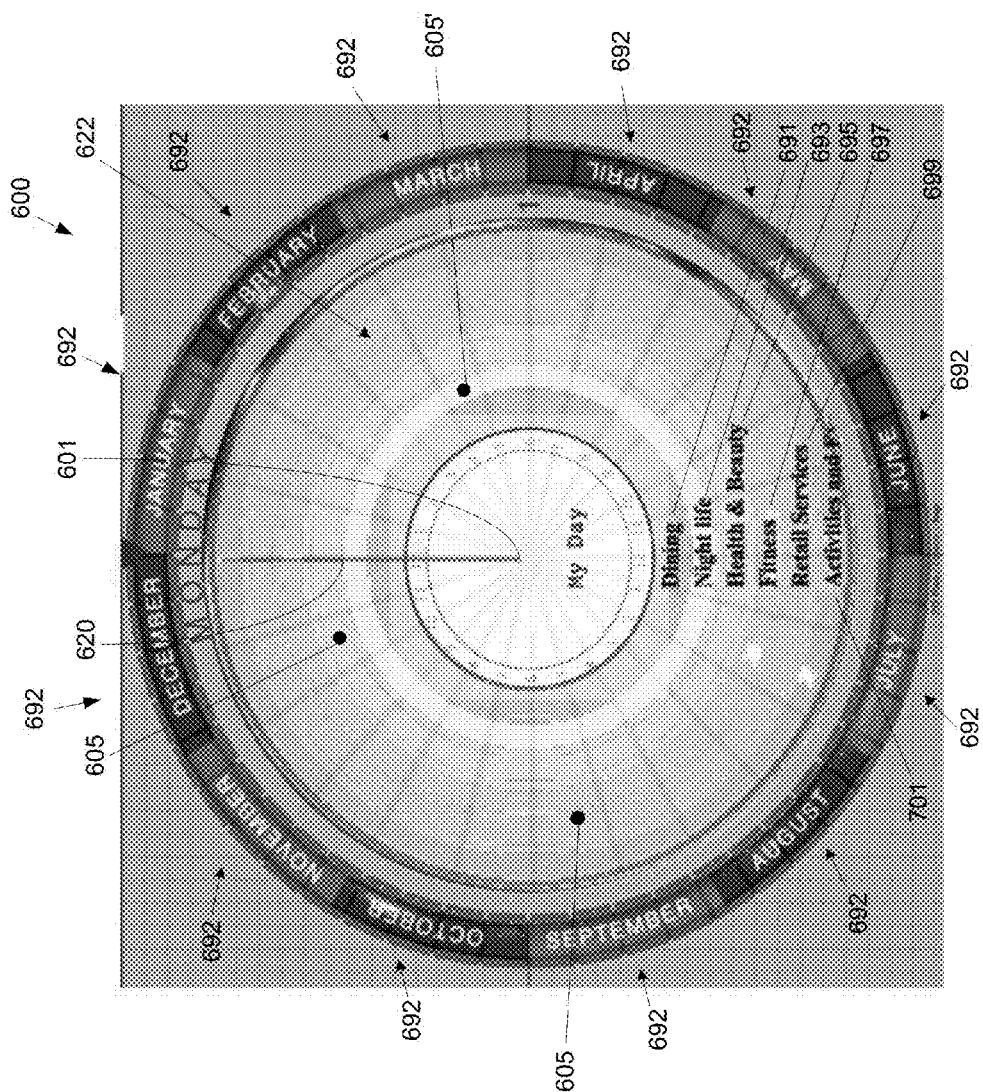
FIG. 40 is a diagram illustrating one embodiment of the interface of FIG. 17 showing bands corresponding to respective information item categories.

FIG. 17 is a diagram illustrating one embodiment of the interface 600 comprising ring sections around the face 122 and omitting rings and regions on the shape 602. FIG. 40 is a diagram illustrating another similar embodiment showing bands 691, 693, 695, 697, 699, 701 corresponding to respective information item categories (e.g., Dining, Night Life, Health & Beauty, Fitness, Retail Services, Activities and Events). Icons representing information items may be placed into one of the bands 691, 693, 695, 697, 699, 701 by category. It will be appreciated that more or fewer categories than are shown may be used.

Figure 18:
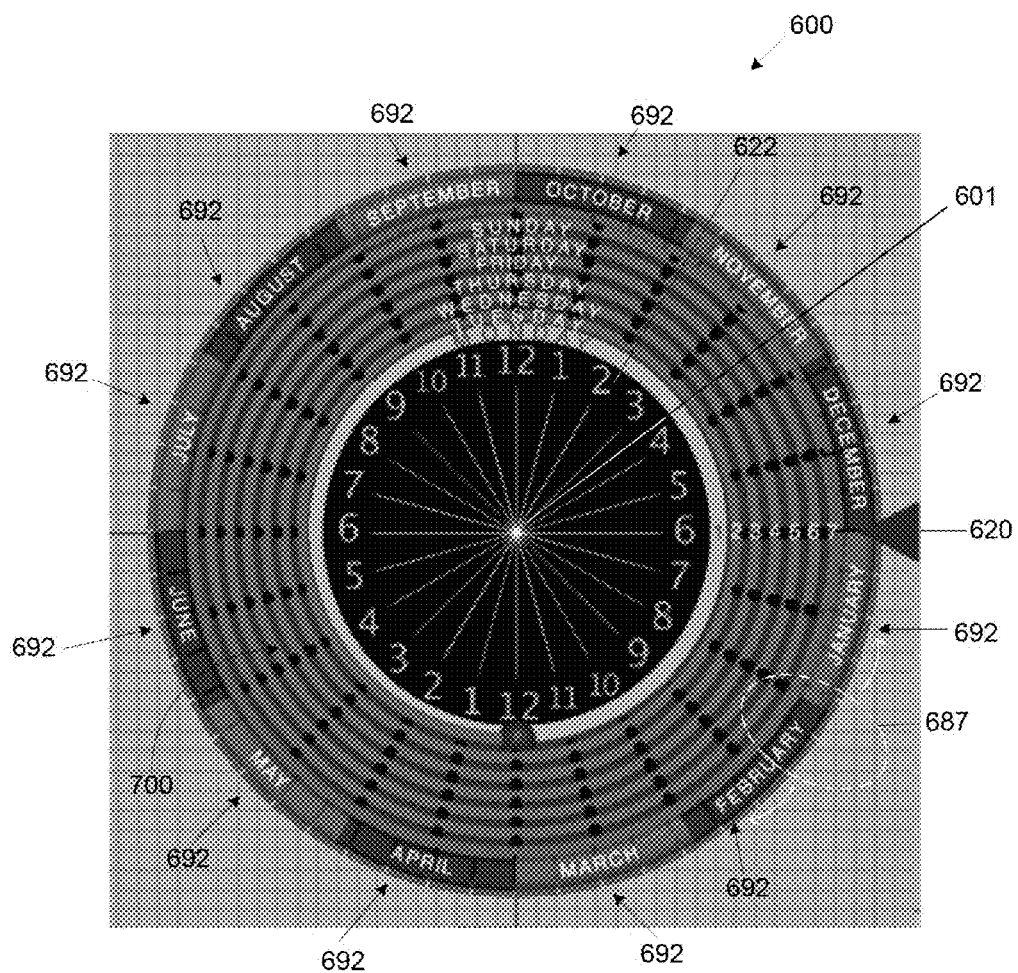
FIG. 18 is a diagram illustrating one embodiment of the interface of FIG. 6 showing an example representation of additional information item properties.

FIG. 18 is a diagram illustrating one embodiment of the interface 600 comprising a ring portion 700 surrounding the shape 602, where the ring section comprises a plurality of spirally bound rings. Although the interface 600 illustrated in FIG. 18 includes ring sections 692, these may be omitted in some embodiments. As described with respect to FIG. 10, each ring of the ring portion 700 corresponds to a time period, such as a day. Because the rings of the ring portion 700 are spirally connected, however, each ring period meets the period before and the period after along the spiral. In the example of FIG. 18, the reference time may be changed by rotating the interface and/or the reference time marker 620. For example, the user 103 may select the reference time marker 620 and/or a portion of the interface 600 and rotate it in a circular motion. An example reference area 687 shows where a user 103 may select the interface 600 (e.g., utilizing a finger on a touch screen or a cursor and pointing device). The user may advance or reverse the reference time by dragging the interface 600 in the directions indicated by the associated arrows. In various implementations, the user 103 may select the interface 700 at other suitable positions and not just at the reference area 687. When the reference time is changed, icons plotted on the ring portion 700, and time periods corresponding to each of the rings, spiral towards or away from the face 622 (depending on whether the face 622 corresponds to a time period that is in the future or the past relative to the reference time). It will be appreciated that the interface 600 as illustrated in FIG. 18 may also comprise an alternate face 624 with corresponding alternate spiral rings 700 so as to show both past and future time periods.

Figure 19:
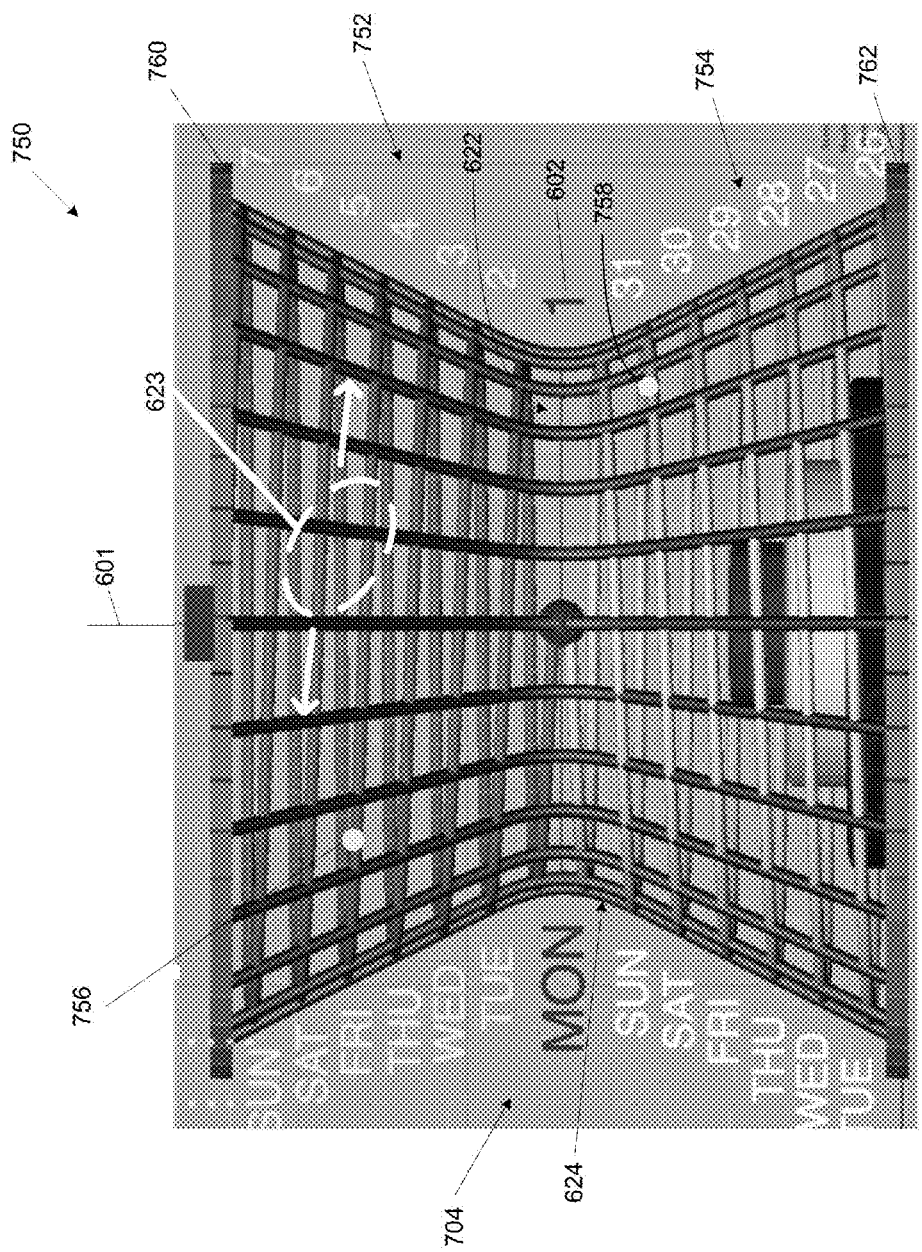
FIG. 19 is a diagram illustrating one embodiment of a user interface for providing temporal information to users comprising a pair of spiral ring portions representing past and future time periods, respectively.

In various embodiments, the spiral ring portion 700 illustrated in FIG. 18 may be represented in three dimensions. For example, rings successively farther from the center axis 601 may be successively higher above the shape 602, forming a conical section. Two such conical sections may be joined, with one representing the future relative to the reference time and one representing the past relative to the reference time. FIG. 19 is a diagram illustrating one embodiment of a user interface for providing temporal information to users comprising a pair of spiral ring portions 752, 754 representing past and future time periods, respectively, joined at a plane 704 comprising the shape 602. The interface 750 may be presented in conjunction with the shape 602, described hereinabove. The shape 602 may be positioned in a plane at a junction between the spiral ring portions 752, 754. The first face 622 of the shape 602 may correspond to a future time period relative to the reference time. The first face 622 is directed towards the first spiral ring portion 752, which may also represent a future time period relative to the reference time. The second face 624 of the shape 602 may correspond to a future time period relative to the reference time and is directed towards the second spiral ring portion 754. The second spiral ring portion 754 may correspond to a past time period relative to the reference time. In various embodiments, may be truncated with ring sections 760, 762 in a manner similar to that described above with respect to the ring sections 792.

It will be appreciated that the interface 750 may be viewed from various different user points of view in addition to the point of view illustrated in FIG. 19. For example, the user 103 may view the interface 750 from a top-down or bottom-up point of view relative to the orientation shown in FIG. 19. From such views, the interface 750 may appear in a manner similar to that of the interface 600 as illustrated in FIG. 18. Icons may be plotted on the interface 750 in a manner similar to that described above with respect to the interface 600. In the example shown in FIG. 19, the time period including the reference time (e.g., represented on the shape 602) is Monday, the $1^{st}$. An icon 756 is plotted in spiral ring portion 752 at a ring corresponding to Friday the $4^{th}$. The angular position of the icon 756 about the center axis 601 indicates the time of day of the represented information item (e.g., a time of day on Friday the $4^{th}$). Similarly, an icon 758 is plotted in spiral ring portion 752 at a ring corresponding to Saturday the $31^{st}$ (e.g., in the past relative to the time period including the reference time). Again, the angular position of the icon 758 indicates the time of day of the represented information item (e.g., a time of day on Saturday the $31^{st}$).

The user 103 may change the reference time for the interface 750 in a manner similar to that described above with respect to the interface 600. For example, the user 103 may provide a textual indication of a new reference time. Also, in various embodiments, the user 103 may select and drag to rotate the interface 750 and therefore also modify the reference time. The manner in which the user rotates the interface 750 may depend on the user point of view from which the interface is viewed. For example, when viewing from a top-down or bottom-up point of view, the user 103 may advance or reverse the reference time as described above with respect to the interface 600. When viewing from other points of view, the user 103 may drag the interface 750 in directions corresponding to the rotation of the faces. For example, FIG. 19 illustrates an example contact area 623 with associated arrows indicating directions that the user 103 may drag the interface 750 to advance and reverse the reference time.

As the reference time changes, the interface 750 may spiral with time represented by the future spiral ring portion 752 spiraling into the shape 602 and subsequently from the shape 602 through the spiral ring portion 752. For example, as the reference time moves forward in time, the icon 765 spirals along its ring about the center axis 601 and down (in the orientation of FIG. 19) towards the shape 602. As described above, the user 103 may move the reference time forwards or backwards in time by selecting the reference time marker 620 or the interface 750 and rotating it with a circular motion. When the reference time reaches a value such that the information item represented by the icon 756 falls within the time period represented by the face 622 of the shape 602, the icon 756 is plotted on the face 622, for example, as illustrated in FIG. 6. For example, while plotted on the shape 602, a distance between the icon 765 and the center axis 601 may indicate a property of the represented information item. When the information item represented by the icon 756 passes into the past relative to the time period corresponding to the face 622, it may be plotted on the face 624 and eventually, on the spiral ring portion 754. When the information item corresponding to the icon 765 passes far enough into the past so as to reach the end of the spiral ring portion 754, it may pass into an appropriate ring section 762 until it falls outside of all time periods represented by the interface 750, at which point it may no longer be displayed.

Figure 20:
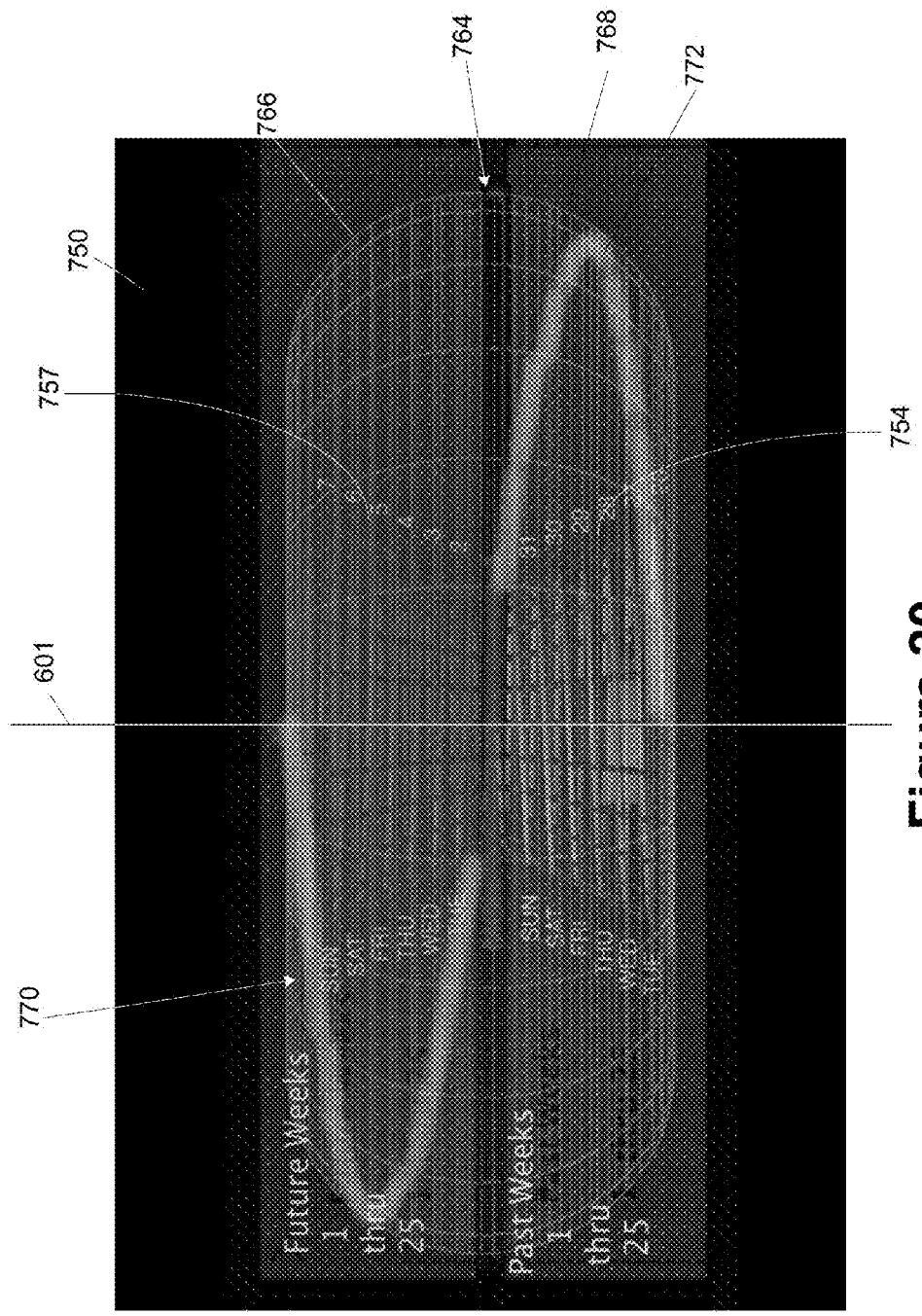
FIG. 20 is a diagram illustrating another embodiment of the user interface of FIG. 19.

In some embodiments, the interface 750, instead of being truncated with ring sections 760, 762, may continue to extent out, comprising portions having time periods that are farther in the past and the future relative to the reference time. For example, FIG. 20 is a diagram illustrating another embodiment of the user interface 750. As illustrated in FIG. 20, the spiral ring portions 752, 754 extend outward to form a three-dimensional shape having an upper portion 766 and a lower port 768. The upper portion 766, like the spiral ring portion 752, corresponds to time periods in the future relative to the reference time. The lower portion 768, like the spiral ring portion 754, corresponds to time periods in the past relative to the reference time. The upper and lower portions 766 and 768 meet at an equator 764. As shown in FIG. 20, the three-dimensional shape is a torus, however, it will be appreciated that any suitable shape may be used.

Icons representing information events are plotted on the surface of the upper and lower portions 766, 768. The time indicated by an icon may be represented by the distance along the surface of the respective portion 766 between the icon and the inner-most edge of the portion (e.g., the interface between the spiral ring section 752 and the shape 602). In some embodiments, the time indicated by an icon may also be represented by the angular position of the icon about the center axis. For example, as the reference time advances, icons may follow a spiral pattern across the surface of the portions 766, 768, as indicated by spiral 770, 772. For example, the effect of incorporating the spiral ring portions 752, 754 into the respective shape portions 766, 768 may be similar to expanding the spiral ring portions 752, 754 out and around until they meet at the equator 764.

Figure 21:
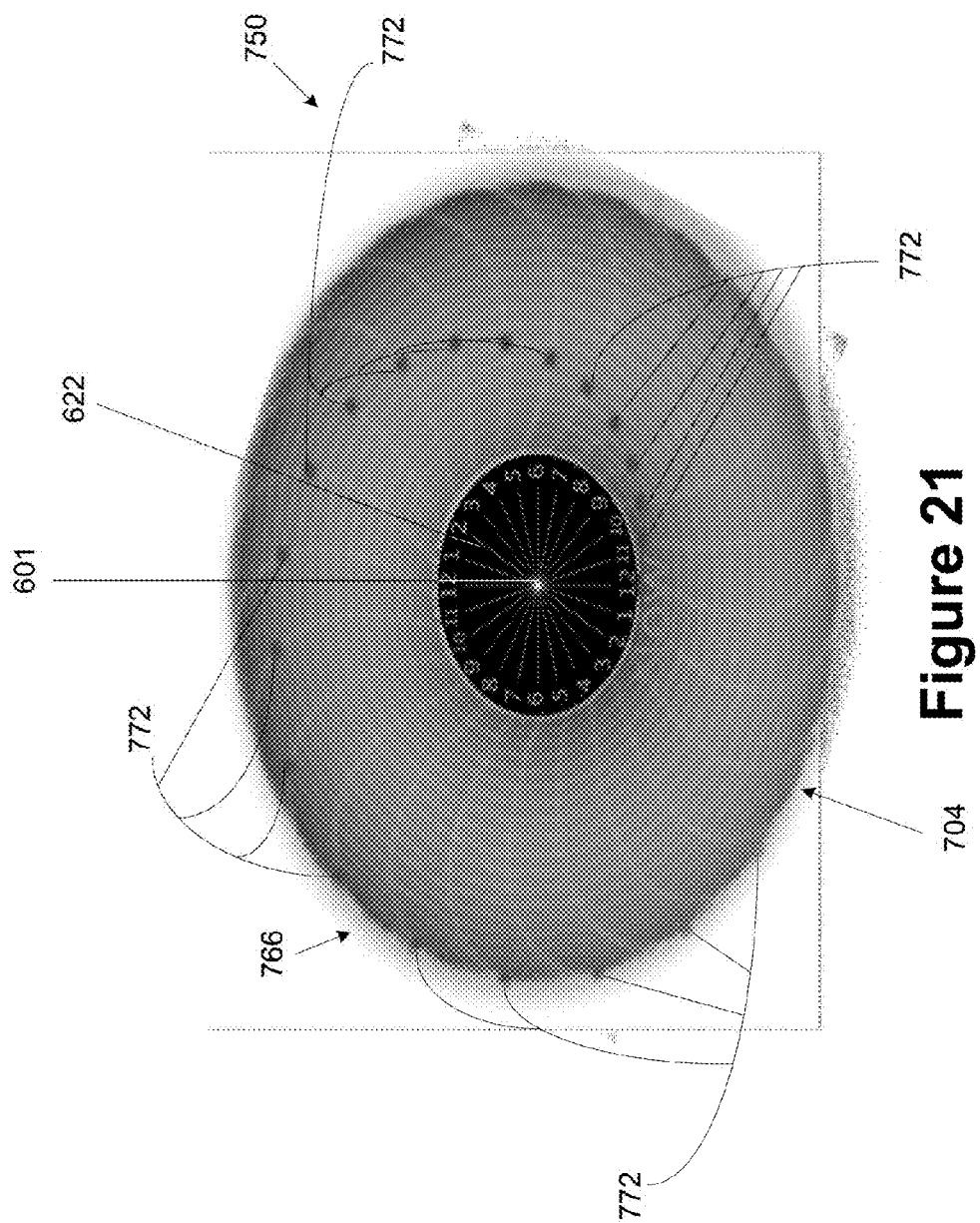
FIG. 21 is a diagram illustrating another embodiment of the interface FIG. 20 from a user point of view looking down at the center axis.
Figure 22:
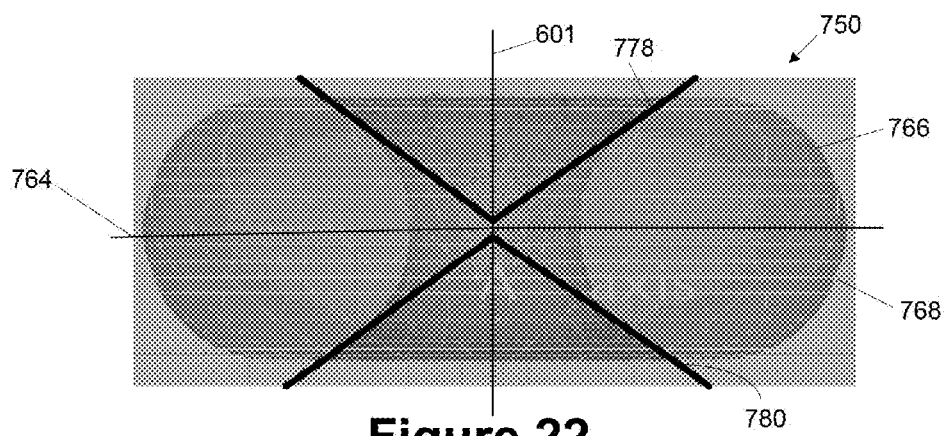
FIGS. 22-26 are diagrams showing various views of the interface and further illustrating the motion of icons across the interface of FIG. 20 as the reference time advances.

FIG. 21 is a diagram illustrating another embodiment of the interface 750 from a user point of view looking down at the center axis 601. FIG. 21 illustrates an example method for plotting information event icons on the shape portion 766. For example, FIG. 21 shows various positions of an example icon 772. When it is far in the future, the icon 772 is positioned near the equator 764. As the reference time advances forward, the icon 772 rotates about the center axis 601 and traverses towards the center axis 601. When the icon 772 reaches a point in space and time corresponding to an interface with the face 622, it may be plotted on the face 622 as described herein above. Once the reference time has advanced such that the time associated with the icon 772 is in the past relative to the time period represented by 622, then it may be plotted on the opposite face 624 and may subsequently spiral along the lower portion 768 until it reaches the equator 764, at which point it may be removed from the interface.

Figure 43:
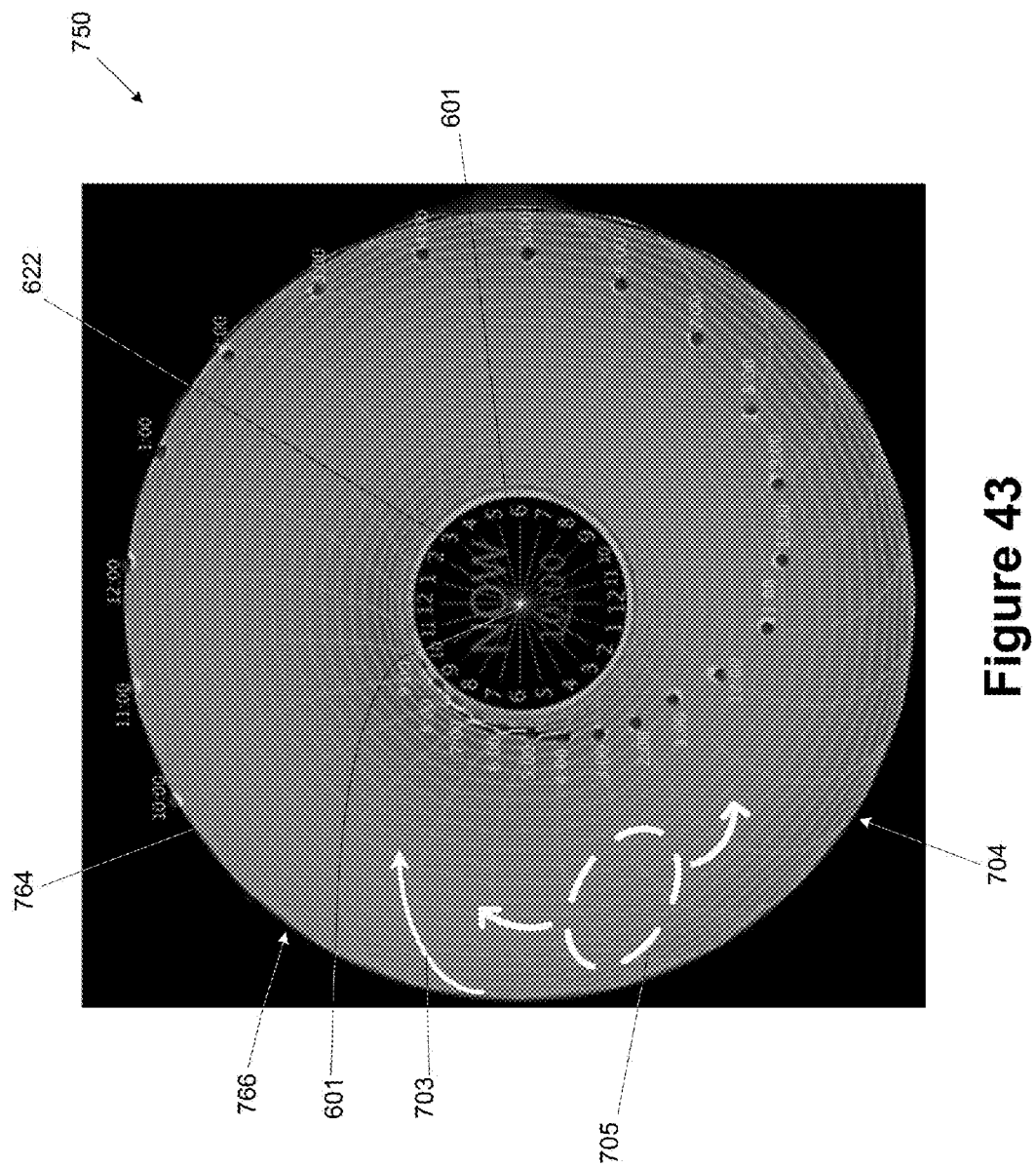
FIGS. 43-47 are diagrams illustrating the interface as illustrated in FIG. 21 further illustrating the example spiral motion of icons as time passes.

FIGS. 43-47 are diagrams illustrating the interface 750 as illustrated in FIG. 21 to further illustrate the spiral motion of icons as time passes. Referring specifically to FIG. 43, each icon is labeled with its corresponding time. Times on the surface of the upper shape portion 766, as shown, spiral away from the face 622, while maintaining time alignment with the hours indicated on the face 622. As the reference time advances or reverses, the face 622 may remain stationary. Accordingly, the various icons may move towards the center axis 601 and face 622 while maintaining their angular position relative to the face. This motion may be described as a rotation of the surface of the shape portion 766 in the direction of the arrow 703. In some embodiments, this motion is also described as rotation of the surface of the portion 622 about the axis 782, illustrated in FIG. 25 and described below. In such configurations, the user 103 may advance or reverse the reference time, for example, by selecting the interface 750 (e.g., at example reference area 705) and pushing or pulling the interface 750 towards or away from the center axis 601.

FIGS. 44-47 show the interface 750 as the reference time advances, and showing a constant stream of icons, regularly positioned in time. In the example of FIGS. 44-47, the face 622 and shape portion 766 represent past time, so as the reference time advances, icons generally track away from the center axis 601. Also, some icons may be plotted on the face 622. For example, as an item passes into the past, it may be plotted on the face 622 for 24 hours (or any other suitable time period) until it transitions off of the face 622 and traverses the surface of the shape portion 766 away from the axis 601, as illustrated. It will be appreciated that the concepts demonstrated with respect to FIGS. 44-47 are adaptable to an embodiment where the face 622 and shape portion 766 represent future time (relative to the reference time) by reversing the direction of rotation.

Figure 44:
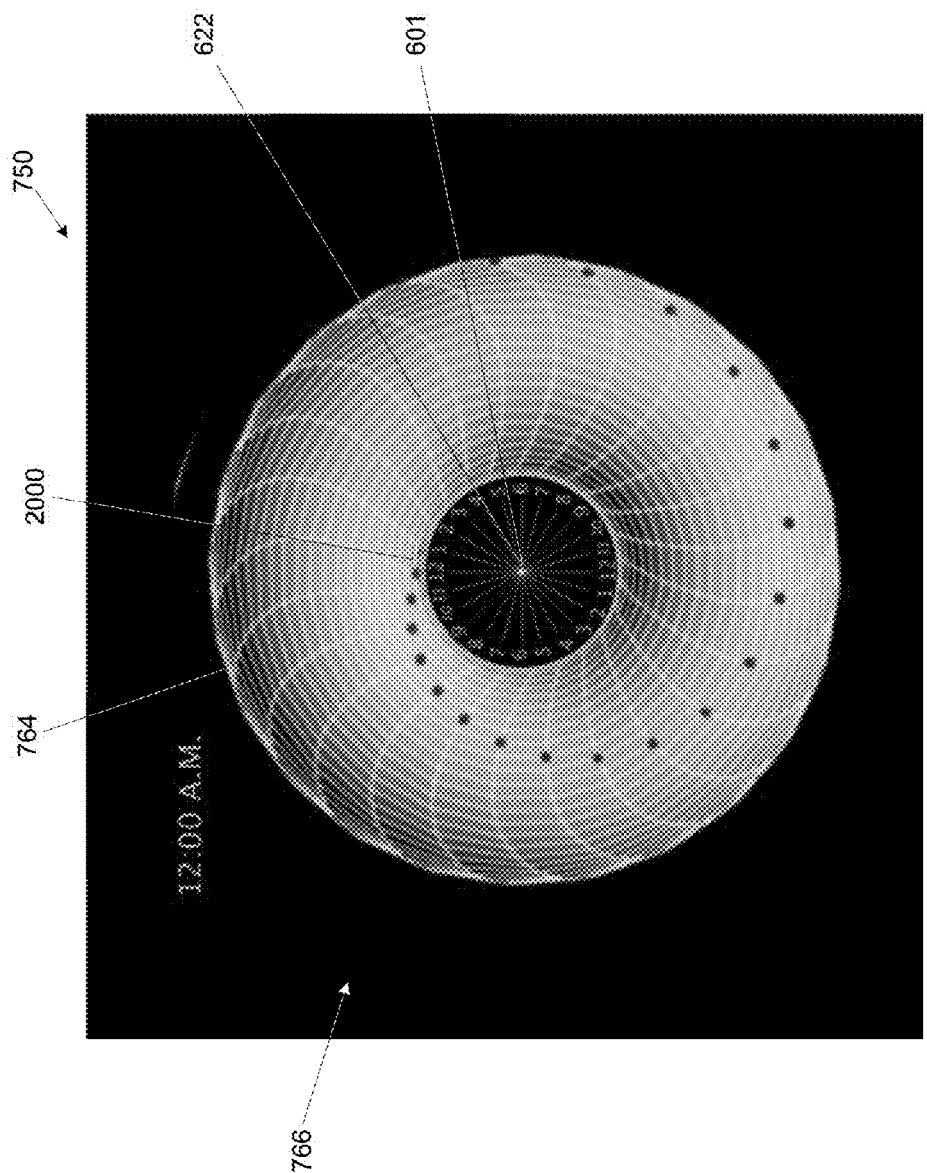
Figure 45:
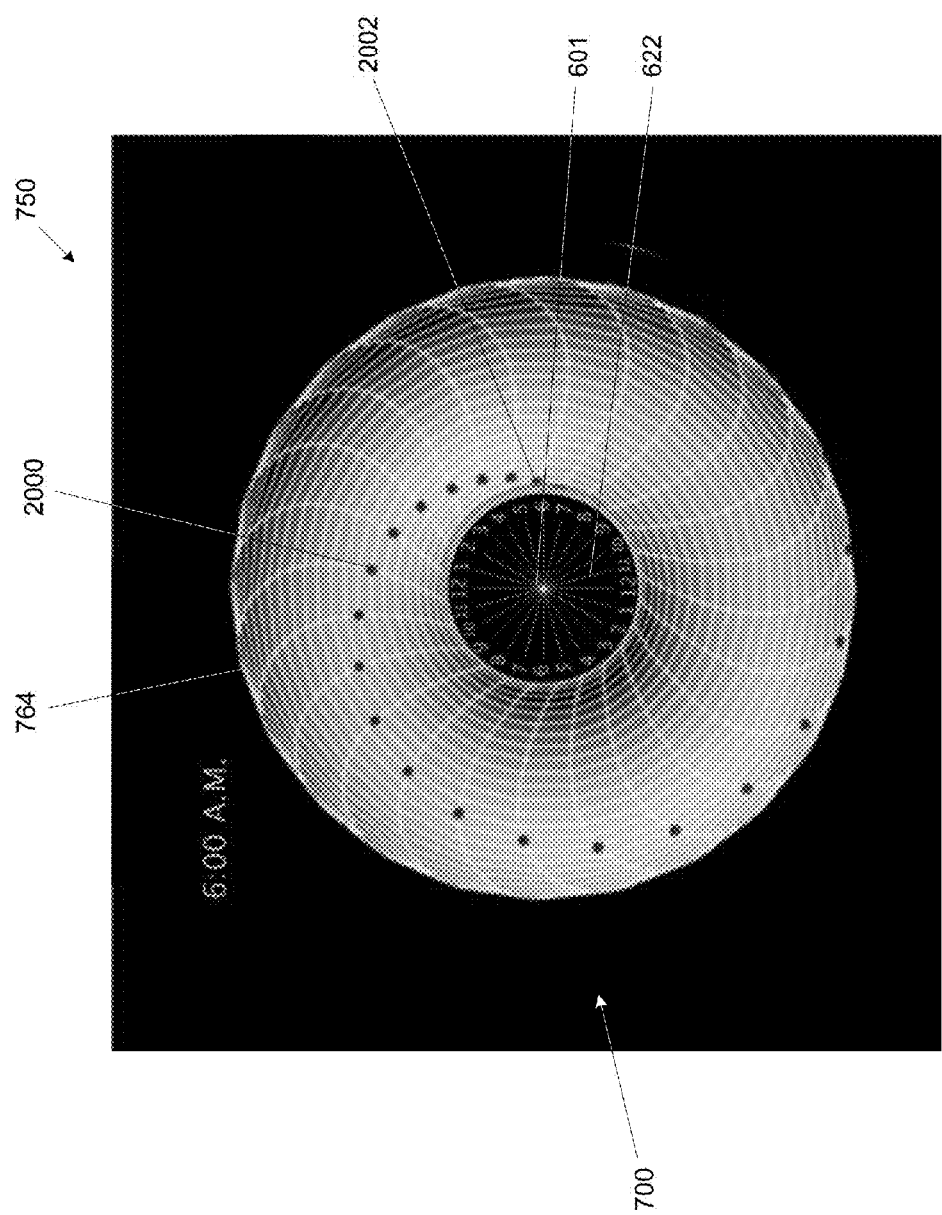
Figure 46:
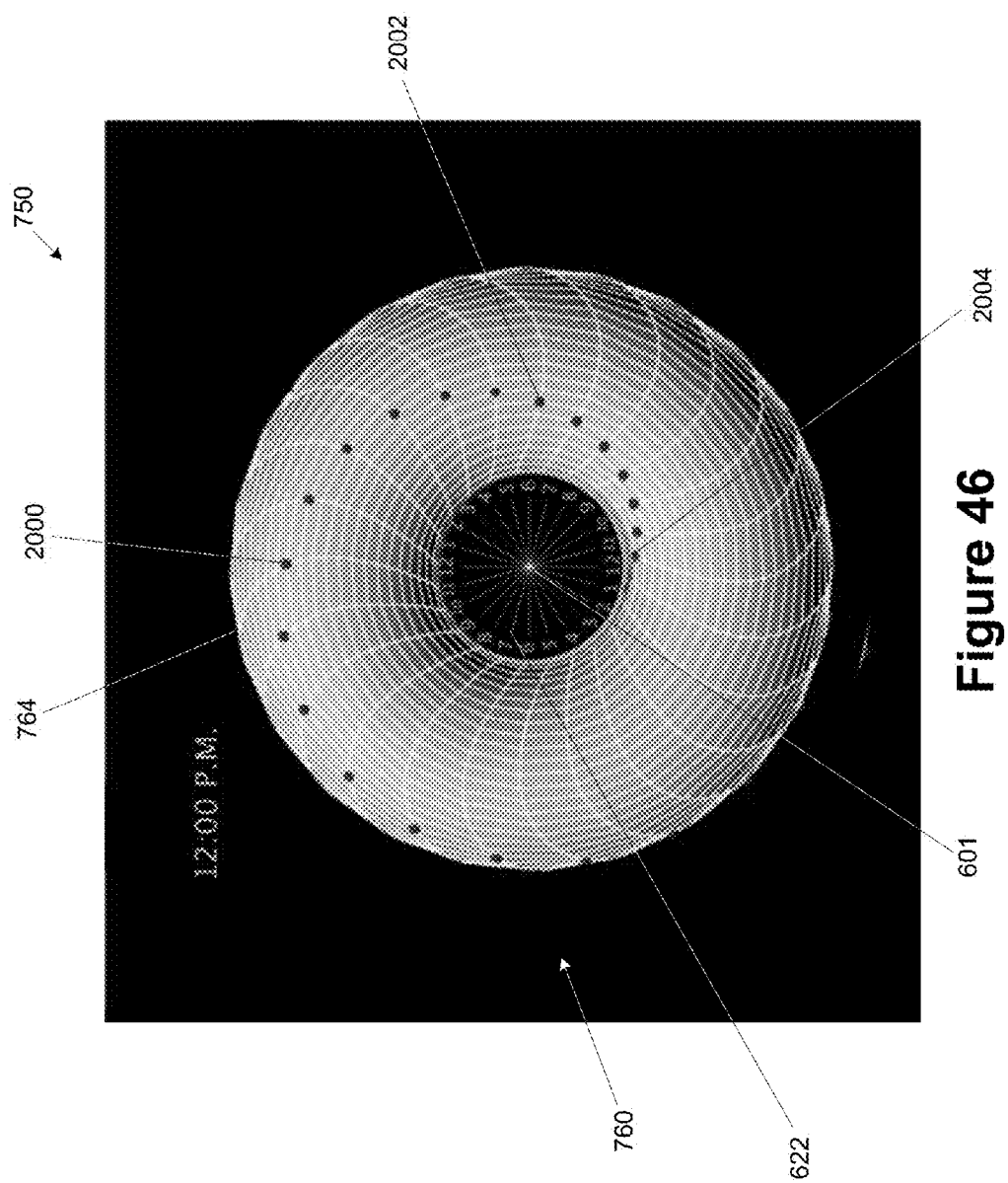
Figure 47:
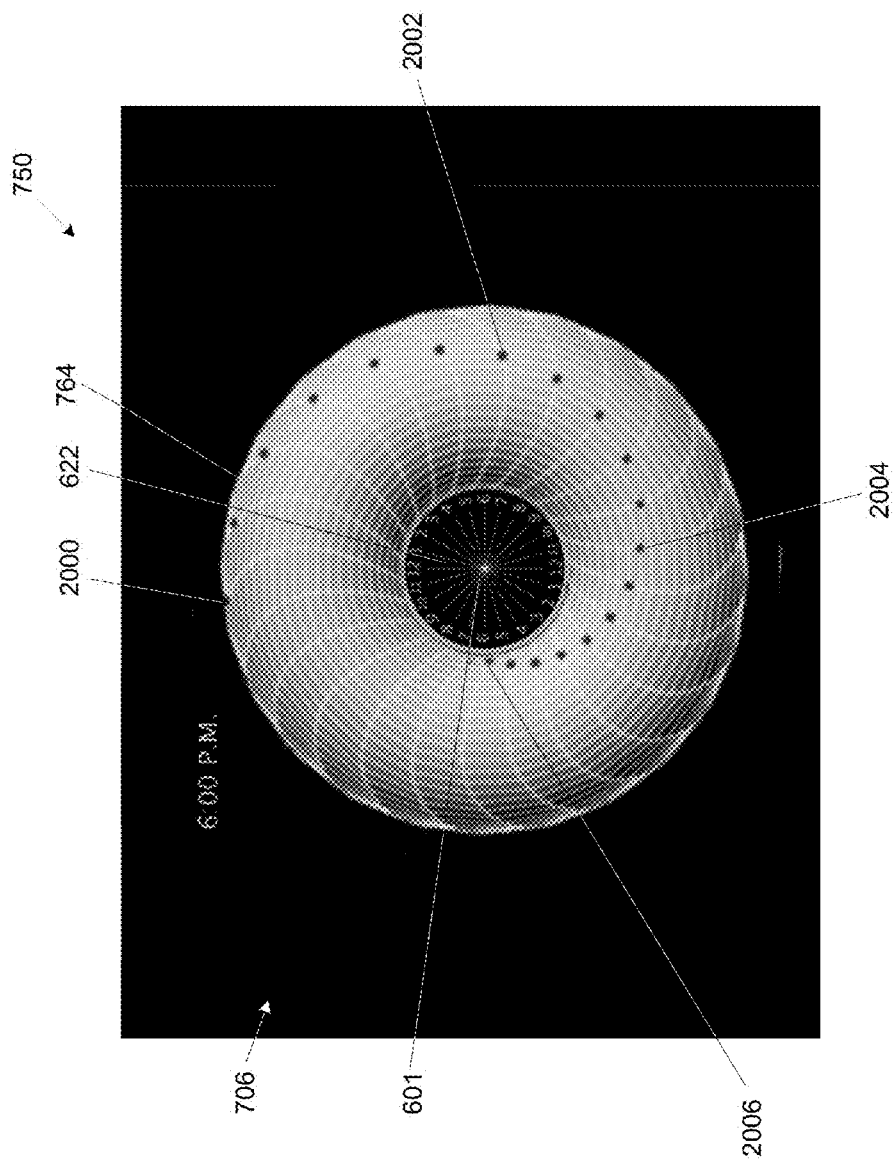

Referring now to FIG. 44, the interface 750 is shown corresponding to a first reference time such that the transition point between the face 622 and the shape portion 766 is at 12:00 a.m. An icon 2000 represents an information item corresponding to 12:00 a.m. As illustrated, the icon 2000 has transitioned off of the face 622 and is positioned on the shape portion 766. In FIG. 45, the interface 750 is shown corresponding to a second reference time such that the transition point between the face 622 and the shape portion 766 is at 6:00 a.m. The icon 2000 shown in FIG. 44 has now traversed towards the equator 764 of the shape portion 766. A new icon 2002 represented an information item at 6:00 a.m. has transitioned off of the face 622 and is positioned on the shape portion 622. In FIG. 46, the interface 750 is shown at a third reference time such that the transition point between the face 622 and the shape portion 766 is at 12:00 p.m. As illustrated, the icon 2000 has continued to progress towards the equator 764 of the shape portion 766, as has the icon 2002. A new icon 2004 represented an information item at 12:00 p.m. has transitioned off of the face 622 and is positioned on the shape portion 622. In FIG. 47, the interface 750 is shown at a fourth reference time such that the transition point between the face 622 and the shape portion 766 is at 6:00 p.m. As illustrated, the icons 2000, 2002, 2004 have transitioned towards the equator 764 of the shape portion 766. A new icon 2006 representing an information item corresponding to 6:00 p.m. has transitioned off of the face 622 and is positioned on the shape portion 622. In some embodiments, the face 622 may be omitted. Also, in some embodiments, the face 622 may rotate as the reference time is changed. Accordingly, the icons 200, 2002, 2004, 2006 may rotate about the center axis 601 to maintain their angular position relative to the rotating face 622.

Figure 23:
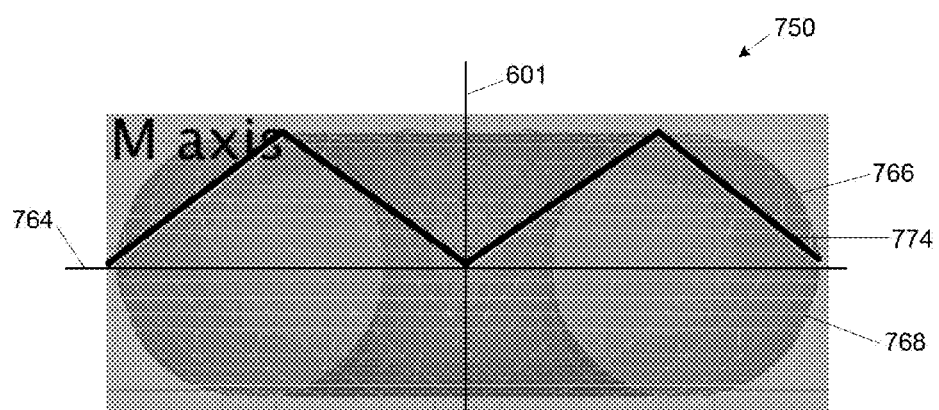
Figure 24:
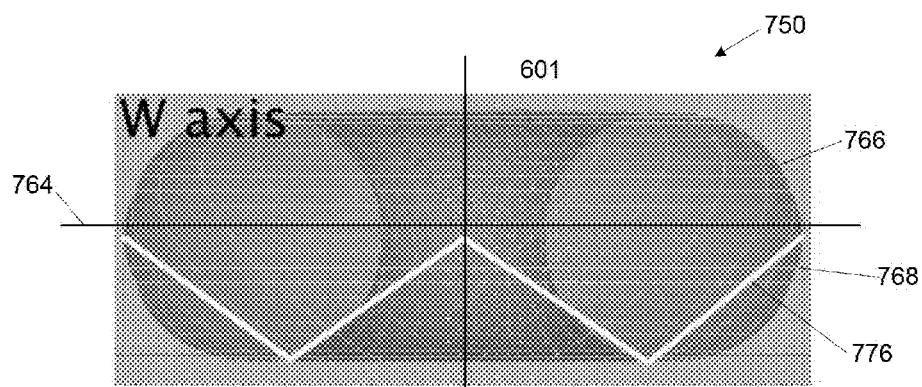
Figure 25:
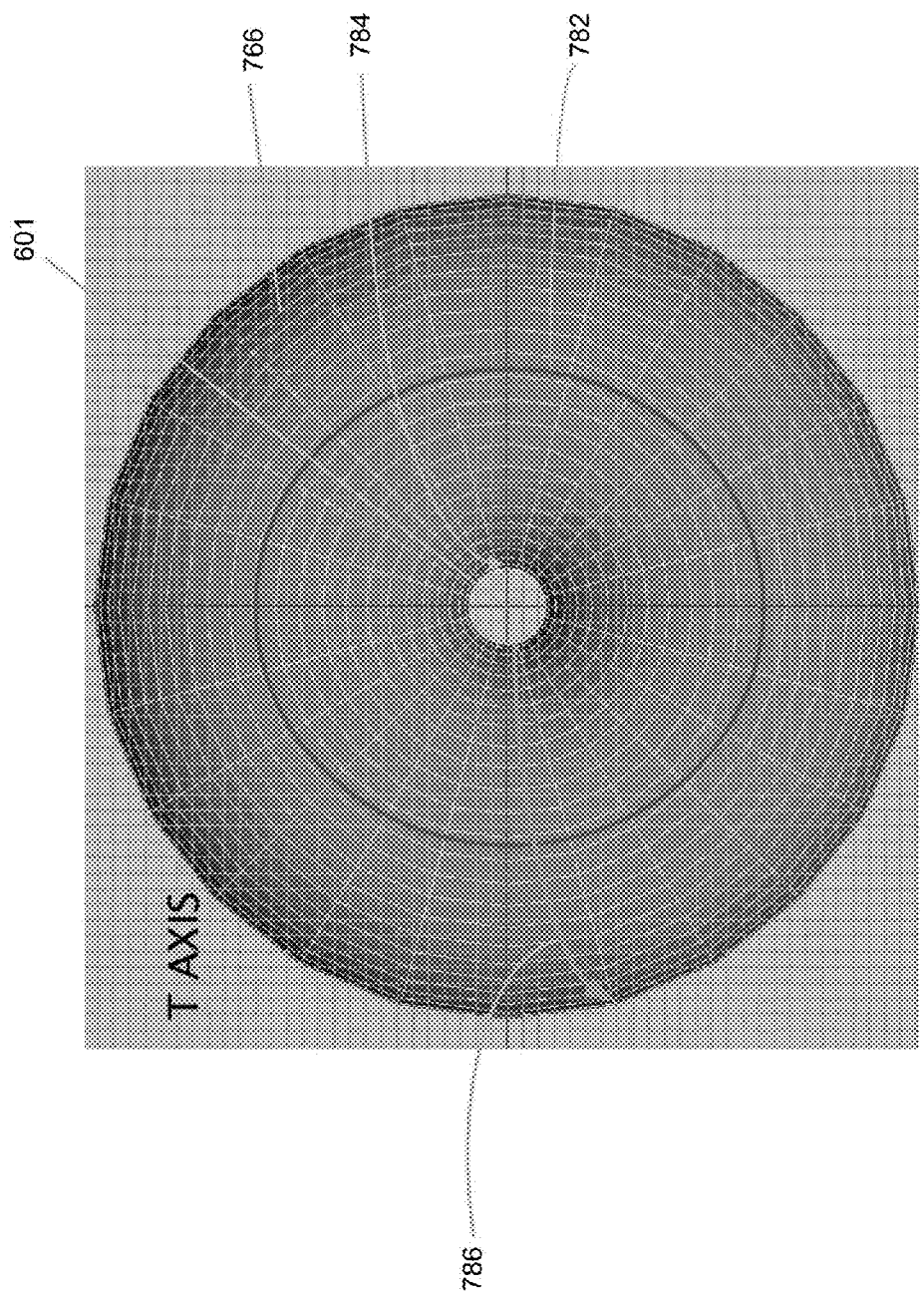
Figure 26:
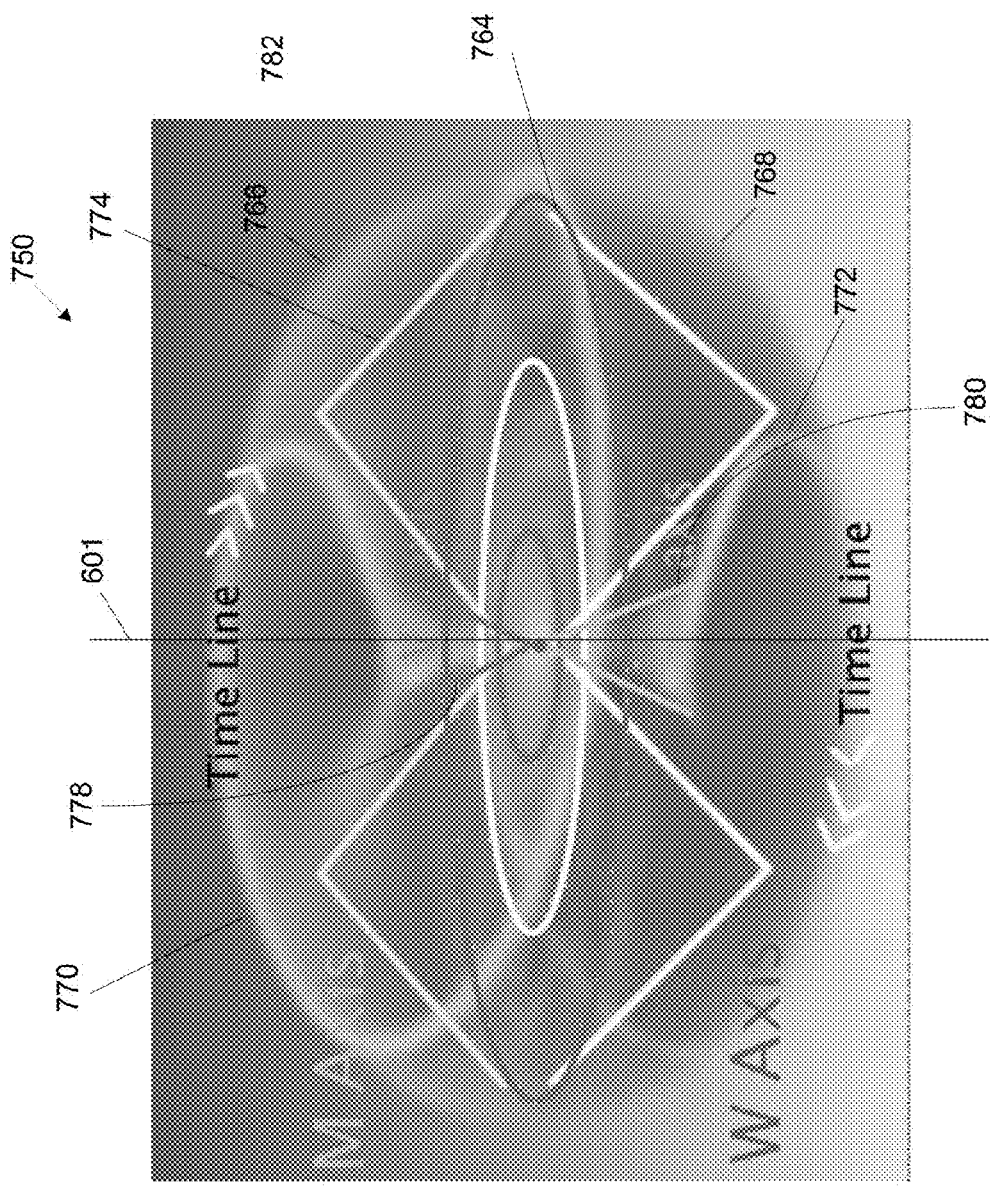

FIGS. 22-26 are diagrams showing various views of the interface and further illustrating the motion of icons across the interface 750 of FIG. 20 as the reference time advances. Referring to FIG. 23, the torus is shown bisected along a plane perpendicular to the plane including the equator 764. FIG. 23 shows an axis 774. The axis 774, roughly, follows the surface of the shape portion 766 and roughly illustrates the path than icons take across the surface of the portion 766 as the reference time advances forwards and backwards. For example, as the reference time advances forwards in time, icons travel from the equator 764 towards the center axis 601 along the surface of the portion 766 in a direction indicated by the axis 774. When the reference time is moved backwards in time, icons travel along the surface of the portion 766 towards the equator 764. FIG. 24 shows a similar axis 776 that, roughly, illustrates the path that icons take across the surface of the shape portion 768. For example, as the reference time advances forwards in time, icons travel towards the equator 764 away from the center axis 601 along the surface of the portion 766 in a direction indicated by the axis 774. When the reference time is moved backwards in time, icons travel along the surface of the portion 766 away from the equator 764 and towards the center axis 601. FIG. 23 illustrates additional axes 778, and 780, which similarly illustrate the movement of icons, for example, at the spiral ring portions 752, 754, as described herein above. FIG. 25 illustrates an additional axis 782 that may run around the torus about the center axis 601. For example, the upper portion 766 is illustrated in FIG. 25. As the reference time advances forward in time, icons may move across the surface of the portion 766 about the axis 782 in the direction indicated by arrow 784. When the reference time retreats backwards in time, icons may move across the surface of the portion 766 about the axis 782 in the direction indicated by arrow 786. The conjunction of the various axes 774, 776, 778, 780, 782 is illustrated to demonstrate icon movement in FIG. 26. Icons representing the farthest represented future point originate along the equator 764 and follow the path 770 along the axes 774, 778 and about the axis 782. When the icon has passed into the past relative to the reference time, it may follow path 772 along the axes 776, 780 and about axis 782 until reaching the equator 764, which may represent the farthest time in the past represented on the interface 750.

As described herein, the position of an icon on the upper portion 766 or lower portion 768 may corresponds to a time relative to the reference time. In some embodiments, an icon's distance from the center axis 601 along the surface of the respective portion 766, 768 may also indicate a property of the icon. For example, the surfaces of the portions 766, 768 may also comprise spiral bands, similar to the bands shown in FIG. 14, with each band corresponding to a property of an information item. Icons representing different information items may be plotted on different bands based on the properties of the items. Also, although the interface 750 is described with time flowing in a spiral manner, in some embodiments, time may flow in a linear manner along the surface of the respective portions 766, 768 without spiraling. In such embodiments, the angular position of the icons may represent other properties of the represented information items. This is illustrated below, for example, with respect to FIGS. 33 and 48-54.

Figure 27:
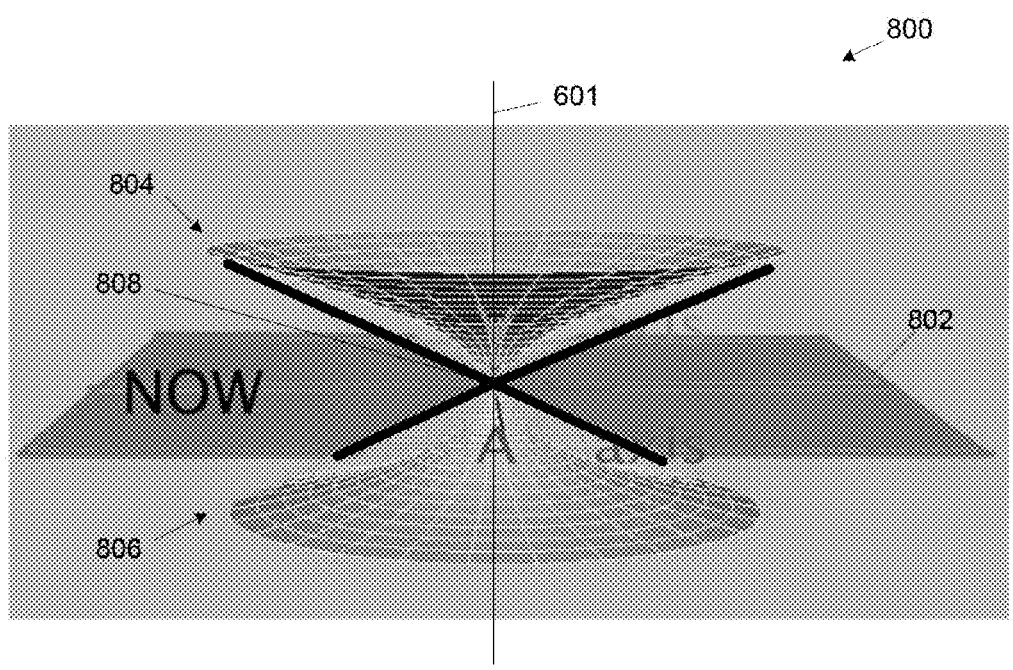
FIG. 27 is a diagram illustrating another embodiment of a user interface for providing temporal information to users.
Figure 28:
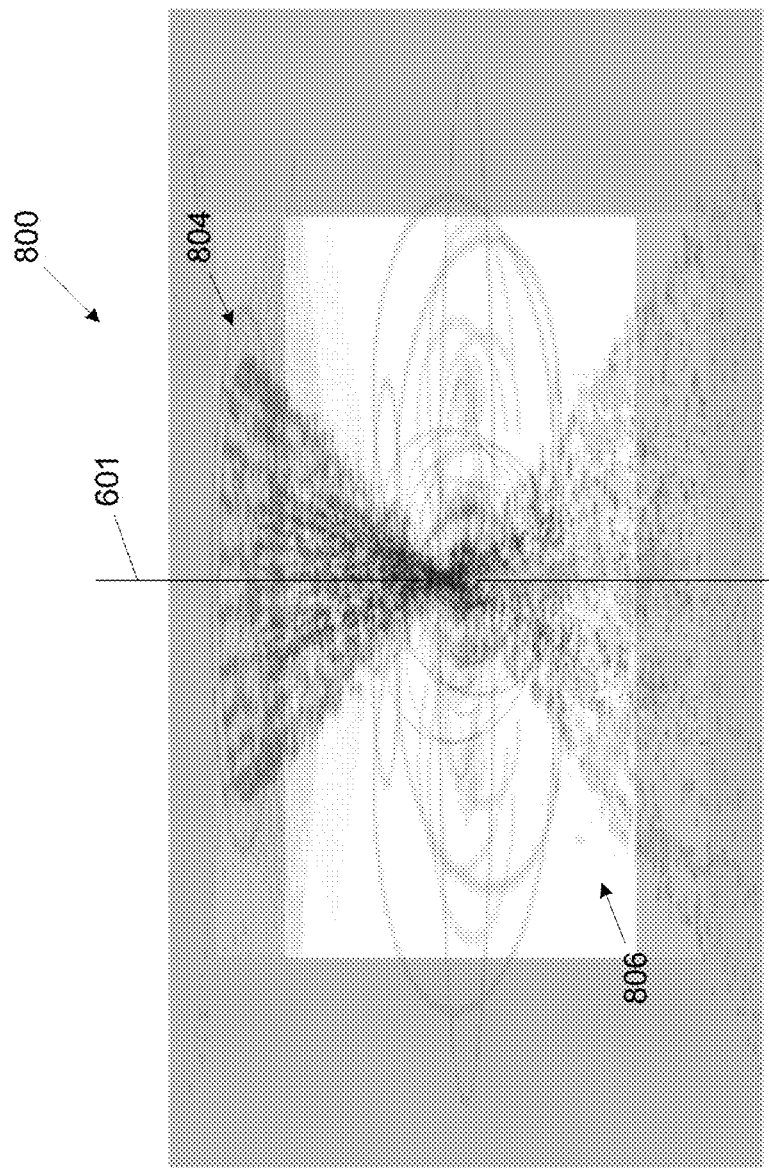
FIG. 28 is a diagram illustrating another embodiment of the user interface of FIG. 8 arranged such that the angular position of icons corresponds to properties of the represented information item.

FIG. 27 is a diagram illustrating another embodiment of a user interface for providing temporal information to users. The interface comprises a discontinuous three-dimensional shape comprising an upper portion 804 and a lower portion 806. A plane 802 indicates a reference time. Icons may be plotted on the surface of the upper portion 804, corresponding to times in the future relative to the reference time or on the lower portion 804, corresponding to times in the past relative to the reference time. The time associated with various icons may be represented by the distance along the surface of the upper 804 or lower 806 portion between the icon and the center axis 601. In some embodiments, the angular position of the icon may also represent time. For example, time may spiral towards an origin point 808 in a manner similar to that described above with respect to the interface 750. In some embodiments, the angular position of icons about the axis 601 alternately corresponds to other properties of the icons. FIG. 28 is a diagram illustrating another embodiment of the user interface 800 arranged in such a manner.

Figure 29:
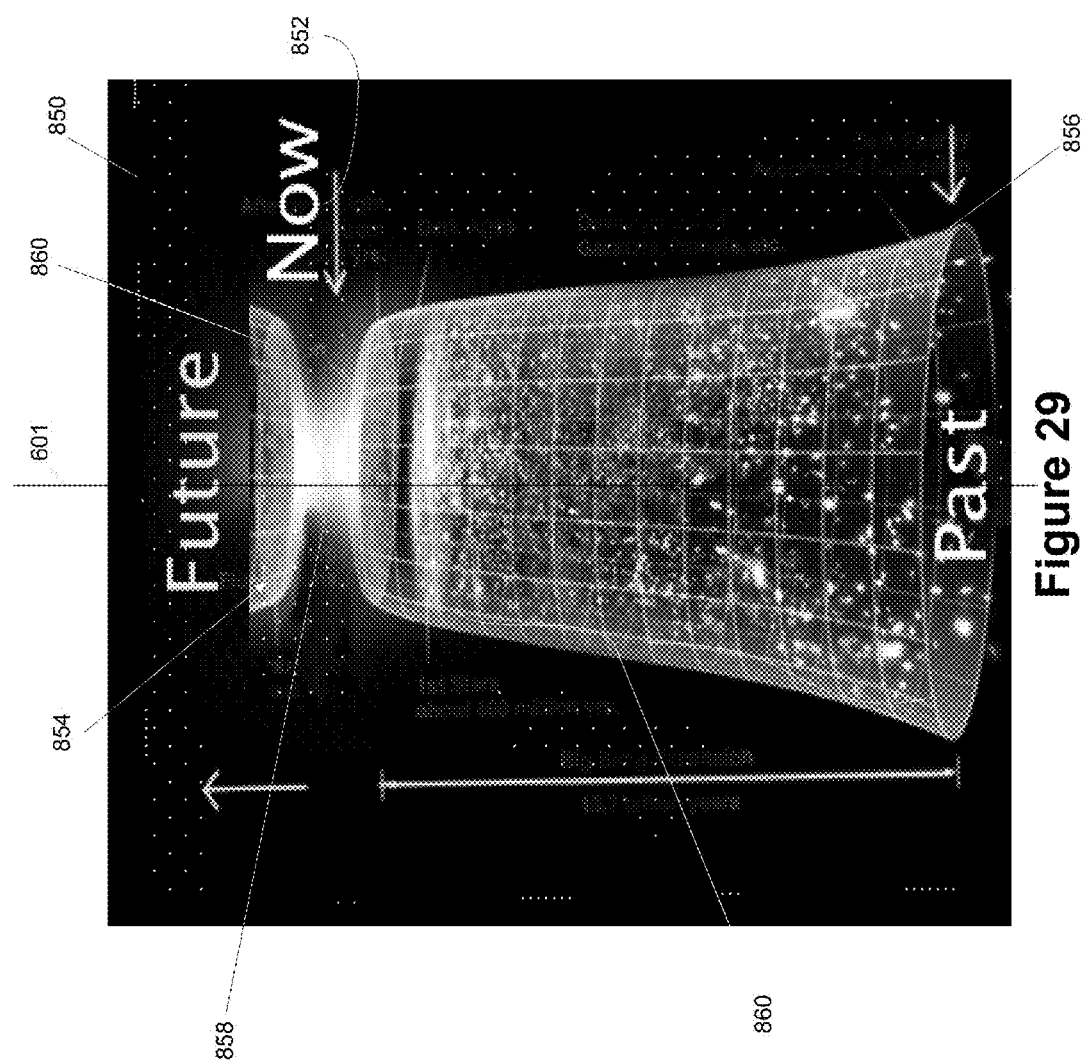
FIG. 29 is a diagram illustrating another embodiment of a user interface for providing temporal information to users.

FIG. 29 is a diagram illustrating another embodiment of a user interface 850 for providing temporal information to users. The interface 850 comprises another discontinuous three-dimensional shape comprising an upper portion 854 and a lower portion 856. A reference time is indicated at a transfer position 854 in a plane 852. Icons 860 corresponding to information items propagate within the portions 854 as the reference time changes. The angular position of the icons 866 about the axis 601 and the distance of the icons 866 from the axis 601 may indicate times corresponding to the underlying information items, and/or properties of the underlying information items. For example, the icons 866 may spiral from future 854 to past 856 as the reference time advances in time, as described above. In this case, both the angular position and the distance of the icons from the center axis 601 indicates time. Also, in various embodiments, time may be indicated only by the distance between an icon and the reference time marker 852 along the axis 601. The distance of an icon 866 from the axis 601 and the angular position of the icon 866 may indicate properties of the icon. For example, the distance of an icon 866 from the axis, for example, may indicate a relevance or importance of the icon, while the angular position may correspond to a category of the icon.

Figure 30:
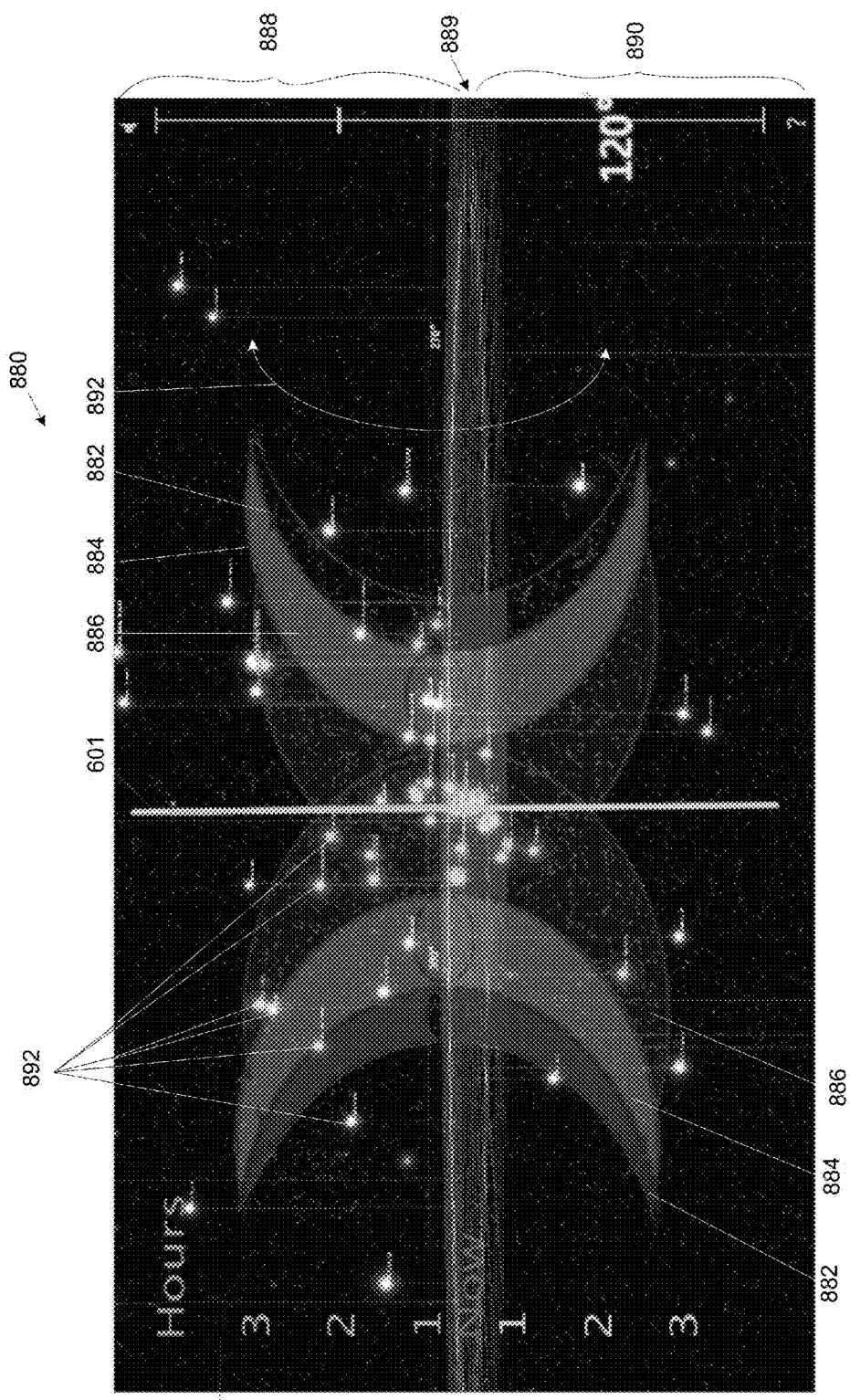
FIGS. 30-32 are diagrams illustrating another embodiment of a user interface for providing temporal information to users.
Figure 31:
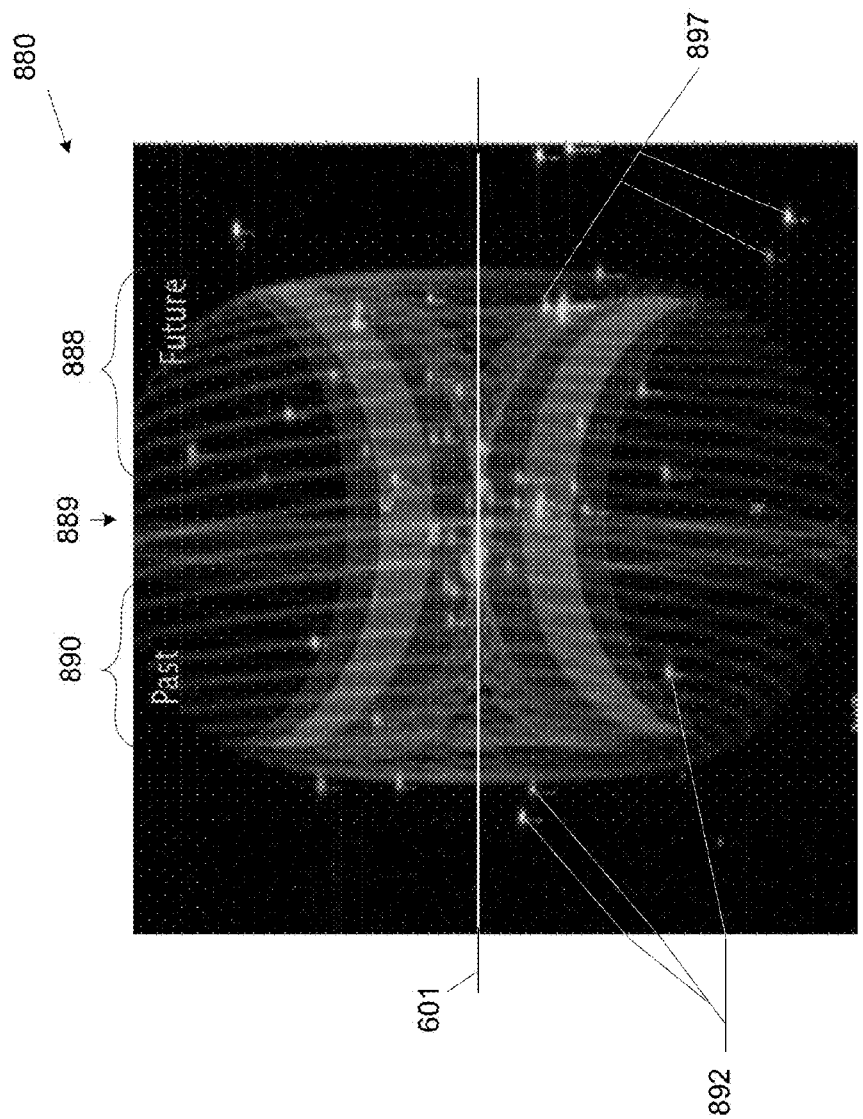
Figure 32:
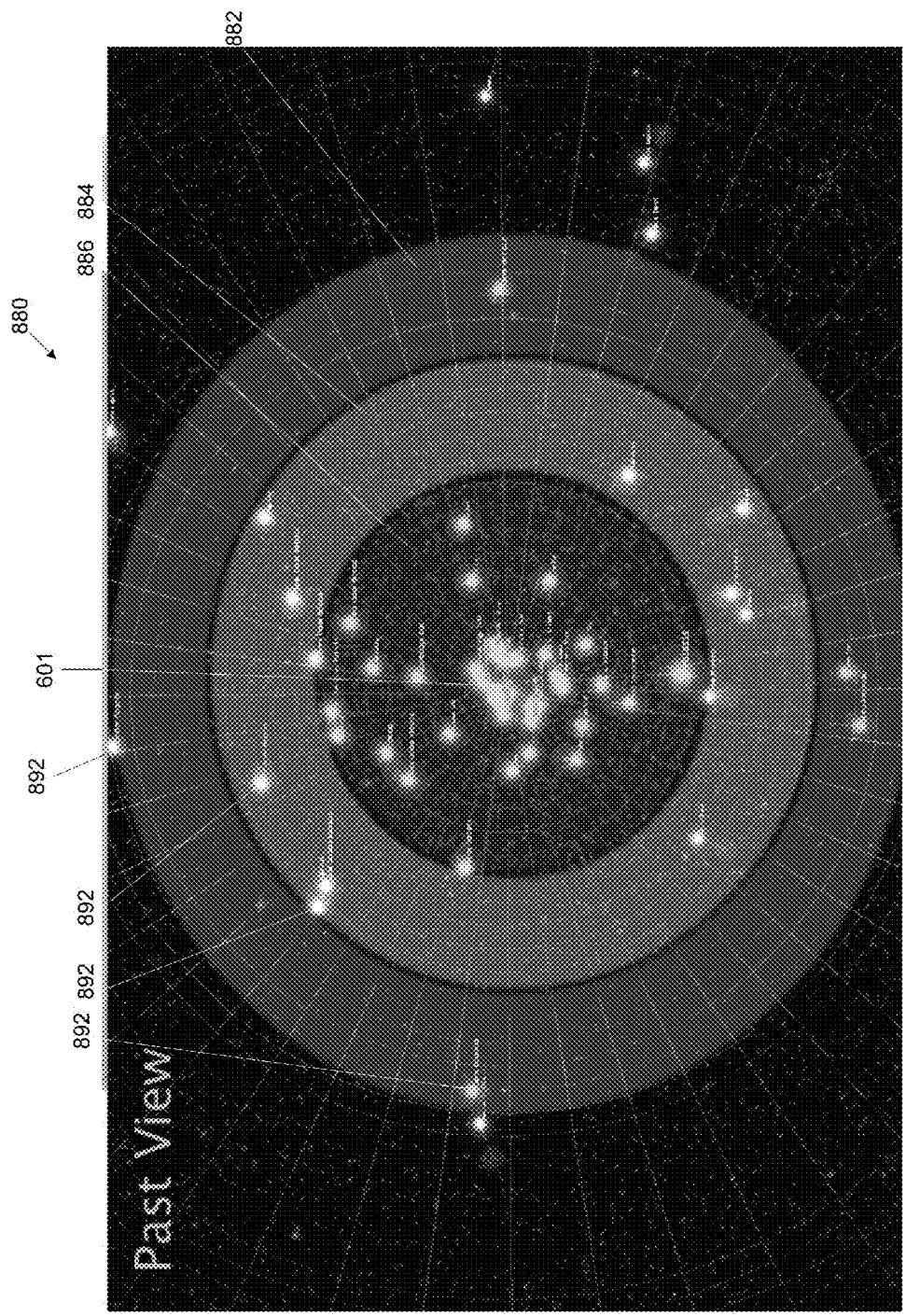

FIGS. 30-32 are diagrams illustrating another embodiment of a user interface 880 for providing temporal information to users. In the interface 880, various icons 892 are arranged about the center axis. The icons 892 are represented as points. For reasons of practicality, not all of the icons 892 shown in FIGS. 30-33 are individual marked with reference number 892. A reference time is indicated by a plane 889. As the reference time advances and retreats in time each icon 892 follows an arcuate path from the future 888 to the present (plane 889) to the past 890 and in reverse, depending on the direction of the change in the reference time. One example arcuate path is indicated by arrow 892. The position in time of an icon 892 relative to the reference time may be indicated by the distance along its arcuate path between the icon 892 and the present time, indicated by plane 889. This distance between the arcuate path and the center axis 601 may indicate an importance or relevance. For example, the interface may define zones 882, 884, 886. Each zone 882, 884, 886 corresponds to an importance or relevance. For example, icons having arcuate paths falling within zone 886 closest to the center axis 601 may correspond to information items having a highest level of importance. The other zones 882, 884 progressively farther from the center axis may represent information items of progressively lower importance or relevance. Three zones 882, 884, 886 are shown in FIGS. 30-32, although it will be appreciated that more or fewer zones may be utilized. For example, referring to FIGS. 30-33, the area farther from the center axis 601 than the zone 882 may be considered an additional zone.

Figure 33:
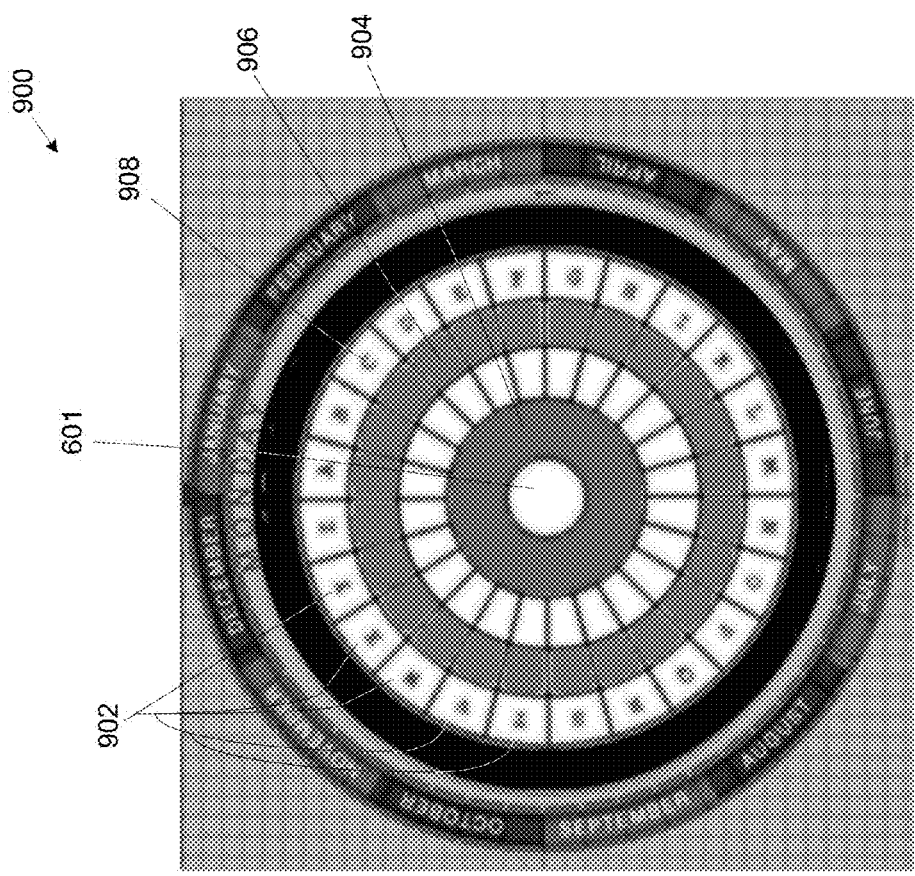
FIG. 33 is a diagram illustrating one embodiment of an interface illustrating how the angular position of an icon may indicate a property of the icon.

As is best indicated by FIGS. 31 and 32, the zones 882, 884, 886, and thus the allowable arcuate paths, are a figure of revolution about the center axis 601. Accordingly, the angular position of an icon's acruate path about the center axis 601 may also indicate properties of the underlying information item. For example, the angular position may indicate a category or other similar property. FIG. 33 shows one embodiment of an interface 900 illustrating how the angular position of an icon may indicate a property of the icon. The interface 900 is a figure of revolution about the center axis 601. The interface comprises a number of bands 904, 906, 908, similar to the zones 882, 884, 886. The band 904 into which an icon falls may indicate a property of the represented information item, such as a relevance or importance. Also in the interface 900, different angular positions about the axis 601 indicate other properties of the information items. For example, the interface 900 is divided into a number of angular zones 902, where each angular zone corresponds to a letter of the alphabet. (In the interest of clarity, not all of the angular zones 902 are individually labeled). Information items, for example, originating from a user whose name begins with a certain letter may be positioned in an angular zone 902 with the corresponding letter. The angular zones 902 may, alternatively, correspond to any other information item property.

Figure 48:
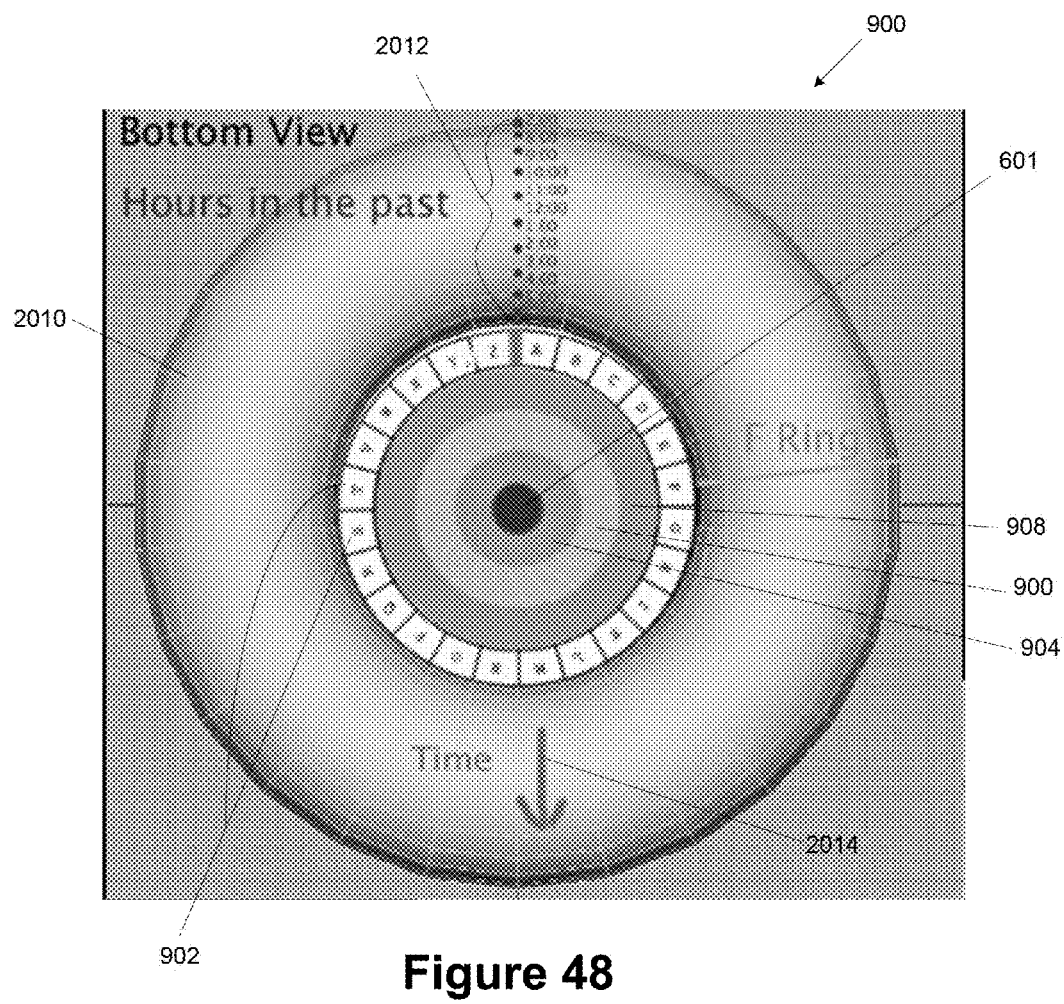
FIG. 48 shows another example embodiment of the interface of FIG. 33 comprising a shape portion.
Figure 49:
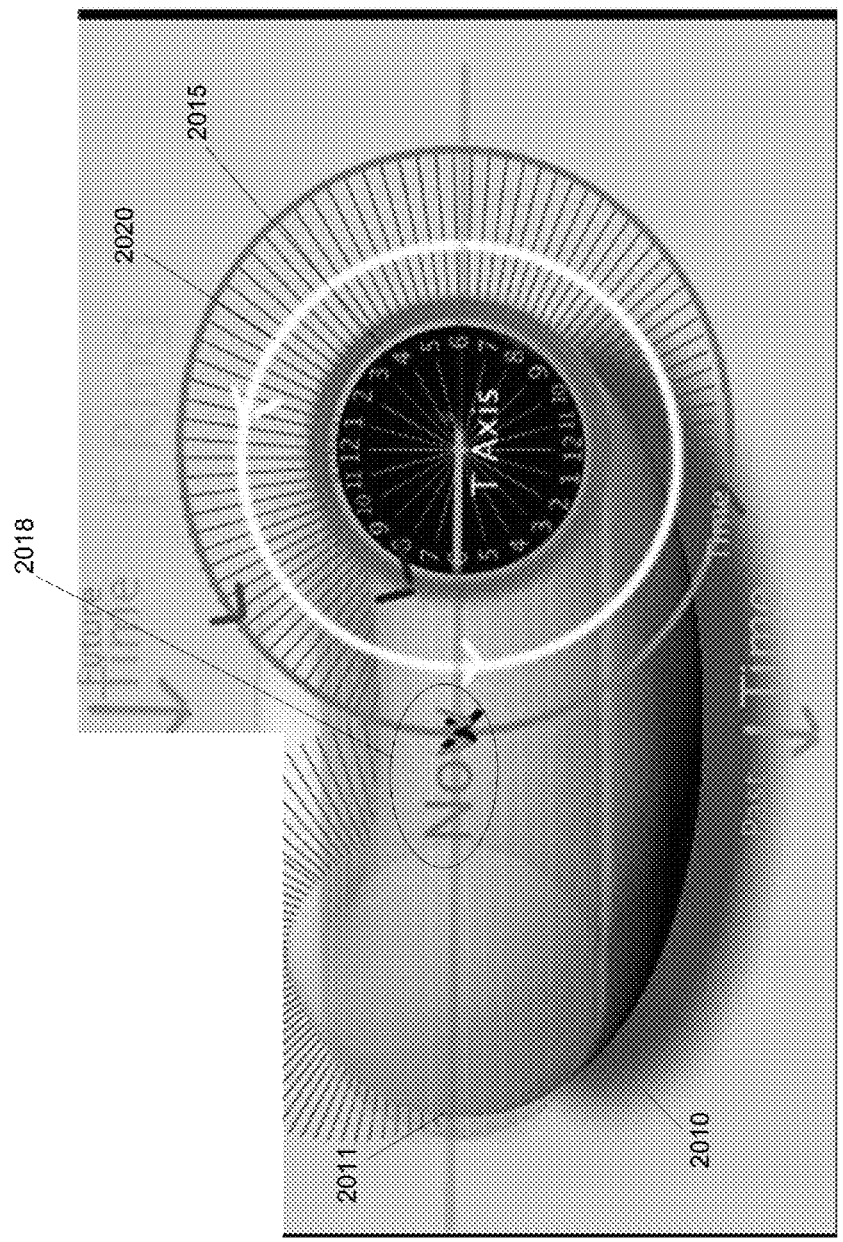
FIG. 49 shows another embodiment of the interface having the shape portion corresponding to the past and a shape portion.

The example interface 900 shown in FIG. 33 illustrates how the angular position of icons may correspond to information item properties in any of the interfaces described herein, 750, 800, 850, 880, etc. For example, the interface 750 may be configured such that only the surface distance from the icon to the plane 704 indicates time and the angular zone into which the icon falls indicates an alternative property. FIG. 48 shows another example embodiment of the interface 900 of FIG. 33 comprising a shape portion 2010. The angular position of icons on the shape portion 2010 corresponds to an angular zone 902. The distance of icons from the center axis 601 along the surface of the shape portion 2010 corresponds to time. For example, the interface 900 in the configuration shown illustrates past times. As time scale 2012 illustrates past time positions given the current reference time. As the reference time advances, time on the surface of the shape portion 2010 proceeds in the direction of arrow 2014. FIG. 49 shows another embodiment of the interface 900 having the shape portion 2010 corresponding to the past and a shape portion 2011. Icons may be plotted on the shape portions 2010 2011. As the reference time advances, icons may travel along the surface of the shape portions 2010, 2011 in the direction indicated by arrow 2020. For example, an icon may be initially plotted on the future shape portion 2011. As the icon passes through the present or reference time 2018, it may be proceed to the past shape portion 2010. The angular position of icons along the cross section of the shape portions 2010, 2011, for example, may indicate time. This is illustrated by the clock 2015. In some embodiments, a shape, such as the shape 602, may be positioned at the center of the shape portions 2010, 2011. Accordingly, icons may not transition directly from the future shape portion 2011 to the past shape portion 2010 but may instead be plotted on the shape 602 (or faces thereof 622, 624) for a time period associated with the shape 602.

Figure 50:
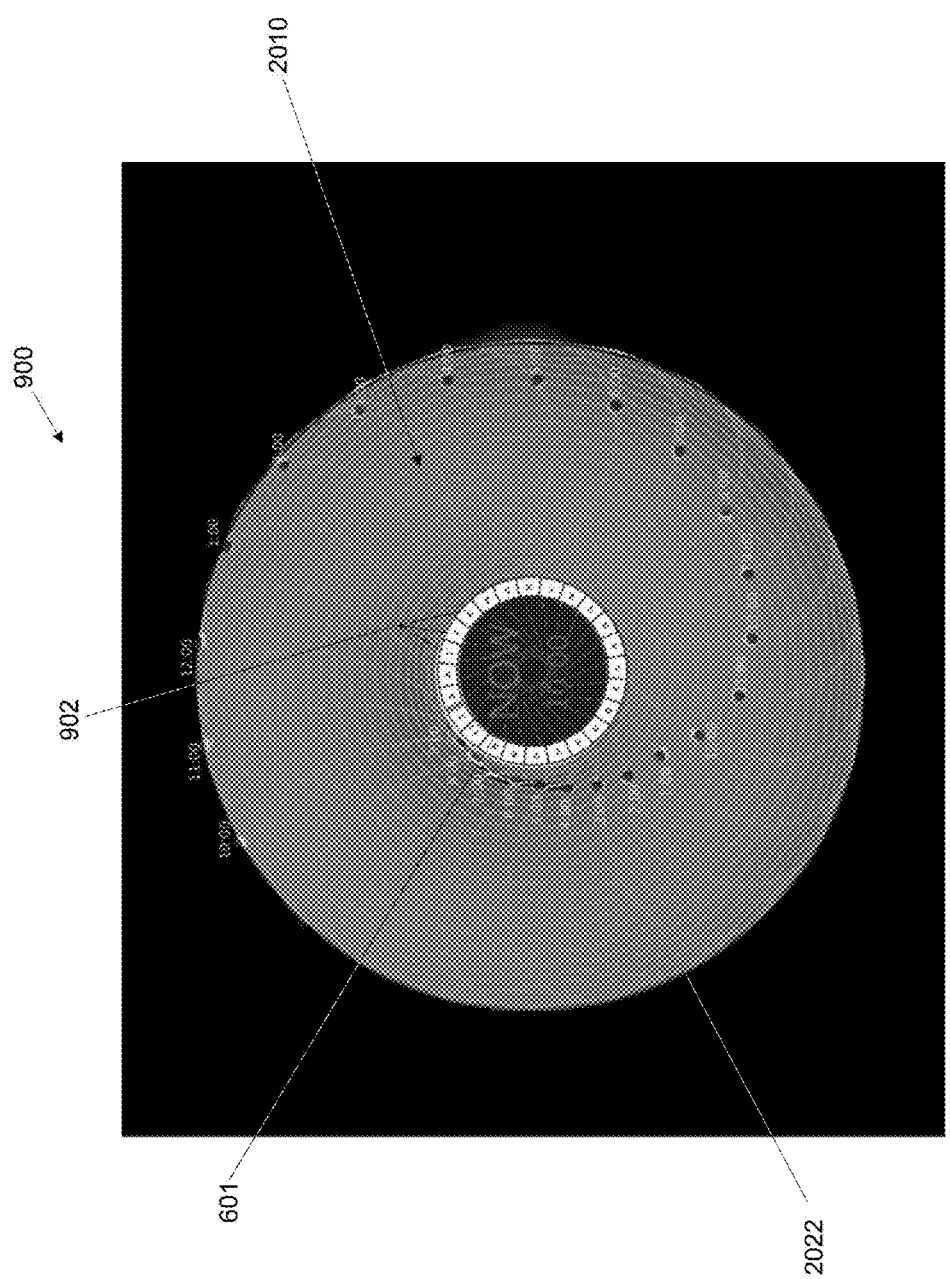
FIGS. 50-54 are diagrams showing the interface of FIGS. 33 and 48-49 illustrating example position of icons.
Figure 51:
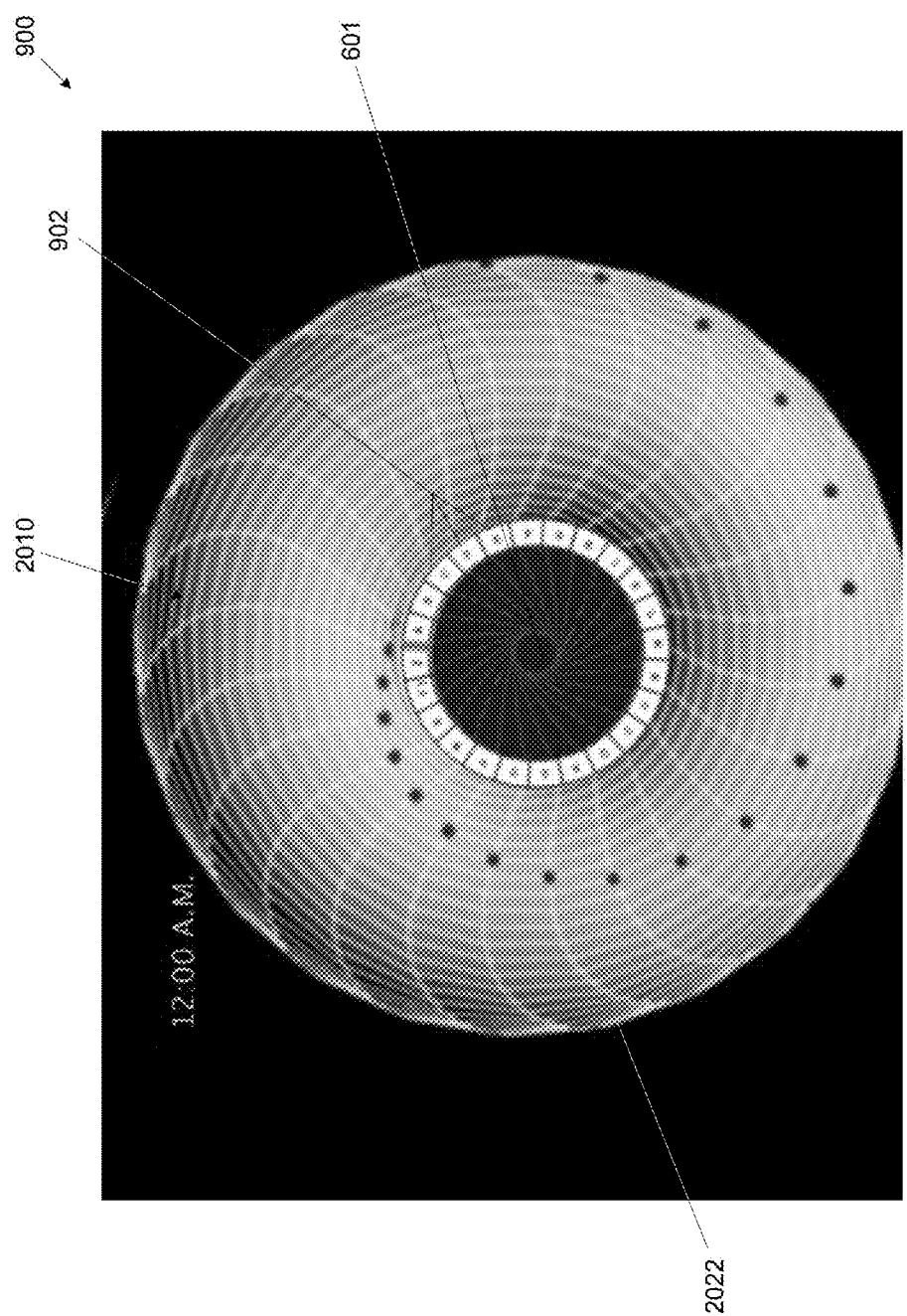
Figure 52:
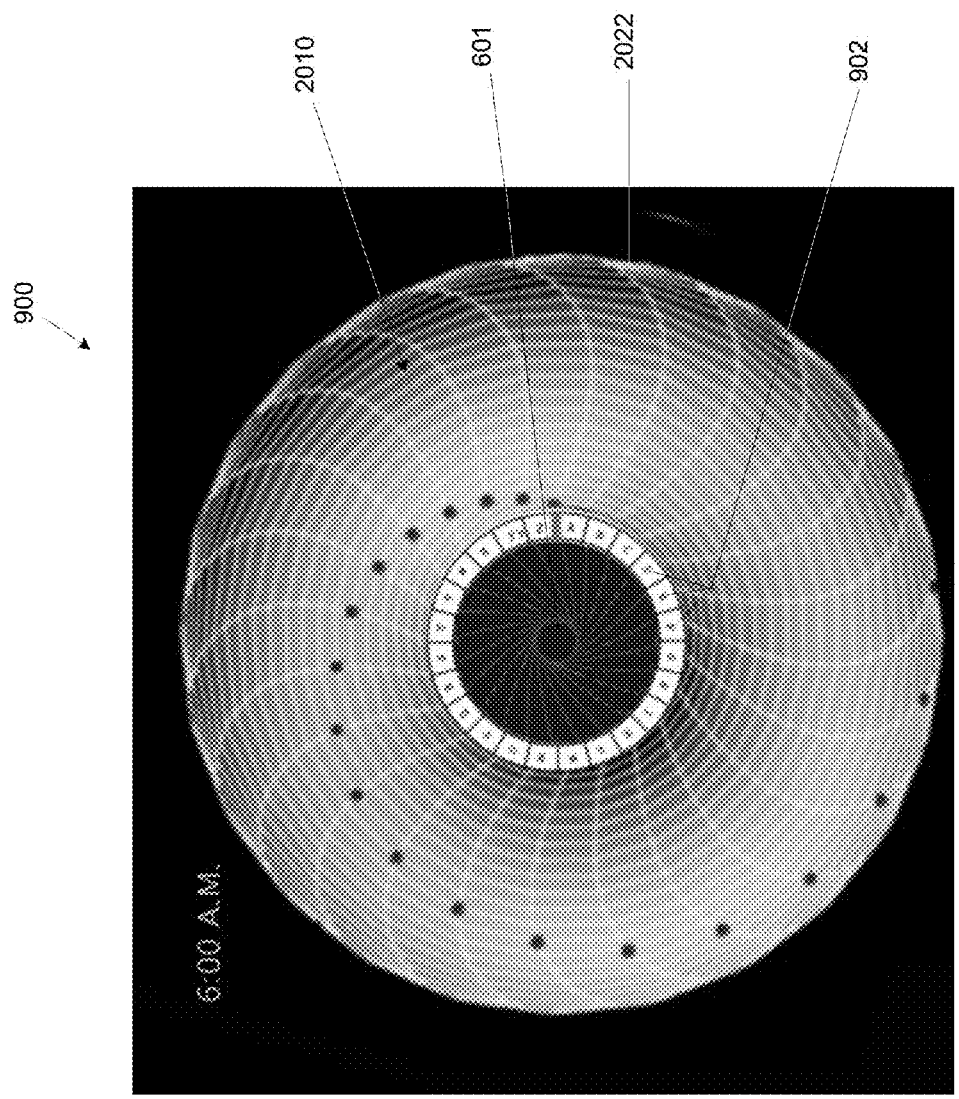
Figure 53:
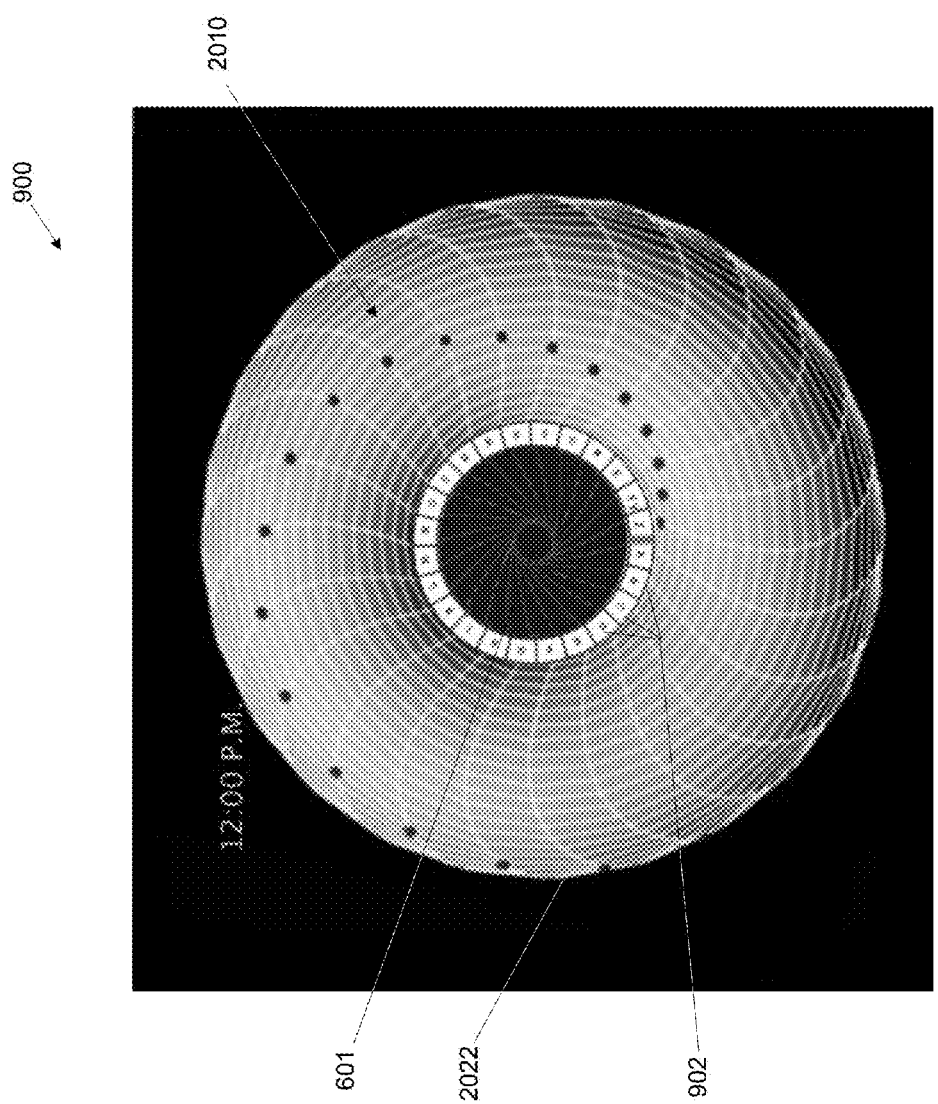
Figure 54:
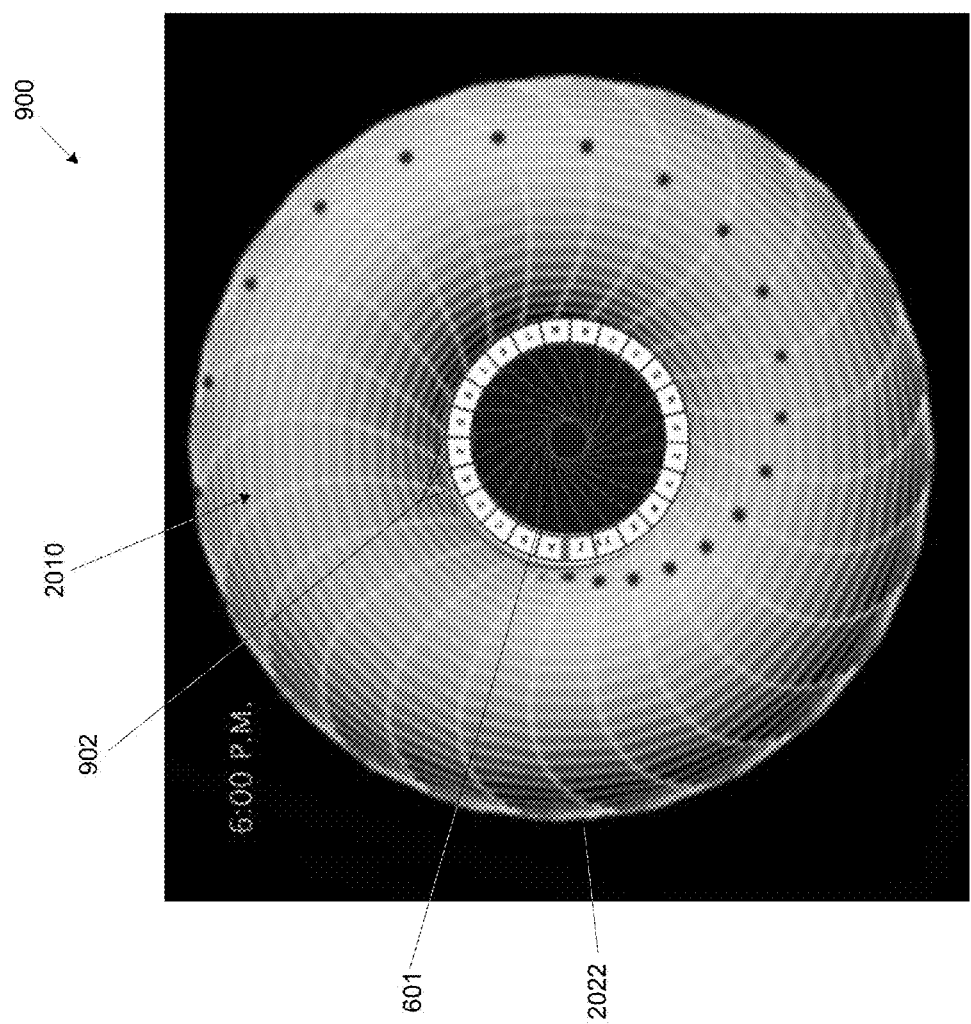

FIGS. 50-54 are diagrams showing the interface 900 of FIGS. 33 and 48-49 illustrating example position of icons. In the configuration of FIGS. 50-54, the past shape portion 2010 is illustrated, although it will be appreciated that similar arrangements may hold on the shape portion 2011, albeit with some rotational directions reversed. Referring to FIG. 50, a plurality of icons is shown. Each icon, as illustrated, corresponds to an angular zone 902 and a time (as labeled). The angular zone 902 of an icon indicates a category or other property of the represented information item. The time of the represented information item is indicated by the distance of the icon from the center axis 601 along the surface of the shape portion 2010. In FIGS. 51-54 represent example reference times corresponding to 12:00 a.m., 6:00 a.m., 12:00 p.m., and 6:00 p.m., respectively. In each case, icons are arranged where the distance of the icon from the center axis 601 along the surface of the shape portion 2010 indicates the time of the represented information item while the angular position of the icon represents a category or other property of the underlying information item (e.g., as indicated by the angular zone 902).

Figure 34:
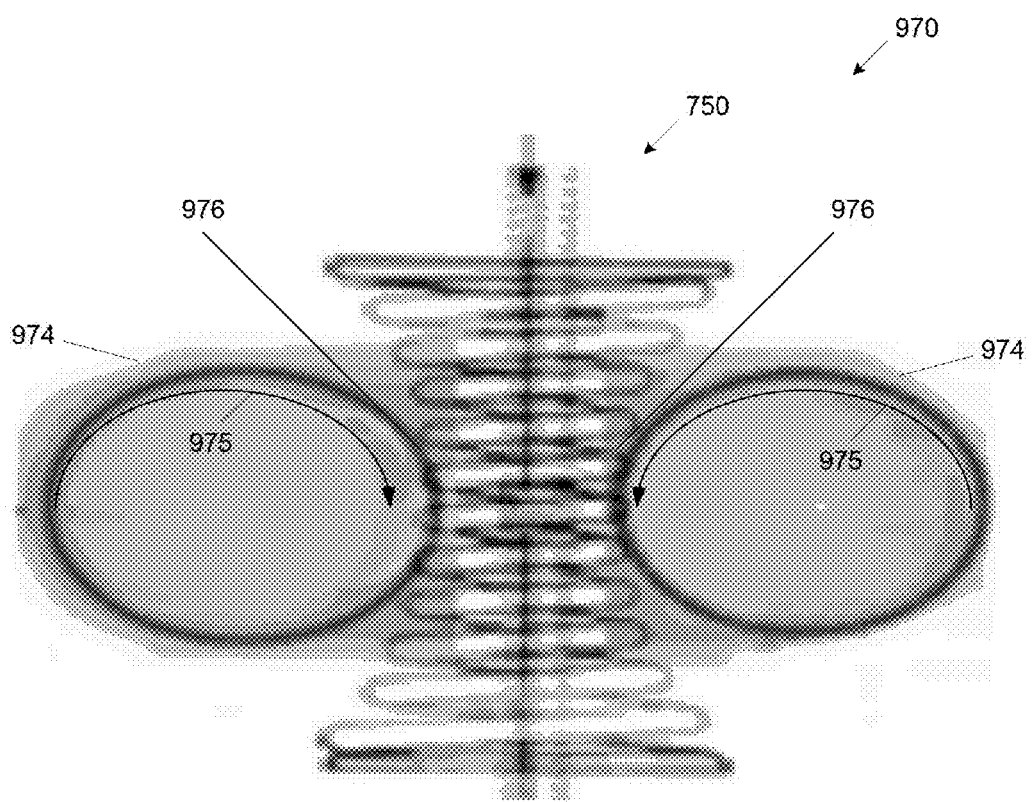
FIG. 34 is a diagram illustrating another embodiment of a user interface for providing temporal information to users.

FIG. 34 is a diagram illustrating another embodiment of a user interface 970 for providing temporal information to users. The interface 970 comprises a torus shape made up of a plurality of rings, such as 974, 976. Each ring 974, 976 corresponds to a category or other property of information items. Icons may be plotted on the surface of the torus. The angular position of the icons corresponds may correspond to a ring, such as 974, 976, that corresponds to a category or other property of the represented information item. As the reference time advances forwards in time, icons may propagate along the selected ring in the direction indicated by arrows 974. Optionally, the interface 970 may also comprise a sub-interface 750. For example, a predetermined point, such as, for example 976, may represent a discontinuity. When icons reach the discontinuity, they may transition to and/or from the sub-interface, for example, at a location that corresponds to the most extreme time represented on the sub-interface 750 (e.g., the point farthest in the future or past relative to the reference time).

Figure 35:
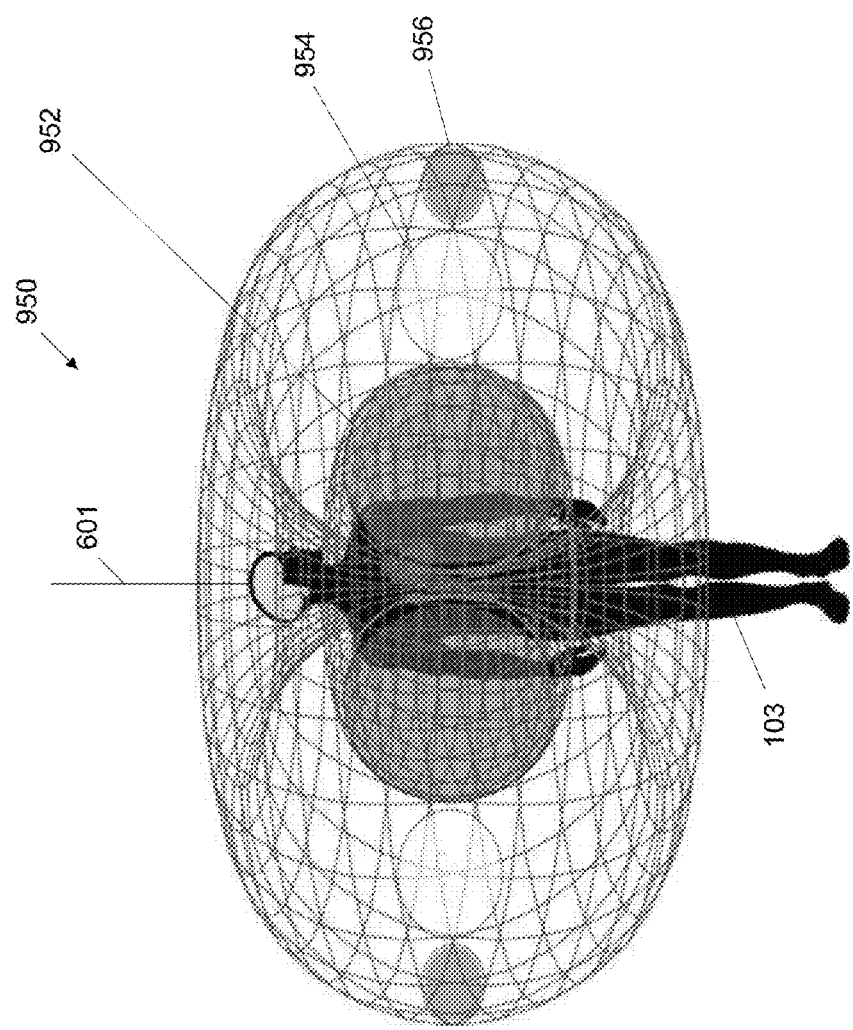
FIG. 35 is a diagram illustrating one embodiment of an interface that may be provided to users to receive user input regarding the relevance or importance of information items received via the feeds.

In various embodiments, the user 103 may be prompted (e.g., by the user device 102 and/or service provider system 104) to provide input for determining the relevance or importance of various information items. Based on the input, the user device 102 and/or service provider system 104 may determine the relevance of received information items, which may be indicated on the various interfaces described herein as described. FIG. 35 is a diagram illustrating one embodiment of an input interface 950 that may be provided to users 103 to receive user input regarding the relevance or importance of information items. For example, each of the feeds 126, each potential information item sender, and/or each information item subject, category or property may be represented by its own interface 952, 954, 965. The user 103 is (optionally) positioned at the center axis 601. To assign a relevance to a feed 126, potential sender, subject, etc., the user may place the corresponding interface at a distance from the center axis 601.

Interfaces placed nearer to the axis 601 may be considered more important and/or relevant. Although the input interface 950 is represented in the style of the interface 750, it will be appreciated that similar input interfaces may be arranged in the style of any of the other interfaces described herein.

FIGS. 55-56 illustrate diagrams showing an additional interface 2050 for receiving data regarding the relevance or importance of various information items. The interface 2050 comprises a number of rings 2056 that may correspond to different time periods and a center portion 2052. Many aspects of the interface 2050 are common to some or all of the other interfaces described herein including, for example, the aspects relating to selecting icons and rating relevance. In the illustrated example, the user may select an icon 2058. The icon 2058 may be selected in any manner. For example, on a touch screen, the user 103 may place her finger over the icon 2058, indicated by zone 2060. In some embodiments, the user selects the icon 2058 by dragging it towards a center portion 2052 of the interface 2050 in the direction indicated by arrow 2062. Upon selection of the icon 2058, the represented information item is described at the center portion 2052. For example, in FIG. 55, the center portion obscures a shape 602 or face 622, 624 (if any) that may be a part of the interface 2050, for example, as described above. In some embodiments, the center portion 2052 or other suitable information field, is positioned differently on the interface 2050. For example, in FIG. 56, the center portion 2052 is large enough to cover the entirety of the interface 2050.

The center portion 2052, or other suitable information field, may describe the represented information time at a field 2064. The center portion 2052 may also comprise a relevance or importance bar 2066. The user 103 may position a cursor 2068 on the importance bar 2066 to rank an importance of the information item. The importance or relevance of the information item may be utilized by the service provider system 104 and/or user device 102 to plot icons on the various interfaces described herein, for example, as described herein. In some embodiments, the service provider system 104 and/or user device 102 is programmed to extrapolate the importance indicated for a given information item. For example, when the user 103 rates the importance of one information item, the service provider system 104 and/or user device 102 may attribute the same importance to other information items having common properties (e.g., common senders, common times of receipt, common text patterns, etc.). In some embodiments, if the user 103 disagrees with an extrapolated importance, she may change the importance of an information icon by selecting the icon in a manner similar to that shown in FIGS. 55-56.

Figure 58:
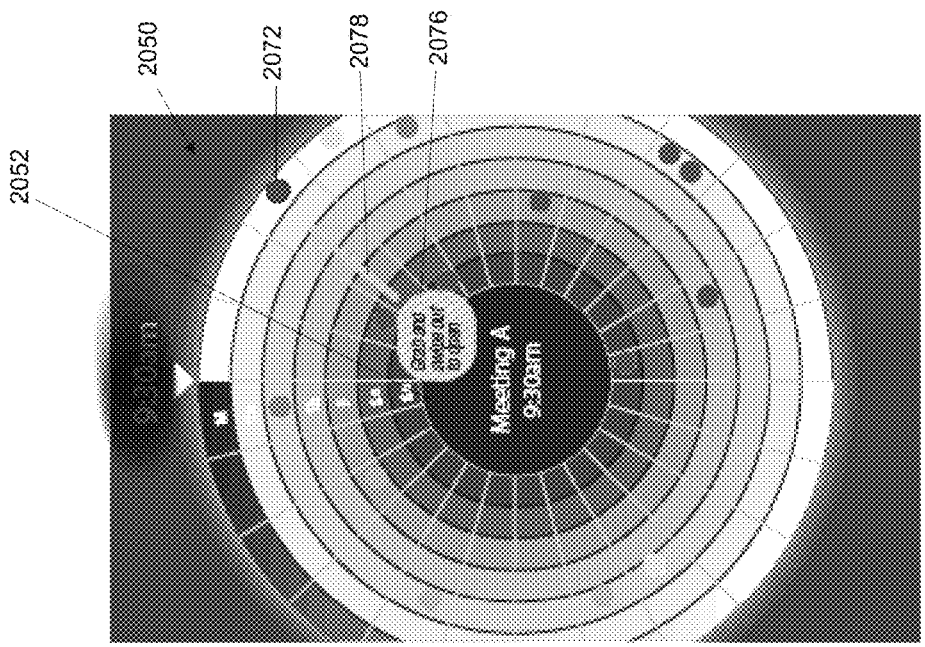
FIGS. 57-58 are diagrams illustrating one embodiment for modifying reference time based on an information item.
Figure 57:
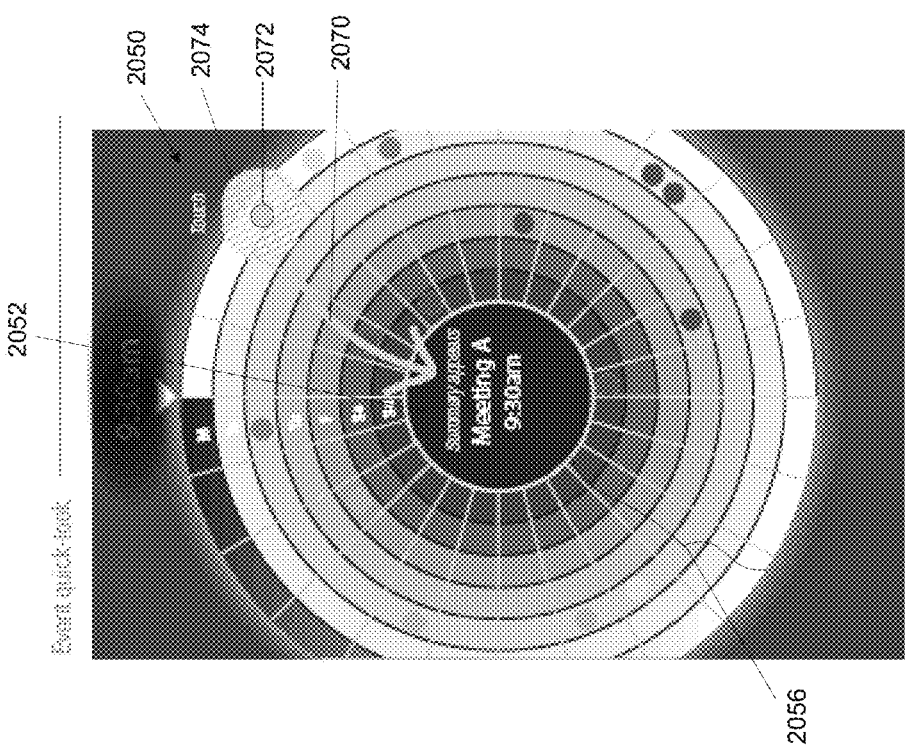

In some embodiments, the user 103 may be provided with functionality for modifying the reference time of an interface (e.g., any of the interfaces described herein) with respect to an information item. For example, the user 103 may select an information item. Upon selection of the information item, the service provider system 104 and/or user device 102 may modify the reference time so that the reference time is equal to the time of the selected information item. FIGS. 57-58 are diagrams illustrating one embodiment for modifying reference time based on an information item. FIGS. 57-58 are illustrated with the interface 2050 introduced with FIGS. 55-56, though it will be appreciated that the concepts described may be applicable to any of the various interfaces described herein. Referring to FIG. 57, the user 103 may select an icon 2072 representing an information item.

The icon 2072 may be selected in any suitable manner. For example, the user 103 may, with a cursor, touch screen or other suitable pointing mechanism, select a reference area 2074 containing the icon 2072 and drag the icon 2072 towards a predetermined location on the interface 2050. In the example of FIG. 57, the predetermined location is the center 2052 of the interface 2050, as illustrated by arrow 2070. When the icon 2072 is selected, the reference time for the interface may be modified to equal the time of the selected information item. In this way, the user 103 is shown the other icons plotted on the interface 2050 and their respective positions in time relative to the time of the selected information item. In some embodiments, the user 103 may revert to the previous reference time, for example, by selected the center 2052, indicated by reference area 2076, and dragging outwards in the direction indicated by arrow 2078 (e.g., towards the original location of the icon 2072).

In some embodiments, when the interface 2050 is modified to adopt a reference time corresponding to a selected information item, other icons on the interface may be accordingly filtered. For example, when the icon 2072 is selected, as shown in FIG. 57, the other icons plotted on the interface 2050 may include only icons representing information items that are similar to or the selected information items. In some embodiments, the various interfaces herein may also support information item filtering in other contexts. For example, the user 103 may select a geographic location. The interface may then plot only icons corresponding to information items that relate to the selected geographic area. Such information items may include, available restaurant reservations, tee times for golf, etc.

Figure 36:
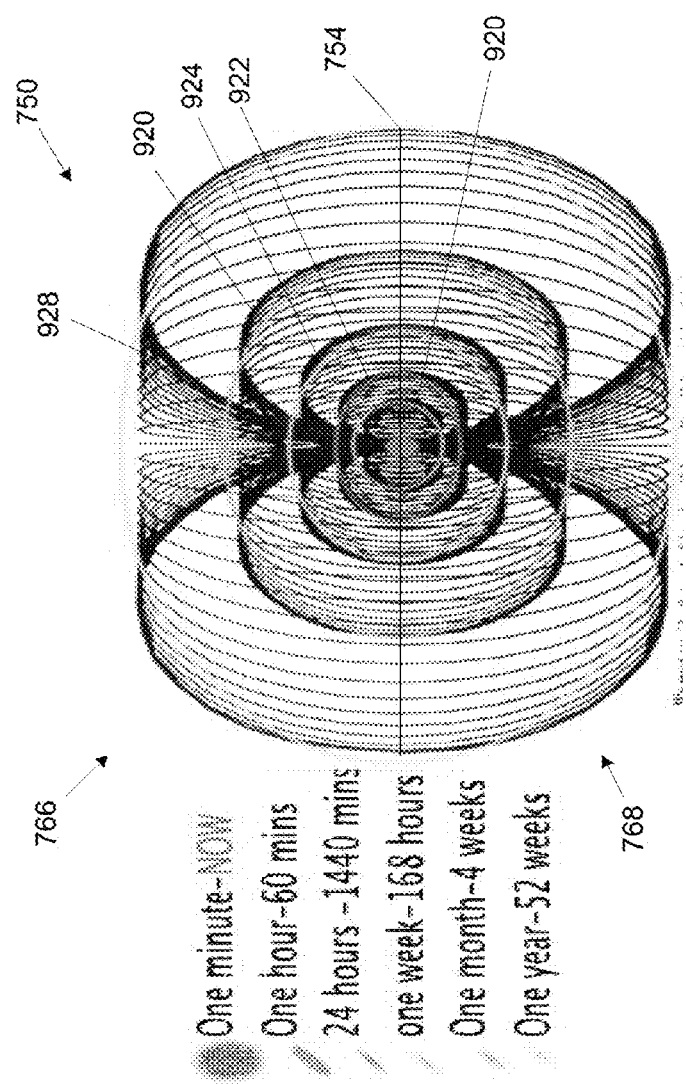
FIG. 36 is a diagram illustrating one embodiment of the interface of FIG. 20 showing various different time scales.

It will be appreciated than any of the interfaces 600, 750, 800, 850, 880, 2050, etc., described herein may be represented on different time scales. In various embodiments, the scale at which any interface is presented may be user selectable (e.g., as an interface selection 120 resulting in a modification of the interface, as indicated at 310 and 508). FIG. 36 is a diagram illustrating one embodiment of the interface 750 of FIG. 20 showing various different time scales. The representation 920 illustrates a scale where the interface 750 represents one hour from the equator 764, along the surface of the upper portion 766, optionally through the shape 602 (when present), and along the surface of the lower portion 768 back to the equator 764. The representation 922 corresponds to twenty-four hours. The representation 924 corresponds to one week. The representation 926 corresponds to one month. The representation 928 corresponds to one year.

Figure 37:
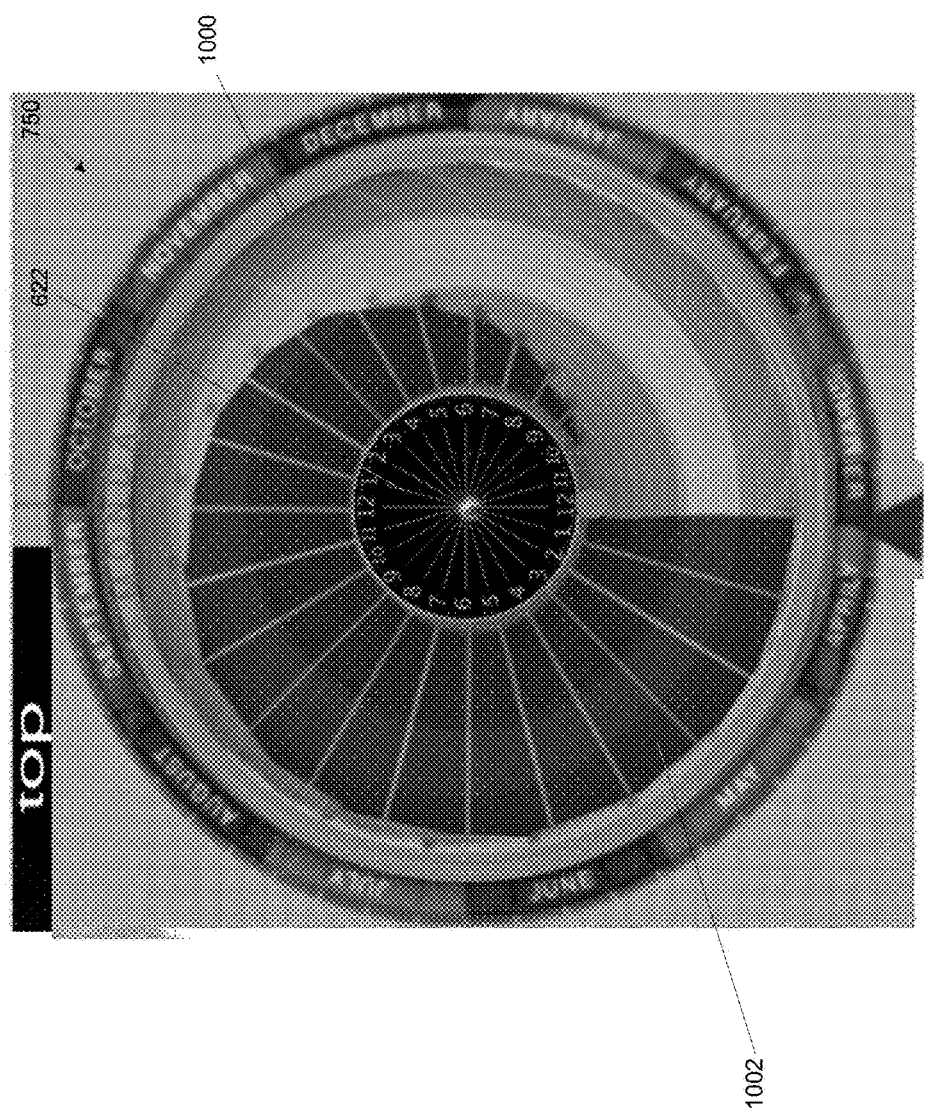
FIGS. 37 and 38 illustrate embodiments of the interface of FIG. 10 illustrated to display past and future information items from a single point of view.
Figure 38:
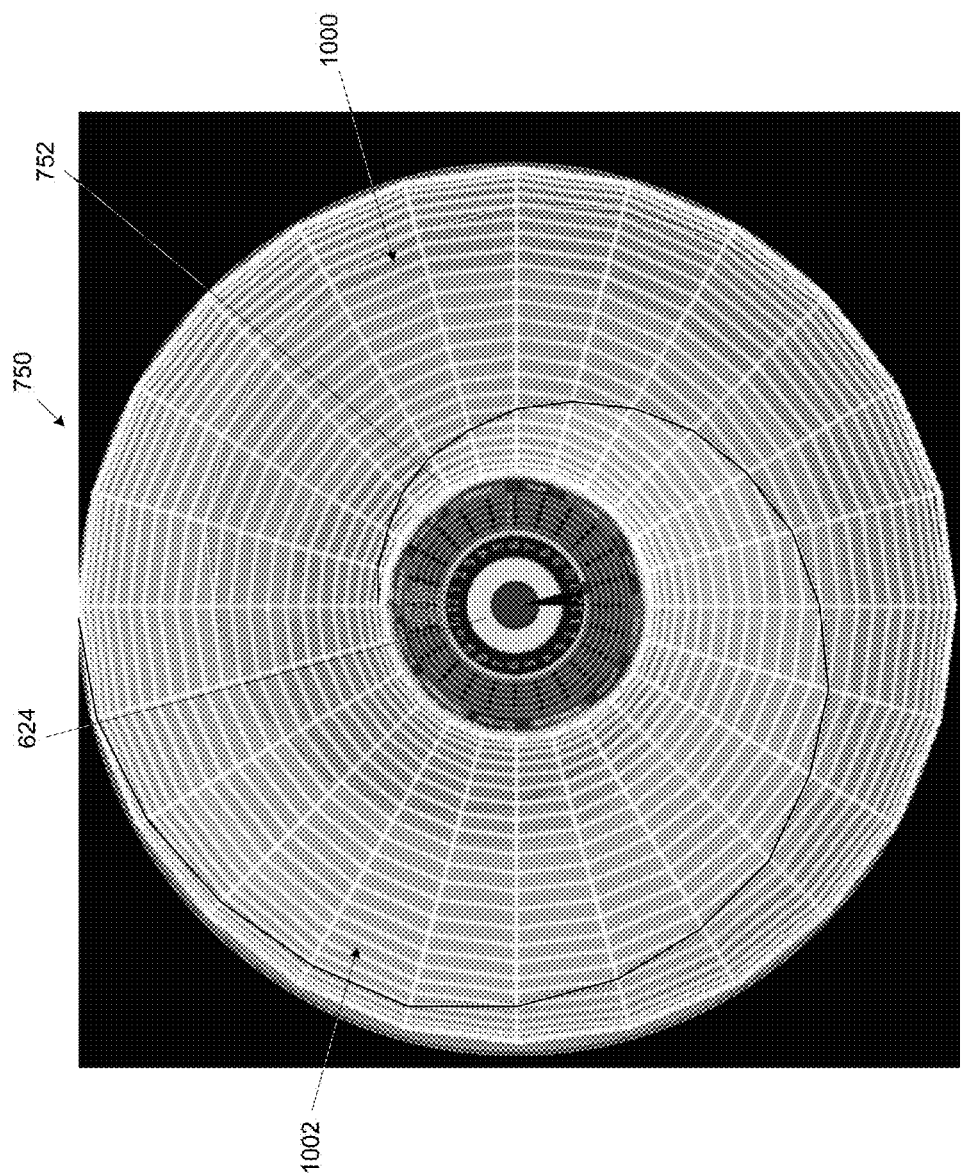

As described herein with respect to FIG. 9, the interface 600 may be configured to show icons representing information items in both the past and future relative to the reference time from a single user point of view. Any of the interfaces described herein may be configured in such a manner. For example, FIGS. 37 and 38 illustrate embodiments of the interface 750 illustrated to display past and future information items from a single point of view. Referring to FIG. 37, a portion 1000 of the interface 750 corresponds to the upper portion 766, while another portion 1002 corresponds to the lower portion 768. It will be appreciated that the portions 1000, 1002 may be of any suitable shape or size. In the example of FIG. 37, the upper and lower shape portions 1000, 1002 feed directly into the shape 602 (e.g., the faces 622, 624 thereof). In some embodiments, however, the upper and lower shape portions 1000, 1002 may feed first into a spiral ring section such as 752 (shown in FIG. 38) or 752 before reaching the shape 602. Also, although the FIGS. 37 and 38 show the respective faces 622 and 624 in full, it will be appreciated that split faces may be displayed, as shown in FIG. 9.

Figure 39:
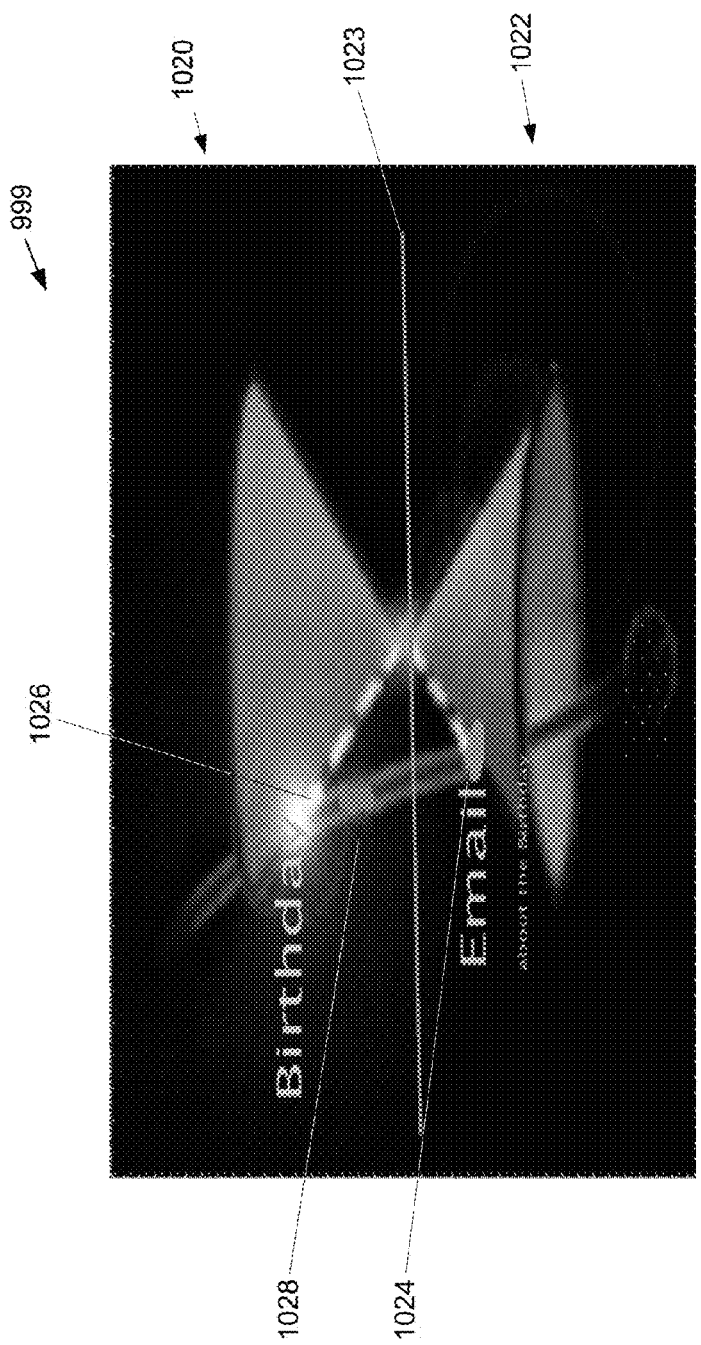
FIG. 39 is a diagram illustrating one embodiment of an example interface showing an example connection between past and future information items.

In some embodiments, information items in the future may relate to other information items in the past. Such information items may be referred to as multi-temporal. For example, an e-mail, text message, social network post, etc. may be represented on the various interfaces in the past, based on its date of receipt and may also refer to other information items in the future. For example, the e-mail, text message, social network post, etc., may refer to a future event that is represented on the various interfaces as its own information item and associated icon. Relationships between information items may be represented in the various interfaces as a "wormhole" or connection between past and future events. FIG. 39 is a diagram illustrating one embodiment of an example interface 999 showing an example connection between past and future information items. For example, the interface 999 comprises an upper portion 1020 corresponding to a future time period relative to a reference time 1023 and a lower portion 1022 corresponding to a past time period relative to the reference time 1023. An icon 1024 represents an example e-mail information item received in the past time period 1022. Icon 1026 represents a future event information item (e.g., a birthday party) referenced by the e-mail information item represented by the icon 1024. For example, the e-mail information item 1024 may invite the user to the birthday party represented by 1026. The relationship between the icons 1026, 1028 is indicated by a connection line 1028 linking the icons 1026, 1028.

It will be appreciated that any of the various interfaces 500, 750, 780, 800, 850, 880, 900, 950, 999, 1110, etc. may be implemented with different interface styles for past and future time periods. For example, some embodiments may utilize a three-dimensional shape portion, such as portion 766, to represent future information items, while past information items may be plotted as described with respect to the past 890 of the interface 880. Any other suitable combination is may be used.

Referring again to FIG. 40, the embodiment of the interface 600 shown illustrates an example use that may be applied to any of the interfaces 600, 750, 780, 800, 850, 880, 900, 950, 999, 1100 described herein. For example, the face 622, as configured in FIG. 40, corresponds to a future time period. Each of the bands 691, 693, 695, 697, 699 correspond to a category of potential commercial offers that may be received, for example, from one or more commercial offer systems 114. Icons 605 plotted on the face 622 represent information items related to commercial offers. In one example, a night club may advertise a happy hour at 5:00 p.m. This information event may be potted on the interface 600, as illustrated by icon 605'. The angular position of the icon 605' about the center axis 601 describes the time within the time period that the information item (e.g., the happy hour) occurs. The distance of the icon 605' from the center axis 601 indicates a category of the commercial offer (e.g., an advertisement for a happy hour is related to the category "Night Life"). In some embodiments, icons corresponding to commercial offers are plotted only on the future or future-facing portions of the various interfaces. In this way, portions of the interface corresponding to past times are limited to non-commercial items. The user 103 may be provided with functionality for selecting the types of commercial offers that appear on the interface 600. For example, the user 103 may select the categories represented by bands 691, 693, 695, 697, 699. The user 103 may also be provided with functionality to select sub-categories within the categories, in some embodiments, down to the level of individual establishes whose offers are plotted on the interface 600. Also, although commercial offers are described in terms of the interface 600, it will be appreciated that commercial offers may be generated in a similar manner on any of the interfaces 600, 750, 780, 800, 850, 880, 900, 950, 999, 1100 described herein.

In some embodiments, the various interfaces 600, 750, 780, 800, 850, 880, 900, 950, 999, 1100 described herein may be utilized by users 103 to solicit commercial offers. When a user 103 wants to utilize a commercial product or service at a known time, or range of times, in the future, the user may post an information item indicating the user's intention (e.g., offer request) to the appropriate interface. The service provider system 104 may post the first user's request to either the commercial offer system 114 or directly to one or more other users 103 that are commercial establishments. Commercial establishments would then have the opportunity to make an offer to the first user 103. In some embodiments, the user 103 may also include other users 103 in his or her offer request. For example, a user 103 may want to have dinner with one or more other users 103 in a given city at a given time. This information may be included in the offer request, which may solicit offers from restaurants in the appropriate city.

Figure 41:
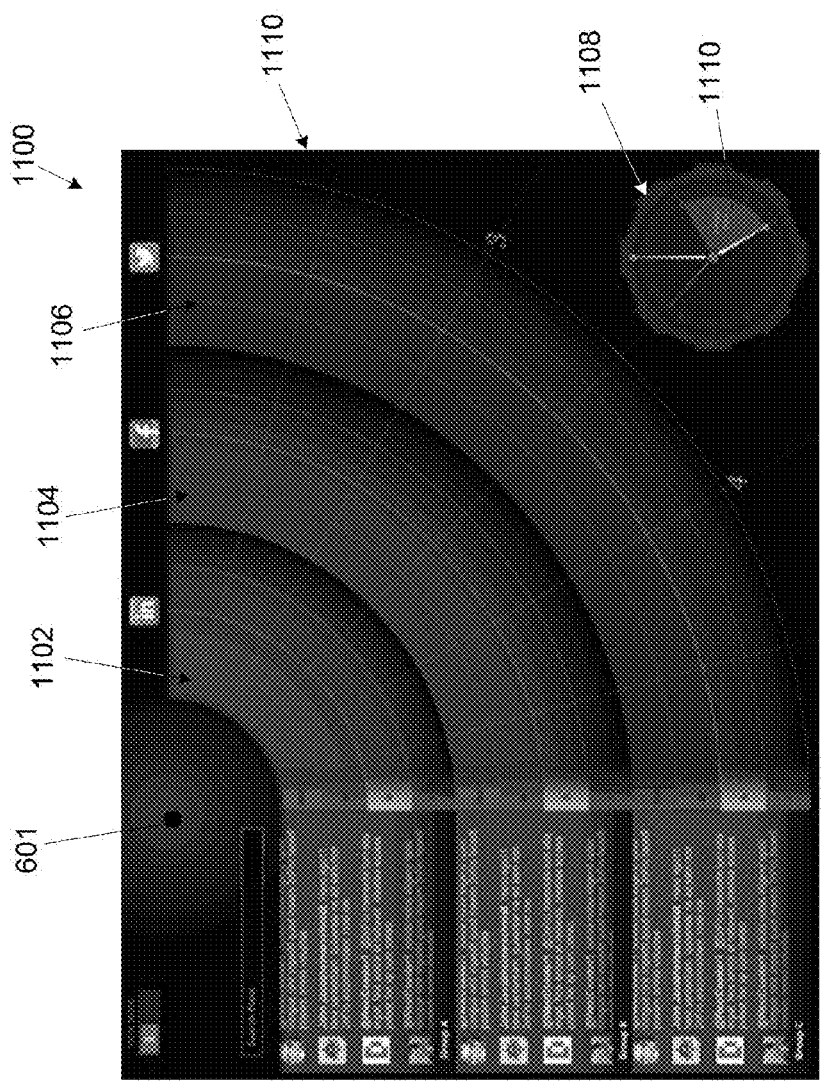
FIGS. 41-42 illustrate one embodiment of an interface 1100 for providing temporal information to users.
Figure 42:
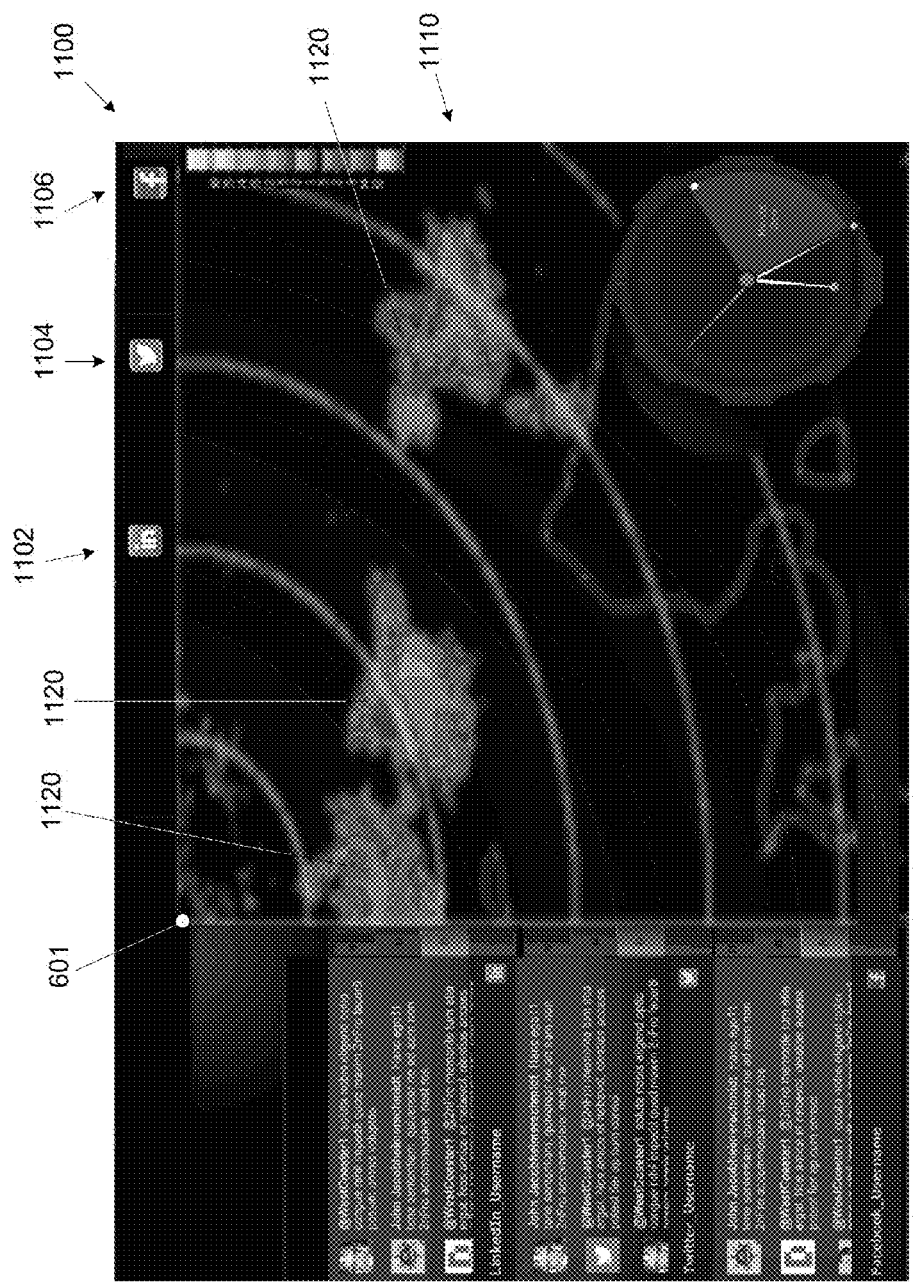

FIGS. 41-42 illustrate one embodiment of an interface 1100 for providing temporal information to users. The interface 1100, as illustrated in FIGS. 41-42 comprises a two-dimensional shape 1112 corresponding to a time period. In some embodiments, the interface 1100 also comprises a second shape 1108 corresponding to a second time period, where the second time period is longer than the first time period and the first time period is part of the second time period. For example, the second shape 1108 may be presented with an indication of the first shape 1110 within, as illustrated.

Within the shape 1110 (and the shape 1108) time is indicated by an angular position about a center axis 601 in a manner similar to that of the interface 600 described above. The shape 1110 also comprises a plurality of bands which correspond to properties of plotted information items. For example, in the example embodiments shown in FIGS. 42-42, each band corresponds to a different type of social media feed. Band 1102 corresponds to a feed from the LINKEDIN social media service. Band 1104 corresponds to a feed from the TWITTER social media service and band 1106 corresponds to a feed from the FACEBOOK social media service. Referring to FIG. 42, icons 1120 may be plotted in the appropriate band 1102, 1104, 1106 based on the feed from which the represented information items were received. In various embodiments, the user device 102 and/or service provider system 104 is configured to update and/or change the icons 1120 based on replies to the information items. For example, when another user replies to a social media pose, the user device 102 and/or service provider system 104 is programmed to modify the corresponding icon 1120, for example, by changing the size, color, shape or any other property of the icons. For example, the icons 1120 may be represented in a manner similar to a weather radar. The size and color of an icon may represent the number of replies. In this way, the user 103 may view the interface 1100 to determine which information items are popular and, therefore, worthy of review. It will be appreciated that icons in the various other interfaces 500, 750, 780, 800, 850, 880, 900, 950, 999 may be modified in the manner described with respect to FIGS. 41-42. For example, the color and/or shape of any of the icons described herein may indicate properties of the represented information items including, for example, a number of replies as indicated in FIGS. 41-42.

Figure 59:
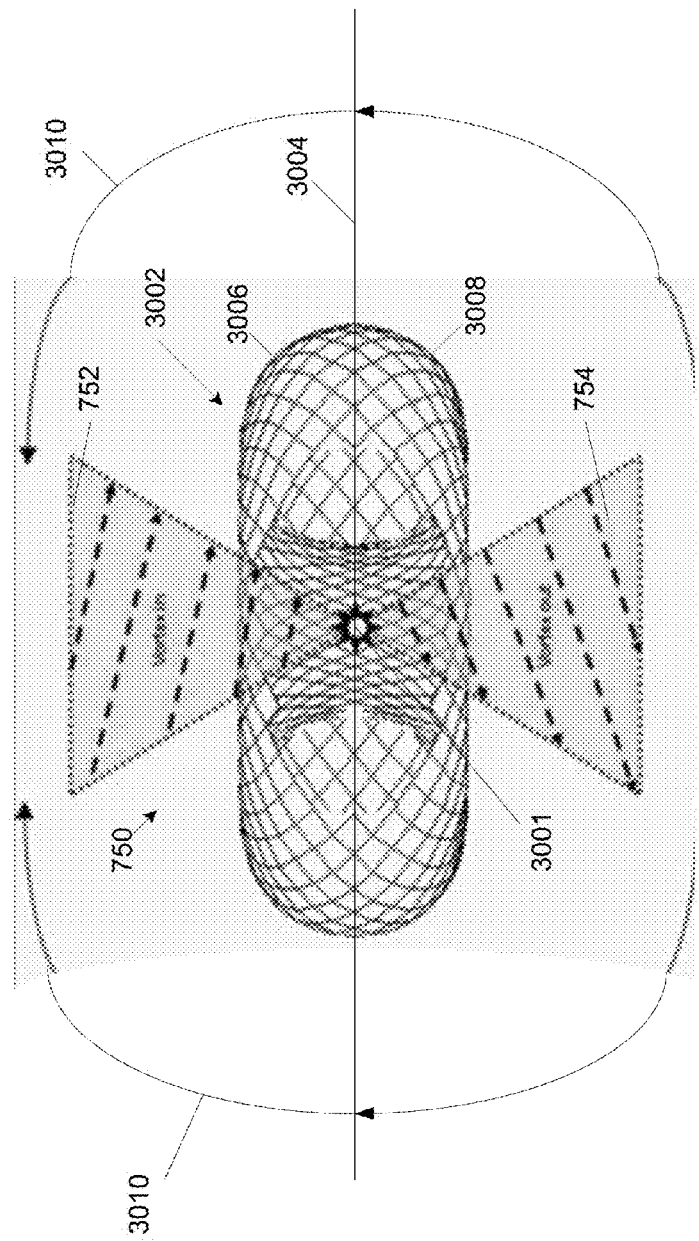
FIG. 59 is a diagram showing another embodiment of a user interface for providing temporal information to users.

FIG. 59 is a diagram showing another embodiment of a user interface 3000 for providing temporal information to users. The interface 3000 comprises a torus shape 3002. A reference time is indicated by reference time marker 3001. The shape 3002 is centered on an equator 3004 and defines a top portion 3006 corresponding to times in the future relative to the reference time and a bottom portion 3008 corresponding to times in the past relative to the reference time. Although the shape 3002 is a torus, any suitable continuous or discontinuous shape may be used. Icons may be plotted on the surface of the torus 3000 and traverse as the reference time changes, for example, as described herein with respect to the various other interfaces and indicated by arrows 3010. Similar to the interface 970 of FIG. 34, the interface 300 may also comprise a sub-interface 750, which may comprise spiral ring sections 752, 754. In some embodiments, the shape 3002 and the sub-interface 750 are arranged according to different time scales. For example, icons may be plotted on the shape 3002 for times more distance from the reference time 3001. Icons represented information items at times closer to the reference time 3001 may be represented on the sub-interface 750.

Additional Examples

Various embodiments comprise a computer-implemented methods for providing users with an interface with information regarding past and future events, the method comprising: receiving, by a computer device, an indication of a first event, wherein the computer device comprises at least one processor and operatively associated memory; generating, by the computer device, a graphical user interface wherein the graphical user interface comprises: a two-dimensional shape positioned orthogonal to a center axis, wherein the two-dimensional shape corresponds to a time period, wherein the two-dimensional shape comprises a plurality of bands at differing distances from the center axis, wherein each band corresponds to a category of events; a first icon plotted in a first band selected from the plurality of bands, wherein the first icon corresponds to a first event described by a first category of events corresponding to the first band, and wherein an angular position of the first icon about the center axis indicates a first time when the first event occurred; providing the graphical user interface to a first user, by the computer device; receiving, by the computer device, an indication of an update to the first event; and modifying, by the computer device, the first icon to indicate the update to the first event.

According to various embodiments of the methods, the first event is a posting of a message to a social media outlet, and wherein the update to the first event is a reply to the message.

According to various embodiments, the methods further comprise: receiving, by the computer device, an indication of a second update to the first event; and modifying, by the computer device, the first icon to indicate the second update to the to the first event.

According to various embodiments of the methods, the second update is an additional reply to the message.

According to various embodiments of the methods, a first category of events corresponds to at least one message feed and wherein the first event is a posting of a message indicated by the at least one message feed.

According to various embodiments of the methods, the graphical user interface further comprises a second icon plotted in a second band selected from the plurality of bands, wherein the second icon corresponds to a second event described by a second category of events corresponding to the second band, and wherein an angular position of the second icon about the center axis indicates a second time when the second event occurred.

According to various embodiments of the methods, modifying the first icon to indicate the update to the first event comprises changing a size of the first icon.

According to various embodiments of the methods, modifying the first icon to indicate the update to the first event comprises changing a color of the first icon.

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to example embodiments of the invention by way of illustration only. Alternative example embodiments of the structures and methods disclosed here may be employed without departing from the principles of what is claimed.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one embodiment," "various embodiments," or to "an example embodiment" means that a particular feature, structure, or characteristic described in connection with the example embodiments is included in at least one example embodiment of the invention. The appearances of the phrase "in one embodiment" in various places in the specification are not necessarily all referring to the same example embodiment. Reference to example embodiments is intended to disclose examples, rather than limit the claimed invention.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient, at times, principally for reasons of common usage, to refer to these signals as bits, values, elements, symbols, characters, terms, numbers, or the like. Furthermore, it is also convenient, at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method actions. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred example embodiment and several alternate example embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented system for providing users with an interface comprising temporal information, the system comprising:
a computer system, the computer system comprising at least one processor and operatively associated memory, wherein the computer system is programmed to:
generate a graphical user interface, wherein the graphical user interface comprises:
a center portion defining a planar face that is orthogonal to a center axis, wherein the center portion corresponds to a time period;
a three-dimensional shape positioned along the center axis, wherein the three-dimensional shape is positioned relative to the center portion such that the three-dimensional shape has a lower portion that is positioned along the center axis on a first side of the planar face and an upper portion that is positioned along the center axis on a second side of the planer face opposite the first side of the planer face, wherein the upper portion represents time in the future relative to the time period, and the lower portion represents time in the past relative to the time period;
a first icon plotted on the upper portion, wherein the first icon corresponds to a first information item associated with a first time, wherein the first time is indicated by a position of the first icon on the upper portion, and wherein the first time is in the future relative to the time period; and
a second icon plotted on the lower portion, wherein the second icon corresponds to a second information item associated with a second time, wherein the second time is indicated by a position of the second icon on the lower portion, and wherein the second time is in the past relative to the time period; and
provide the graphical user interface to a first user.

2. The system meted of claim 1, wherein the three-dimensional shape is a torus.

3. The system of claim 1, wherein the graphical user interface further comprises a reference time marker positioned on the planar face, wherein an angular position of the reference time marker about the center axis indicates a reference time.

4. The system of claim 3, wherein the three dimensional shape is a figure of revolution about the center axis.

5. The system of claim 4, wherein the three dimensional shape comprises a plurality of icons plotted thereon, wherein the plurality of icons comprises the first and second icon, and wherein icons selected from the plurality of icons that are plotted on a first surface of the upper portion of the three dimensional shape and icons selected from the plurality of icons that are plotted on a first surface of the lower portion of the three dimensional shape correspond to points in time relative to the reference time.

6. The system of claim 4, wherein the computer system is further programmed to:
receive a request from the first user to modify the graphical user interface to correspond to a new reference time; and
in response:
calculate a new time period, wherein the new time period comprises a predetermined amount of time before and a predetermined amount of time after the new reference time;
rotate the center portion about the center axis;
rotate the upper portion towards the center axis; and
rotate the bottom portion away from the center axis until the center portion corresponds to the new time period and the reference time marker is at an angular position on the center portion corresponding to the new reference time.

7. The system of claim 6, wherein, after the rotating, the first time is a past time relative to the new reference time and after the rotating, the first icon is plotted on the lower portion.

8. The system of claim 6, wherein, after the rotating, the first time is within the new time period and the first icon is plotted on the planar face at an angular position about the center axis indicating the first time relative to the new reference time.

9. The system of claim 8, wherein a distance of the first icon from the center axis indicates a category of the first information item.

10. The system of claim 1, wherein providing the graphical user interface to the first user comprises providing the graphical user interface to the first user relative to a first user point of view, and wherein the computer system is further programmed to:
receive from the first user, a request to rotate the user interface; and
rotate the user interface relative to the first user point of view.

11. The system of claim 1, wherein the graphical user interface further comprises a third icon plotted on the planar face, wherein the third icon corresponds to a third information item associated with a third time, wherein an angular position of the third icon about the center axis indicates the third time, and wherein the third time is within the time period.

12. The system of claim 1, wherein the three-dimensional shape is discontinuous.

13. The system of claim 1, wherein a distance between the first icon and the center axis indicates a property of the first information item.

14. A computer-implemented system for providing users with an interface comprising temporal information, the system comprising:
a computer system, the computer system comprising at least one processor and operatively associated memory, wherein the computer system is programmed to:
generate a graphical user interface, wherein the graphical user interface comprises:
a two-dimensional shape positioned orthogonal to a center axis, wherein the two-dimensional shape corresponds to a time period;
a first icon plotted on the two-dimensional shape, wherein the first icon corresponds to a first information item associated with a first time during the time period, wherein an angular position of the first icon about the center axis indicates the first time, and wherein a distance of the first icon from the center axis indicates a property of the first information item; and
a second icon plotted on the two-dimensional shape, wherein the second icon corresponds to a second information item associated with a second time during the time period, wherein an angular position of the second icon about the center axis indicates the second time, and wherein a distance of the second icon from the center axis indicates a property of the second information item; and
provide the graphical user interface to a first user.

15. The system of claim 14, wherein the graphical user interface also comprises a reference time marker corresponding to an angular position on the two-dimensional shape about the center axis indicating a first reference time.

16. The system of claim 15, wherein the computer system is further programmed to:
receive a request to change the graphical user interface such that the reference time marker indicates a new reference time, wherein the first reference time and the new reference time are within the time period;
in response, rotate the two-dimensional shape relative to the reference time marker until the reference time marker corresponds to an angular position on the two-dimensional shape indicating the new reference time, wherein after the rotation:
the angular position of the first icon about the center axis indicates the first time relative to the reference time marker indicating the new reference time; and
the angular position of the second icon about the center axis indicates the second time relative to the reference time marker indicating the new reference time.

17. The system of claim 15, wherein the two-dimensional shape is a circle centered on the center axis, and wherein the graphical user interface further comprises:
a plurality of rings surrounding the two-dimensional shape and centered on the center axis, wherein each of the plurality of rings corresponds to one of a plurality of time periods, wherein the plurality of time periods are positioned chronologically relative to one another in order of distance from the center axis;
a third icon plotted on a first ring selected from the plurality of rings, wherein the third icon corresponds to a third information item associated with a third time during a first ring time period selected from the plurality of time periods and corresponding to the first ring, wherein an angular position of the third icon indicates the third time.

18. The system of claim 17, wherein a distance of the third icon from a centermost boundary of the first ring indicates a property of the third event.

19. The system of claim 17, wherein the plurality of rings extend above the two-dimensional shape along a first direction of the center axis, wherein the distance of successive rings above the two dimensional shape increases with increasing distance from the center axis.

20. The system of claim 19, wherein the plurality of rings are interconnected to form a spiral.

21. The system of claim 17, wherein the computer system is further programmed to:
receive a request from the first user to change the graphical user interface such that the reference time marker corresponds to a new reference time outside of the time period and in a second ring time period selected from the plurality of time periods; and
in response, rotate the two-dimensional shape and the plurality of rings relative to the reference time marker wherein after the rotation:
the third icon is plotted on a second ring selected from the plurality of rings, wherein the second ring corresponds to the first ring time period, and wherein a distance between the second ring and the center axis indicates a time difference between the first ring time period and the new reference time; and
the third icon is positioned plotted on the first ring at an angular position indicating the third time relative to the new reference time.

22. The system of claim 21, wherein after the rotation, the first and second icons are no longer plotted on the two-dimensional shape.

23. The system of claim 22, wherein after the rotation, the first icon is plotted on a third ring selected from the plurality of rings, wherein a distance between the third ring and the center axis and an angular position of the first icon on the third ring indicate a time difference between the first time and the new reference time.

24. The system of claim 14, wherein the property of the first information item indicates a category of the first information item.

25. The system of claim 14, wherein the first time period is a future time period relative to a present time.

26. The system of claim 14, wherein the first time period is a past time period relative to a present time.

27. The system of claim 14, wherein the two-dimensional shape has a first face pointing in a first direction along the center axis corresponding to the time period, wherein the first icon and the second icon are plotted on the first face.

28. The system of claim 27, wherein the two-dimensional shape also has a second face pointing in a second direction along the center axis opposite the first direction, wherein the second face corresponds to a past time period, and wherein the graphical user interface further comprises:
- a first past icon plotted on the second face of the two-dimensional shape, wherein the first past icon corresponds to a first past event at a first time during the past time period, wherein an angular position of the first past icon indicates the first time during the past time period, and wherein a distance of the first past icon from the center axis indicates a property of the first past event.

29. The system of claim 28, wherein providing the graphical user interface to the first user comprises displaying to the first user the first face of the two-dimensional shape, wherein the computer system is further programmed to:
- receive a request from the first user to view the second face of the two-dimensional shape; and
- rotate the two-dimensional shape relative to a point of view of the first user such that the point of view of the first user comprises the second face of the two-dimensional shape.

30. The system of claim 14, wherein the graphical user interface also comprises:
- a three-dimensional shape positioned along the center axis, wherein the three-dimensional shape is positioned relative to the two-dimensional shape such that the three-dimensional shape has a first portion that is positioned along the center axis on a first side of the two-dimensional shape and a second portion that is positioned along the center axis on a second side of the two dimensional shape, wherein the first portion represents time in the future relative to the time period and the second portion represents time in the past relative to the time period; and
- a third icon plotted on the first portion, wherein the third icon corresponds to a third information item associated with a third time, where the third time is indicated by a position of the third icon on the first portion, and wherein the third time is in the future relative to the time period; and
- a fourth icon plotted on the second portion, wherein the fourth icon corresponds to a fourth information item associated with a fourth time, wherein the fourth time is indicated by a position of the fourth icon on the second portion, and wherein the fourth time is in the past relative to the time period.

\* \* \* \* \*